(12) United States Patent
Berger et al.

(10) Patent No.: US 7,877,421 B2
(45) Date of Patent: Jan. 25, 2011

(54) METHOD AND SYSTEM FOR MAPPING ENTERPRISE DATA ASSETS TO A SEMANTIC INFORMATION MODEL

(75) Inventors: Ben Berger, Modi'in (IL); Ziv Hellman, Jerusalem (IL); Hayden Marchant, Ramat Beit-Shemesh (IL); Rannen Meir, Jerusalem (IL); Boris Melamed, Jerusalem (IL); Zvi Schreiber, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 2028 days.

(21) Appl. No.: 10/637,339

(22) Filed: Aug. 8, 2003

(65) Prior Publication Data

US 2004/0093344 A1 May 13, 2004

Related U.S. Application Data

(63) Continuation-in-part of application No. 10/340,068, filed on Jan. 9, 2003, now abandoned, which is a continuation-in-part of application No. 10/302,370, filed on Nov. 22, 2002, now Pat. No. 7,673,282, which is a continuation-in-part of application No. 10/159,516, filed on May 31, 2002, now abandoned, which is a continuation-in-part of application No. 10/104,785, filed on Mar. 22, 2002, now Pat. No. 7,146,399, which is a continuation-in-part of application No. 10/053,045, filed on Jan. 15, 2002, now abandoned, which is a continuation-in-part of application No. 09/904,457, filed on Jul. 6, 2001, now Pat. No. 7,093,200, which is a continuation-in-part of application No. 09/866,101, filed on May 25, 2001, now Pat. No. 7,099,885.

(51) Int. Cl.
*G06F 17/30* (2006.01)

(52) U.S. Cl. .............. 707/809; 707/602; 707/756; 707/975; 707/802

(58) Field of Classification Search ............... 707/2, 707/101, 102, 103, 104, 6, 100, 1, 200
See application file for complete search history.

(56) References Cited

U.S. PATENT DOCUMENTS 5,295,242 A 3/1994 Mashruwala et al.
(Continued)

FOREIGN PATENT DOCUMENTS

JP 2001-92827 A 4/2001
(Continued)

OTHER PUBLICATIONS

Bechhofer S K et al.: "Terminologies and terminology servers for information environments". Software Technology and Engineering Practice, 1997. Proceedings., Eighth IEEE International Workshop on Yincorporating Computer Aided Software Engineering. London, UK Jul. 14-18, 1997, Los Alamitos, CA USA, IEEE Comput. Soc, US, Jul. 14, 1997, pp. 484-497.

(Continued)

*Primary Examiner*—Tim T. Vo
*Assistant Examiner*—Dangelino N Gortayo
(74) *Attorney, Agent, or Firm*—Yee & Associates, P.C.; Elissa Y. Wang

(57) ABSTRACT

A method for mapping data schemas into an ontology model, including providing an ontology model including classes and properties of classes, providing a data schema, identifying a primary data construct within the data schema, identifying a secondary data construct within the primary data construct, mapping the primary data construct to a corresponding class of the ontology model, and mapping the secondary data construct to a property of the corresponding class of the ontology model. A system and a computer readable storage medium are also described and claimed.

90 Claims, 49 Drawing Sheets

U.S. PATENT DOCUMENTS

| | | | |
|---|---|---|---|
| 5,499,371 | A | 3/1996 | Henninger et al. |
| 5,627,979 | A * | 5/1997 | Chang et al. ................ 715/763 |
| 5,710,917 | A | 1/1998 | Musa et al. |
| 5,734,887 | A | 3/1998 | Kingberg et al. |
| 5,768,580 | A | 6/1998 | Wical |
| 5,838,965 | A | 11/1998 | Kavanagh et al. |
| 5,857,197 | A * | 1/1999 | Mullins ................ 707/103 R |
| 5,873,093 | A | 2/1999 | Williamson et al. |
| 5,905,987 | A | 5/1999 | Shutt et al. |
| 5,937,409 | A * | 8/1999 | Wetherbee ............. 707/103 R |
| 5,970,490 | A | 10/1999 | Morgenstern |
| 5,995,756 | A | 11/1999 | Herrmann |
| 6,014,666 | A | 1/2000 | Helland et al. |
| 6,035,342 | A | 3/2000 | Bernstein et al. |
| 6,192,365 | B1 | 2/2001 | Draper et al. |
| 6,199,059 | B1 * | 3/2001 | Dahan et al. ................... 707/3 |
| 6,219,654 | B1 | 4/2001 | Ruffin |
| 6,233,586 | B1 | 5/2001 | Chang et al. |
| 6,289,338 | B1 | 9/2001 | Stoffel et al. |
| 6,292,804 | B1 | 9/2001 | Ardoin et al. |
| 6,301,584 | B1 | 10/2001 | Ranger |
| 6,311,194 | B1 | 10/2001 | Sheth et al. |
| 6,327,593 | B1 | 12/2001 | Goiffen |
| 6,343,265 | B1 | 1/2002 | Glebov et al. |
| 6,374,252 | B1 * | 4/2002 | Althoff et al. ............... 707/102 |
| 6,397,232 | B1 | 5/2002 | Cheng-Hung et al. |
| 6,424,973 | B1 | 7/2002 | Baclawski |
| 6,424,974 | B1 | 7/2002 | Cotner et al. |
| 6,497,943 | B1 | 12/2002 | Jimarez et al. |
| 6,498,795 | B1 | 12/2002 | Zhang et al. |
| 6,513,059 | B1 | 1/2003 | Gupta et al. |
| 6,526,416 | B1 | 2/2003 | Long |
| 6,532,471 | B1 | 3/2003 | Ku et al. |
| 6,560,595 | B1 | 5/2003 | Sanders et al. |
| 6,578,046 | B2 | 6/2003 | Chang et al. |
| 6,591,272 | B1 | 7/2003 | Williams |
| 6,633,869 | B1 | 10/2003 | Duparcmeur et al. |
| 6,633,878 | B1 | 10/2003 | Underwood |
| 6,640,231 | B1 | 10/2003 | Andersen et al. |
| 6,643,633 | B2 | 11/2003 | Chau et al. |
| 6,651,244 | B1 | 11/2003 | Smith et al. |
| 6,687,873 | B1 | 2/2004 | Ballantyne et al. |
| 6,704,744 | B1 * | 3/2004 | Williamson et al. ......... 707/101 |
| 6,711,579 | B2 * | 3/2004 | Balakrishnan .............. 707/102 |
| 6,711,585 | B1 | 3/2004 | Copperman et al. |
| 6,718,320 | B1 | 4/2004 | Subramanian et al. |
| 6,728,692 | B1 | 4/2004 | Martinka et al. |
| 6,732,109 | B2 * | 5/2004 | Lindberg et al. ............ 707/101 |
| 6,772,031 | B1 | 8/2004 | Strand |
| 6,778,990 | B2 | 8/2004 | Garcia et al. |
| 6,792,580 | B2 | 9/2004 | Kawakatsu |
| 6,847,974 | B2 * | 1/2005 | Wachtel ...................... 707/101 |
| 6,871,204 | B2 | 3/2005 | Krishnaprasad et al. |
| 6,892,238 | B2 | 5/2005 | Lee et al. |
| 6,947,943 | B2 | 9/2005 | DeAnna et al. |
| 6,957,214 | B2 * | 10/2005 | Silberberg et al. .............. 707/4 |
| 6,978,257 | B1 | 12/2005 | Halbout et al. |
| 6,985,905 | B2 * | 1/2006 | Prompt et al. ............... 707/102 |
| 6,999,956 | B2 * | 2/2006 | Mullins ........................ 707/2 |
| 7,007,029 | B1 * | 2/2006 | Chen ........................ 707/100 |
| 7,024,425 | B2 | 4/2006 | Krishnaprasad et al. |
| 7,027,974 | B1 | 4/2006 | Busch et al. |
| 7,096,224 | B2 | 8/2006 | Murthy et al. |
| 7,111,297 | B1 | 9/2006 | Sankaranarayan et al. |
| 7,200,563 | B1 | 4/2007 | Hammitt et al. |
| 7,254,589 | B2 | 8/2007 | Goodwin et al. |
| 7,278,164 | B2 | 10/2007 | Raiz et al. |
| 7,302,410 | B1 | 11/2007 | Venkatraman et al. |
| 7,315,849 | B2 | 1/2008 | Bakalash et al. |
| 7,475,084 | B2 | 1/2009 | Edelstein et al. |
| 2002/0059183 | A1 | 5/2002 | Chen |
| 2002/0059187 | A1 | 5/2002 | Delo et al. |
| 2002/0099738 | A1 | 7/2002 | Grant |
| 2002/0107844 | A1 | 8/2002 | Cha et al. |
| 2002/0169842 | A1 | 11/2002 | Christensen et al. |
| 2002/0194154 | A1 | 12/2002 | Levy et al. |
| 2003/0018616 | A1 | 1/2003 | Wilbanks et al. |
| 2003/0036917 | A1 | 2/2003 | Hite et al. |
| 2003/0050932 | A1 | 3/2003 | Pace et al. |
| 2003/0110055 | A1 | 6/2003 | Chau |
| 2003/0120665 | A1 | 6/2003 | Fox et al. |
| 2003/0163597 | A1 | 8/2003 | Hellman et al. |
| 2003/0167445 | A1 | 9/2003 | Su et al. |
| 2003/0172368 | A1 | 9/2003 | Alumbaugh et al. |
| 2003/0191608 | A1 | 10/2003 | Anderson et al. |
| 2003/0233224 | A1 | 12/2003 | Marchisio et al. |
| 2004/0010491 | A1 | 1/2004 | Riedinger |
| 2004/0054690 | A1 | 3/2004 | Hillerbrand et al. |
| 2004/0117346 | A1 | 6/2004 | Stoffel et al. |
| 2004/0220893 | A1 | 11/2004 | Spivack et al. |
| 2005/0060371 | A1 | 3/2005 | Cohen et al. |
| 2005/0080656 | A1 | 4/2005 | Crow et al. |
| 2005/0138173 | A1 | 6/2005 | Ha et al. |
| 2005/0197926 | A1 | 9/2005 | Chinnappan et al. |
| 2005/0267871 | A1 | 12/2005 | Marchisio et al. |
| 2006/0218177 | A1 | 9/2006 | Chang et al. |
| 2007/0038500 | A1 | 2/2007 | Hammitt et al. |
| 2008/0140549 | A1 | 6/2008 | Eder |
| 2009/0077051 | A1 | 3/2009 | Edelstein et al. |

FOREIGN PATENT DOCUMENTS

| | | |
|---|---|---|
| JP | 2399665 A | 9/2004 |
| WO | 01/15042 A2 | 3/2001 |
| WO | 02/05137 A2 | 1/2002 |
| WO | 02/31680 A1 | 4/2002 |
| WO | 02/080028 A1 | 10/2002 |
| WO | 02/099725 A1 | 12/2002 |
| WO | 2005/010653 A2 | 2/2005 |
| WO | 2006/020343 A1 | 2/2006 |
| WO | 2006/071928 | 7/2006 |

OTHER PUBLICATIONS

Czejdo, B et al. "Automatic Generation of Ontology Based Annotations in XML and Thrier use in Retrieval Systems", Proceedings of the First International Conference on Web Information Systems Engineering, 2000, vol. 1, pp. 296-300.

Deloule, F et al. "Ontologies and Knowledge Representation", Intelligent Systems for the 21st century, IEEE International Conference on Tools with Artificial Intelligence, 2003, pp. 77-82.

Dimitrov et al: "XML Standards for Ontology Exchange", Proceedings of Ontolex: Ontoogies and Lexical Knowledge Bases, Sep. 8, 2000, pp. 1-68.

Farquhar A et al.: "The Ontolingua Server: a tool for collaborative ontology construction", International Journal of Human- Computer Studies Academic Press UK, vol. 46, No. 6, 1997, pp. 707-727.

Fernandes, Abilio. "Snobase", May 2004, 18 pages.

Fikes R et al.: "Distributed repositories of highy expressive reusable ontologies" IEEE Intelligent Systems IEEE USA, vo. 14, No. 2, 1999, pp. 73-79.

Green, Peter. Applying Ontologies to Business and Systems Modeling Techniques and Perspectives: Lessons Learned Journal of Database Management, 15 (2), 105-117, Apr. -Jun. 2004 downloaded from the web: http://www.accessmylibrary.com/coms2/summary_0286-20574539_ITM (1 of 3)Jun. 25, 2009 1:36:42 PM.

Greenhill S et al.: "Noetica: a tool for semantic data modeling", Information Processing and Management, Elsevier, Barking, GB, vol. 34., No. 6, Nov. 1998, pp. 739-760.

Hu Bo et al, "Ontology-based Medical Image Annotation with Description Logics", proceedings, 15th IEEE International Conference on Tools with Artificial Intelligence, 2003, pp. 77-82.

Irani, Romin. "Enabling web Services with Bea WebLogic" Sep. 26, 2001, pp. 1-4. http://www. webservicesarchitect.com/content/articles/irrani05.asp.

Wang, Yanmei et al. Ontology-based Web Knowledge Management, ICICS-PCM 2003, pp. 1859-1863.

Klein et al., "The Relation between Ontologies and schema languages" Vrije Universiteit Amsterdam, http://www.cs.vu.nl/~mcaklein/papers/oil-xmls.pdf.

Liu Jin et al, A Methodology for Acquisition of Software Component Attribute Ontology, The Fourth International Conference on Computer and Information Technology, 2004, p. 1058-1064.

Mcguiness, Deborah L. et al., DAML+OIL: An Ontology Language for the Semantic Web, IEEE Intelligent Systems, 2002, pp. 72-80.

Mena E et al.: "Observer: an approach for query processing in global information systems based on interoperation across pre-existing ontologies", Cooperative Information Systems, 1996. Proceedings., First IFCIS International Conference in Brussels, Belgium Jun. 19-21, 1996, Los Alamitos, CA, USA, IEEE Comput. Soc P, US, Jun. 19, 1996, pp. 14-25.

Rosemann, Michael and Green, Peter. Developing a meta model for the Bugne-Wand-Weber Ontological Constructs, Information Systems 27 (2002) 75-91.

Ruiz, Fransisco et al., "A Proposal of a Software Measurement Ontology", Department of Computer Science University of Castilla-La Mancha, Dec. 3, 2008. http://www.frcu.utn.edu.ar/depto_3/32JAIIO/asse/asse_02.pdf.

SQL definition on Wikipedia download from http://en.wikipedia.org/wiki/SQL on Jun. 26, 2009.

Van Wegan, Bert and De Hoog, Robert, "Measuring the economic value of information systems", Journal of Information Technology (1996) 11, 247-260.

\* cited by examiner

```
<?xml version="1.0" encoding="UTF-8" ?>
<xs:schema xmlns:xs="http://www.w3.org/2001/XMLSchema"
elementFormDefault="qualified" attributeFormDefault="unqualified">
  <xs:element name="reservation" type="Reser
  <xs:complexType name="Flights">
    - <xs:sequence>
      <xs:element name="flight" type="Flight" m
       maxOccurs="unbounded" />
    </xs:sequence>
  </xs:complexType>
  <xs:complexType name="Flight">
    - <xs:sequence>
      <xs:element name="airline" type="xs:strin
      <xs:element name="arrivalAirport" type="
      <xs:element name="departureAirport" typ
      <xs:element name="distanceInKm" type="
      <xs:element name="startTime" type="xs:d
    </xs:sequence>
    <xs:attribute name="flightID" type="xs:strin
  </xs:complexType>
  <xs:complexType name="Reservation">
    - <xs:sequence>
      <xs:element name="flightInfo">
        - <xs:complexType>
          - <xs:sequence>
            <xs:element name="flights" type="Fl
          </xs:sequence>
        </xs:complexType>
      </xs:element>
      <xs:element name="passenger" type="Pas
    </xs:sequence>
    <xs:attribute name="reservationID" type="x
```

Swiss Air Schema

```
<?xml version="1.0" encoding="UTF-8" ?>
<xs:schema xmlns:xs="http://www.w3.org/2001/XMLSchema"
elementFormDefault="qualified" attributeFormDefault="unqualified">
  <xs:element name="customerOrder"
   type="FlightReservation" />
  <xs:complexType name="FlightInfo">
    - <xs:sequence>
      <xs:element name="securityLevel" type="xs:string" />
      <xs:element name="flightOccurence" type="Journey"
       minOccurs="0" maxOccurs="unbounded" />
    </xs:sequence>
  </xs:complexType>
  <xs:complexType name="Journey">
    - <xs:sequence>
      <xs:element name="airline" type="Company" />
      <xs:element name="arrival" type="Airport" />
      <xs:element name="departure" type="Airport" />
      <xs:element name="distanceInMiles" type="xs:float" />
      <xs:element name="id" type="xs:string" />
      <xs:element name="take-off" type="xs:date" />
    </xs:sequence>
  </xs:complexType>
  <xs:complexType name="FlightReservation">
    - <xs:sequence>
      <xs:element name="flightInfo">
        - <xs:complexType>
          - <xs:sequence>
            <xs:element name="flight" type="Journey" />
          </xs:sequence>
        </xs:complexType>
      </xs:element>
      <xs:element name="commuter" type="Commuter" />
```

British Airways Schema

METHOD AND SYSTEM FOR MAPPING ENTERPRISE DATA ASSETS TO A SEMANTIC INFORMATION MODEL

CROSS REFERENCES TO RELATED APPLICATIONS

This application is a continuation-in-part of assignee's application U.S. Ser. No. 10/340,068, filed on Jan. 9, 2003 now abandoned, entitled "Brokering Semantics between Web Services", which is a continuation-in-part of assignee's application U.S. Ser. No. 10/302,370, filed on Nov. 22, 2002 now U.S. Pat. No. 7,673,282, entitled "Enterprise Information Unification", which is a continuation-in-part of assignee's application U.S. Ser. No. 10/159,516, filed on May 31, 2002 now abandoned, entitled "Data Query and Location through a Central Ontology Model," which is a continuation-in-part of application U.S. Ser. No. 10/104,785, filed on Mar. 22, 2002 now U.S. Pat. No. 7,146,399, entitled "Run-Time Architecture for Enterprise Integration with Transformation Generation," which is a continuation-in-part of application U.S. Ser. No. 10/053,045, filed on Jan. 15, 2002 now abandoned, entitled "Method and System for Deriving a Transformation by Referring Schema to a Central Model," which is a continuation-in-part of assignee's application U.S. Ser. No. 09/904,457 filed on Jul. 6, 2001 now U.S. Pat. No. 7,093,200, entitled "Instance Brower for Ontology," which is a continuation-in-part of assignee's application U.S. Ser. No. 09/866,101 filed on May 25, 2001 now U.S. Pat. No. 7,099,885, entitled "Method and System for Collaborative Ontology Modeling."

FIELD OF THE INVENTION

The present invention relates to data schema, and in particular to deriving transformations for transforming data from one schema to another.

BACKGROUND OF THE INVENTION

Ontology is a philosophy of what exists. In computer science ontology is used to model entities of the real world and the relations between them, so as to create common dictionaries for their discussion. Basic concepts of ontology include (i) classes of instances/things, and (ii) relations between the classes, as described hereinbelow. Ontology provides a vocabulary for talking about things that exist.

Instances/Things

There are many kinds of "things" in the world. There are physical things like a car, person, boat, screw and transistor. There are other kinds of things which are not physically connected items or not even physical at all, but may nevertheless be defined. A company, for example, is a largely imaginative thing the only physical manifestation of which is its appearance in a list at a registrar of companies. A company may own and employ. It has a defined beginning and end to its life.

Other things can be more abstract such as the Homo Sapiens species, which is a concept that does not have a beginning and end as such even if its members do.

Ontological models are used to talk about "things." An important vocabulary tool is "relations" between things. An ontology model itself does not include the "things," but introduces class and property symbols which can then be used as a vocabulary for talking about and classifying things.

Properties

Properties are specific associations of things with other things. Properties include:
  Relations between things that are part of each other, for example, between a PC and its flat panel screen;
  Relations between things that are related through a process such as the process of creating the things, for example, a book and its author;
  Relations between things and their measures, for example, a thing and its weight.

Some properties also relate things to fundamental concepts such as natural numbers or strings of characters—for example, the value of a weight in kilograms, or the name of a person.

Properties play a dual role in ontology. On the one hand, individual things are referenced by way of properties, for example, a person by his name, or a book by its title and author. On the other hand, knowledge being shared is often a property of things, too. A thing can be specified by way of some of its properties, in order to query for the values of other of its properties.

Classes

Not all properties are relevant to all things. It is convenient to discuss the source of a property as a "class" of things, also referred to as a frame or, for end-user purposes, as a category. Often sources of several properties coincide, for example, the class Book is the source for both Author and ISBN Number properties.

There is flexibility in the granularity to which classes are defined. Cars is a class. Fiat Cars can also be a class, with a restricted value of a manufacturer property. It may be unnecessary to address this class, however, since Fiat cars may not have special properties of interest that are not common to other cars. In principle, one can define classes as granular as an individual car unit, although an objective of ontology is to define classes that have important properties.

Abstract concepts such as measures, as well as media such as a body of water which cannot maintain its identity after coming into contact with other bodies of water, may be modeled as classes with a quantity property mapping them to real numbers.

In a typical mathematical model, a basic ontology comprises:
  A set C, the elements of which are called "class symbols;"
  For each C∈C, a plain language definition of the class C;
  A set P, the elements of which are called "property symbols;"
  For each P∈F:
    a plain language definition of P;
    a class symbol called the source of P; and
    a class symbol called the target of P; and
  A binary transitive reflexive anti-symmetric relation, I, called the inheritance relation on C×C.

In the ensuing discussion, the terms "class" and "class symbol" are used interchangeably, for purposes of convenience and clarity. Similarly, the terms "property" and "property symbol" are also used interchangeably.

It is apparent to those skilled in the art that if an ontology model is extended to include sets in a class, then a classical mathematical relation on C×D can be considered as a property from C to sets in D.

If $I(C_1, C_2)$ then $C_1$ is referred to as a subclass of $C_2$, and $C_2$ is referred to as a superclass of $C_1$. Also, $C_1$ is said to inherit from $C_2$.

A distinguished universal class "Being" is typically postulated to be a superclass of all classes in C.

Variations on an ontology model may include:

Restrictions of properties to unary properties, these being the most commonly used properties;

The ability to specify more about properties, such as multiplicity and invertibility.

The notion of a class symbol is conceptual, in that it describes a generic genus for an entire species such as Books, Cars, Companies and People. Specific instances of the species within the genus are referred to as "instances" of the class. Thus "Gone with the Wind" is an instance of a class for books, and "IBM" is an instance of a class for companies. Similarly, the notions of a property symbol is conceptual, in that it serves as a template for actual properties that operate on instances of classes.

Class symbols and property symbols are similar to object-oriented classes in computer programming, such as C++ classes. Classes, along with their members and field variables, defined within a header file, serve as templates for specific class instances used by a programmer. A compiler uses header files to allocate memory for, and enables a programmer to use instances of classes. Thus a header file can declare a rectangle class with members left, right, top and bottom. The declarations in the header file do not instantiate actual "rectangle objects," but serve as templates for rectangles instantiated in a program. Similarly, classes of an ontology serve as templates for instances thereof.

There is, however, a distinction between C++ classes and ontology classes. In programming, classes are templates and they are instantiated to create programming objects. In ontology, classes document common structure but the instances exist in the real world and are not created through the class.

Ontology provides a vocabulary for speaking about instances, even before the instances themselves are identified. A class Book is used to say that an instance "is a Book." A property Author allows one to create clauses "author of" about an instance. A property Siblings allows one to create statements "are siblings" about instances. Inheritance is used to say, for example, that "every Book is a PublishedWork". Thus all vocabulary appropriate to PublishedWork can be used for Book.

Once an ontology model is available to provide a vocabulary for talking about instances, the instances themselves can be fit into the vocabulary. For each class symbol, C, all instances which satisfy "is a C" are taken to be the set of instances of C, and this set is denoted B(C). Sets of instances are consistent with inheritance, so that $B(C_1) \subseteq B(C_2)$ whenever $C_1$ is a subclass of $C_2$. Property symbols with source $C_1$ and target $C_2$ correspond to properties with source $B(C_1)$ and target $B(C_2)$. It is noted that if class $C_1$ inherits from class C, then every instance of $C_1$ is also an instance of C, and it is therefore known already at the ontology stage that the vocabulary of C is applicable to $C_1$.

Ontology enables creation of a model of multiple classes and a graph of properties therebetween. When a class is defined, its properties are described using handles to related classes. These can in turn be used to look up properties of the related classes, and thus properties of properties can be accessed to any depth.

Provision is made for both classes and complex classes. Generally, complex classes are built up from simpler classes using tags for symbols such as intersection, Cartesian product, set, list and bag. The "intersection" tag is followed by a list of classes or complex classes. The "Cartesian product" tag is also followed by a list of classes or complex classes. The set symbol is used for describing a class comprising subsets of a class, and is followed by a single class or complex class. The list symbol is used for describing a class comprising ordered subsets of a class; namely, finite sequences, and is followed by a single class or complex class. The bag symbol is used for describing unordered finite sequences of a class, namely, subsets that can contain repeated elements, and is followed by a single class or complex class. Thus set[C] describes the class of sets of instances of a class C, list[C] describes the class of lists of instances of class C, and bag[C] describes the class of bags of instances of class C.

In terms of formal mathematics, for a set S, set[S] is P(S), the power set of S; bag[S] is $N^S$, where N is the set of non-negative integers; and list[S] is $$\bigcup_{n=1}^{\infty} S^n.$$

There are natural mappings $$\text{list}[S] \xrightarrow{\phi} \text{bag}[S] \xrightarrow{\psi} \text{set}[S]. \tag{1}$$

Specifically, for a sequence $(s_1, s_2, \ldots, s_n) \in \text{list}[S]$, $\phi(s_1, s_2, \ldots, s_n)$ is the element $f \in \text{bag}[S]$ that is the "frequency histogram" defined by $f(s) = \#\{1 \leq i \leq n: s_i = s\}$; and for $f \in \text{bag}[S]$, $\psi(f) \in \text{set}[S]$ is the subset of S given by the support of f, namely, $\text{supp}(f) = \{s \in S: f(s) > 0\}$. It is noted that the composite mapping $\phi\psi$ maps a the sequence $(s_1, s_2, \ldots, s_n)$ into the set of its elements $\{s_1, s_2, \ldots, s_n\}$. For finite sets S, set[S] is also finite, and bag[S] and list[S] are countably infinite.

A general reference on ontology systems is Sowa, John F., "Knowledge Representation," Brooks/Cole, Pacific Grove, Calif., 2000.

Relational database schema (RDBS) are used to define templates for organizing data into tables and fields. SQL queries are used to populate tables from existing tables, generally by using table join operations. Extensible markup language (XML) schema are used to described documents for organizing data into a hierarchy of elements and attributes. XSLT script is used to generate XML documents from existing documents, generally by importing data between tags in the existing documents. XSLT was originally developed in order to generate HTML pages from XML documents.

A general reference on relation databases and SQL is the document "Oracle 9i: SQL Reference," available on-line at http://www.oracle.com. XML, XML schema, XPath and XSLT are standards of the World-Wide Web Consortium, and are available on-line at http://www.w3.org.

Often multiple schema exist for the same source of data, and as such the data cannot readily be imported or exported from one application to another. For example, two airline companies may each run applications that process relational databases, but if the relational databases used by the two companies conform to two different schema, then neither of the companies can readily use the databases of the other company. In order for the companies to share data, it is necessary to export the databases from one schema to another.

There is thus a need for a tool that can transform data conforming with a first schema into data that conforms with a second schema.

SUMMARY OF THE INVENTION

The present invention provides a method and system for deriving transformations for transforming data from one schema to another. The present invention describes a general method and system for transforming data conforming with an input, or source data schema into an output, or target data schema. In a preferred embodiment, the present invention can be used to provide (i) an SQL query, which when applied to relational databases from a source RDBS, populates relational databases in a target RDBS; and (ii) XSLT script which, when applied to documents conforming with a source XML schema generates documents conforming with a target XML schema.

The present invention preferably uses an ontology model to determine a transformation that accomplishes a desired source to target transformation. Specifically, the present invention employs a common ontology model into which both the source data schema and target data schema can be mapped. By mapping the source and target data schema into a common ontology model, the present invention derives interrelationships among their components, and uses the interrelationships to determine a suitable transformation for transforming data conforming with the source data schema into data conforming with the target data schema.

Given a source RDBS and a target RDBS, in a preferred embodiment of the present invention an appropriate transformation of source to target databases is generated by:
(i) mapping the source and target RDBS into a common ontology model;
(ii) representing table columns of the source and target RDBS in terms of properties of the ontology model;
(iii) deriving expressions for target table columns in terms of source table columns; and
(iv) converting the expressions into one or more SQL queries.

Although the source and target RDBS are mapped into a common ontology model, the derived transformations of the present invention go directly from source RDBS to target RDBS without having to transform data via an ontological format. In distinction, prior art Universal Data Model approaches transform via a neutral model or common business objects.

The present invention applies to N relational database schema, where N≧2. Using the present invention, by mapping the RDBS into a common ontology model, data can be moved from any one of the RDBS to any other one. In distinction to prior art approaches that require on the order of $N^2$ mappings, the present invention requires at most N mappings.

For enterprise applications, SQL queries generated by the present invention are preferably deployed within an Enterprise Application Integration infrastructure. Those skilled in the art will appreciate that transformation languages other than SQL that are used by enterprise application infrastructures can be generated using the present invention. For example, IBM's ESQL language can similarly be derived for deployment on their WebSphere MQ family of products.

Given a source XML schema and a target XML schema, in a preferred embodiment of the present invention an appropriate transformation of source to target XML documents is generated by:
(i) mapping the source and target XML schema into a common ontology model;
(ii) representing elements and attributes of the source and target XML schema in terms of properties of the ontology model;
(iii) deriving expressions for target XML elements and XML attributes in terms of source XML elements and XML attributes; and
(iv) converting the expressions into an XSLT script.

There is thus provided in accordance with a preferred embodiment of the present invention a method for mapping data schemas into an ontology model, including providing an ontology model including classes and properties of classes, providing a data schema, identifying a primary data construct within the data schema, identifying a secondary data construct within the primary data construct, mapping the primary data construct to a corresponding class of the ontology model, and mapping the secondary data construct to a property of the corresponding class of the ontology model.

There is moreover provided in accordance with a preferred embodiment of the present invention a method for mapping data schemas into an ontology model, including providing an ontology model including classes and properties of classes, each property having associated therewith a target class, providing a data schema, identifying a primary data construct within the data schema, identifying a secondary data construct within the primary data construct, mapping the primary data construct to a corresponding class of the ontology model, and mapping the secondary data construct to an inverse of a property whose target class is the corresponding class of the ontology model.

There is additionally provided in accordance with a preferred embodiment of the present invention a method for mapping data schemas into an ontology model, including providing an ontology model including classes and properties of classes, and including inheritance relationships for superclasses, providing a data schema, identifying a primary data construct within the data schema, identifying a secondary data construct within the primary data construct, mapping the primary data construct to a corresponding class of the ontology model, and mapping the secondary data construct to a property of a superclass of the corresponding class of the ontology model.

There is further provided in accordance with a preferred embodiment of the present invention a method for mapping data schemas into an ontology model, including providing an ontology model including classes and properties of classes, and including inheritance relationships for superclasses, providing a data schema, identifying a primary data construct within the data schema, identifying a secondary data construct within the primary data construct, mapping the primary data construct to a corresponding class of the ontology model, and mapping the secondary data construct to an inverse of a property whose target class is a superclass of the corresponding class of the ontology model.

There is yet further provided in accordance with a preferred embodiment of the present invention a method for mapping data schemas into an ontology model, including providing an ontology model including classes and properties of classes, providing a data schema, identifying a primary data construct within the data schema, identifying a secondary data construct within the primary data construct, mapping the primary data construct to a corresponding class of the ontology model, and mapping the secondary data construct to a composition of properties, one of which is a property of the corresponding class of the ontology model.

There is additionally provided in accordance with a preferred embodiment of the present invention a system for mapping data schemas into an ontology model, including a memory for storing an ontology model including classes and properties of classes, and a data schema, a schema parser for identifying a primary data construct within the data schema, and identifying a secondary data construct within the primary data construct, and a schema mapper for mapping the primary data construct to a corresponding class of the ontology model, and for mapping the secondary data construct to a property of the corresponding class of the ontology model.

There is further provided in accordance with a preferred embodiment of the present invention a system for mapping data schemas into an ontology model, including a memory for storing an ontology model including classes and properties of classes, each property having associated therewith a target class, and a data schema, a schema parser for identifying a primary data construct within the data schema, and identifying a secondary data construct within the primary data construct, and a schema mapper for mapping the primary data construct to a corresponding class of the ontology model, and mapping the secondary data construct to an inverse of a property whose target class is the corresponding class of the ontology model.

There is yet further provided in accordance with a preferred embodiment of the present invention a system for mapping data schemas into an ontology model, including a memory for storing an ontology model including classes and properties of classes, and including inheritance relationships for superclasses, and a data schema, a schema parser for identifying a primary data construct within the data schema, and identifying a secondary data construct within the primary data construct, and a schema mapper for mapping the primary data construct to a corresponding class of the ontology model, and mapping the secondary data construct to a property of a superclass of the corresponding class of the ontology model.

There is moreover provided in accordance with a preferred embodiment of the present invention a system for mapping data schemas into an ontology model, including a memory for storing an ontology model including classes and properties of classes, and including inheritance relationships for superclasses, and a data schema, a schema parser for identifying a primary data construct within the data schema, and identifying a secondary data construct within the primary data construct, and a schema mapper for mapping the primary data construct to a corresponding class of the ontology model, and mapping the secondary data construct to an inverse of a property whose target class is a superclass of the corresponding class of the ontology model.

There is additionally provided in accordance with a preferred embodiment of the present invention a system for mapping data schemas into an ontology model, including a memory for storing an ontology model including classes and properties of classes, and a data schema, a schema parser for identifying a primary data construct within the data schema, and identifying a secondary data construct within the primary data construct, and a schema mapper for mapping the primary data construct to a corresponding class of the ontology model, and mapping the secondary data construct to a composition of properties, one of which is a property of the corresponding class of the ontology model.

There is yet further provided in accordance with a preferred embodiment of the present invention a method for mapping schemas for metadata into a metamodel for metadata, including providing a metamodel for metadata including atomic constructs and composite constructs, providing a schema for metadata, identifying a primary and a secondary metadata construct within the schema for metadata, and mapping the primary and the secondary metadata constructs to corresponding composite and atomic constructs of the metamodel, respectively.

There is moreover provided in accordance with a preferred embodiment of the present invention a system for mapping schemas for metadata into a metamodel for metadata, including a memory for storing a metamodel for metadata including atomic constructs and composite constructs, and a schema for metadata, a metaschema parser for identifying a primary metadata construct and a secondary metadata construct within the schema for metadata, and a metaschema mapper for mapping the primary metadata construct and the secondary data construct to a composite construct and an atomic construct of the metamodel, respectively.

There is additionally provided in accordance with a preferred embodiment of the present invention a method for mapping a given data schema into a generic data schema, including providing a business data schema that represents at least one type of business data instance in terms of alphanumeric values and links to business data instances, providing a plurality of generic instance mappings, defining a mapping from the business data schema into a generic data schema, and representing the mapping from the business data schema into the generic data schema in terms of the generic instance mappings.

There is further provided in accordance with a preferred embodiment of the present invention a system for mapping a given data schema into a generic data schema, including a memory for storing a business data schema that represents at least one type of business data instance in terms of alphanumeric values and links to business data instances, and including a plurality of generic instance mappings, a mapping generator for defining a mapping from the business data schema into a generic data schema, and a mapping analyzer for representing the mapping from the business data schema into the generic data schema in terms of the generic instance mappings.

There is yet further provided in accordance with a preferred embodiment of the present invention a computer-readable storage medium storing program code for causing a computer to perform the steps of providing an ontology model including classes and properties of classes, providing a data schema, identifying a primary data construct within the data schema, identifying a secondary data construct within the primary data construct, mapping the primary data construct to a corresponding class of the ontology model, and mapping the secondary data construct to a property of the corresponding class of the ontology model.

There is moreover provided in accordance with a preferred embodiment of the present invention a computer-readable storage medium storing program code for causing a computer to perform the steps of providing an ontology model including classes and properties of classes, each property having associated therewith a target class, providing a data schema, identifying a primary data construct within the data schema, identifying a secondary data construct within the primary data construct, mapping the primary data construct to a corresponding class of the ontology model, and mapping the secondary data construct to an inverse of a property whose target class is the corresponding class of the ontology model.

There is additionally provided in accordance with a preferred embodiment of the present invention a computer-readable storage medium storing program code for causing a computer to perform the steps of providing an ontology model including classes and properties of classes, and including inheritance relationships for superclasses, providing a data schema, identifying a primary data construct within the data schema, identifying a secondary data construct within the primary data construct, mapping the primary data construct to a corresponding class of the ontology model, and mapping the secondary data construct to a property of a superclass of the corresponding class of the ontology model.

There is further provided in accordance with a preferred embodiment of the present invention a computer-readable storage medium storing program code for causing a computer to perform the steps of providing an ontology model including classes and properties of classes, and including inheritance relationships for superclasses, providing a data schema, identifying a primary data construct within the data schema, identifying a secondary data construct within the primary data construct, mapping the primary data construct to a corresponding class of the ontology model, and mapping the secondary data construct to an inverse of a property whose target class is a superclass of the corresponding class of the ontology model.

There is yet further provided in accordance with a preferred embodiment of the present invention a computer-readable storage medium storing program code for causing a computer to perform the steps of providing an ontology model including classes and properties of classes, providing a data schema, identifying a primary data construct within the data schema, identifying a secondary data construct within the primary data construct, mapping the primary data construct to a corresponding class of the ontology model, and mapping the secondary data construct to a composition of properties, one of which is a property of the corresponding class of the ontology model.

There is moreover provided in accordance with a preferred embodiment of the present invention a computer-readable storage medium storing program code for causing a computer to perform the steps of providing an ontology model including classes and properties of classes, providing a data schema, identifying a primary data construct within the data schema, identifying a secondary data construct within the primary data construct, mapping the primary data construct to a corresponding class of the ontology model, and mapping the secondary data construct to a composition of properties, one of which is a property of the corresponding class of the ontology model.

There is additionally provided in accordance with a preferred embodiment of the present invention a computer-readable storage medium storing program code for causing a computer to perform the steps of providing a business data schema for representing at least one type of business data instance in terms of alphanumeric values and links to business data instances, providing a plurality of generic instance mappings, defining a mapping from the business data schema into a generic data schema, and representing the mapping from the business data schema into the generic data schema in terms of the generic instance mappings.

There is further provided in accordance with a preferred embodiment of the present invention a computer-readable storage medium storing program code for causing a computer to perform the steps of providing a metamodel for metadata including atomic constructs and composite constructs, providing a schema for metadata, identifying a primary and a secondary metadata construct within the schema for metadata, and mapping the primary and the secondary metadata constructs to corresponding composite and atomic constructs of the metamodel, respectively.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention concerns deriving transformations for transforming data conforming with one data schema to data conforming to another data schema. Preferred embodiments of the invention are described herein with respect to table-based data schema, such as RDBS and document-based schema, such as XML schema.

Figure 1:
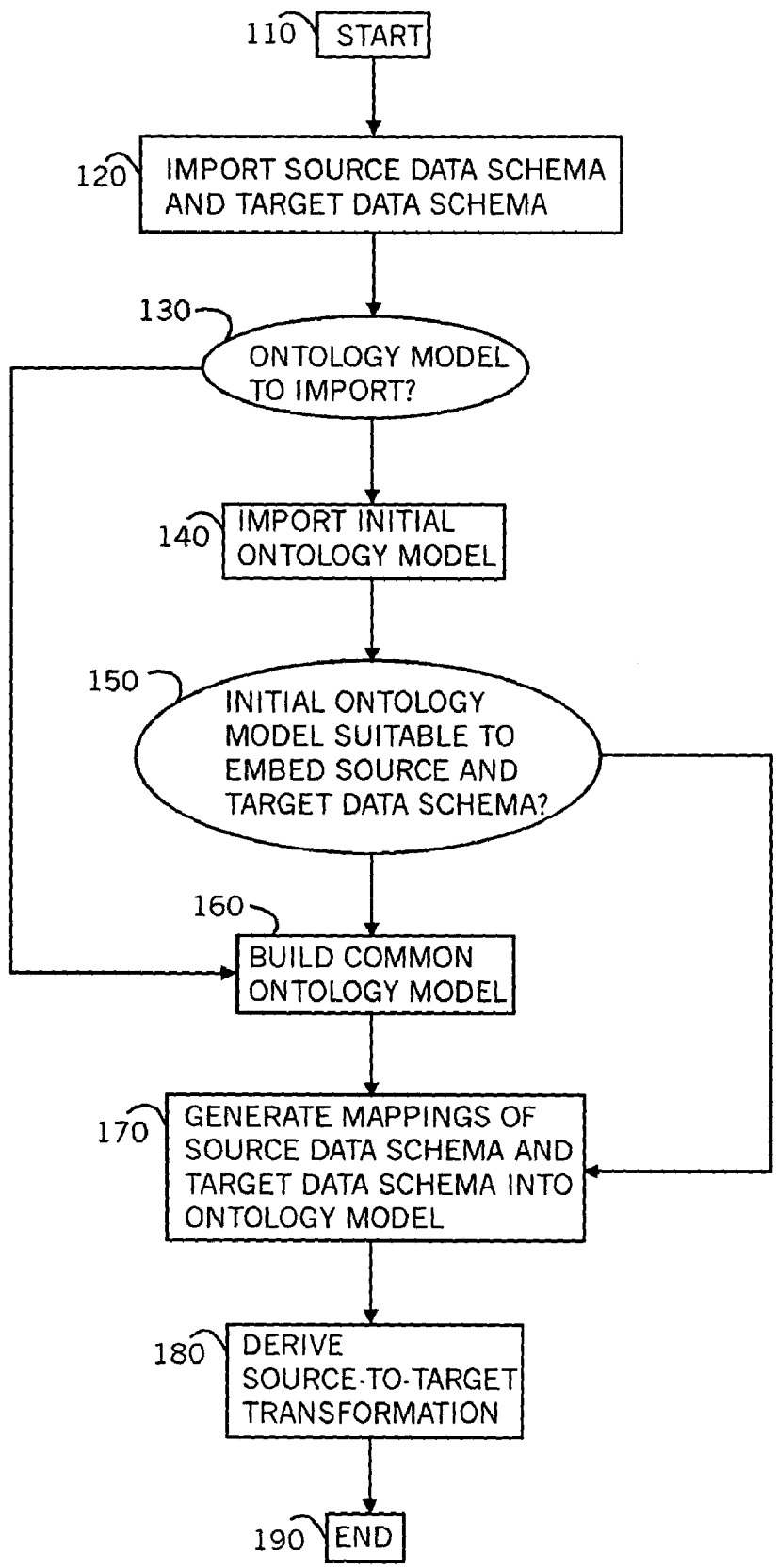
FIG. 1 is a simplified flowchart of a method for deriving transformations for transforming data from one schema to another, in accordance with a preferred embodiment of the present invention.

Reference is now made to FIG. 1, which is a simplified flowchart of a method for deriving transformations for transforming data from one schema to another, in accordance with a preferred embodiment of the present invention. The flowchart begins at step 110. At step, 120 a source data schema and a target data schema are imported. These data schema describe templates for storing data, such as templates for tables and table columns, and templates for structured documents. If necessary, the source data schema and/or the target data schema may be converted from a standard format to an internal format. For example, they may be converted from Oracle format to an internal format.

At steps 130-160 a common ontology model is obtained, into which the source data schema and the target data schema can both be embedded, At step 130 a determination is made as to whether or not an initial ontology model is to be imported. If not, logic passes directly to step 160. Otherwise, at step 140 an initial ontology model is imported. If necessary, the initial ontology model may be converted from a standard format, such as one of the formats mentioned hereinabove in the Background, to an internal format.

At step 150 a determination is made as to whether or not the initial ontology model is suitable for embedding both the source and target data schema. If so, logic passes directly to step 170. Otherwise, at step 160 a common ontology model is built. If an initial ontology model was exported, then the common ontology is preferably build by editing the initial ontology model; specifically, by adding classes and properties thereto. Otherwise, the common ontology model is built from scratch. It may be appreciated that the common ontology model may be built automatically with or without user assistance.

At step 170 the source and target data schema are mapped into the common ontology model, and mappings therefor are generated. At step 180 a transformation is derived for transforming data conforming with the source data schema into data conforming with the target data schema, based on the mappings derived at step 170. Finally, the flowchart terminates at step 190.

Figure 2:
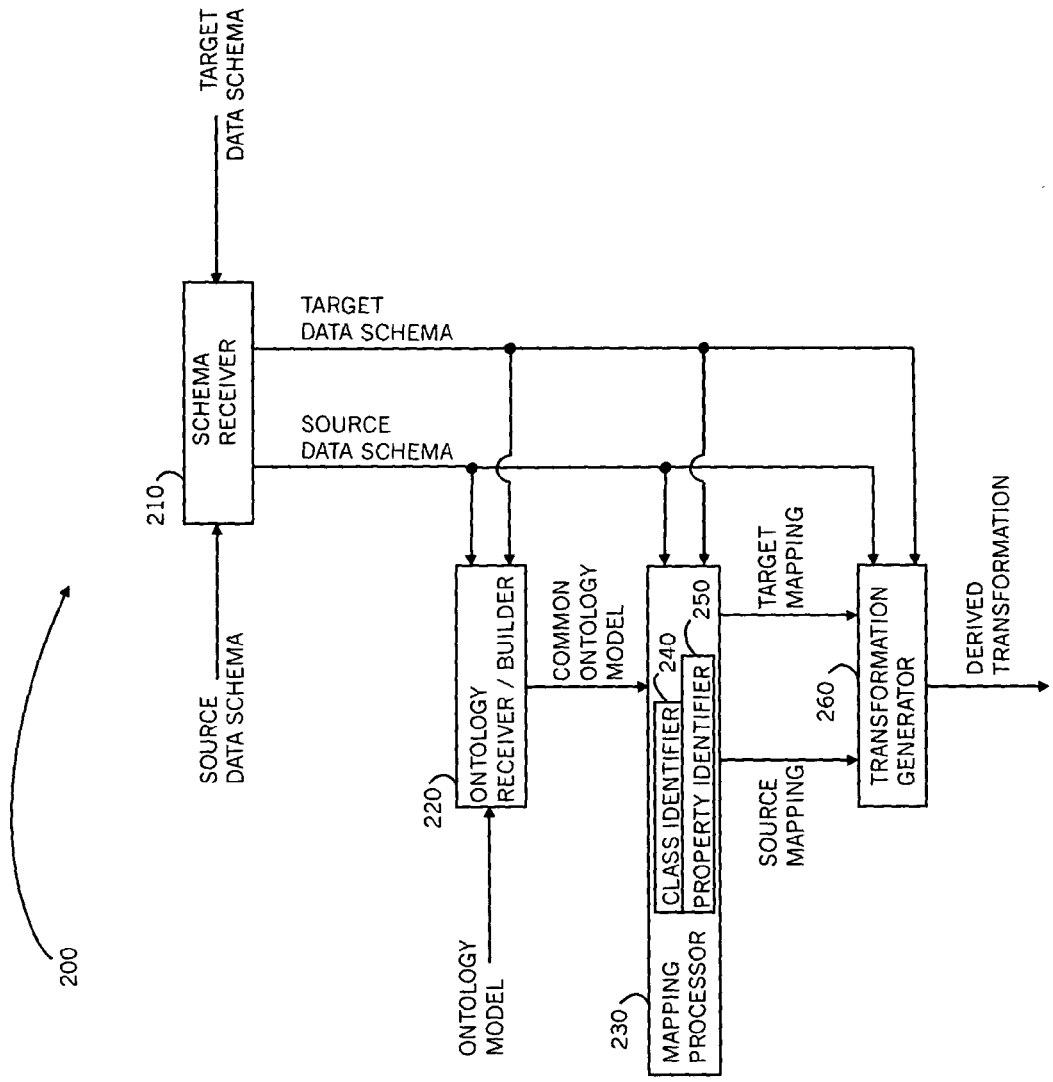
FIG. 2 is a simplified block diagram of a system for deriving transformations for transforming data from one schema to another, in accordance with a preferred embodiment of the present invention.

Reference is now made to FIG. 2, which is a simplified block diagram of a system 200 for deriving transformations for transforming data from one schema to another, in accordance with a preferred embodiment of the present invention. Shown in FIG. 2 is a schema receiver 210 for importing a source data schema and a target data schema. These data schema describe templates for storing data, such as templates for tables and table columns, and templates for structured documents. If necessary, schema receiver 210 converts the source and target data schema from an external format to an internal format.

Also shown in FIG. 2 is an ontology receiver/builder 220 for obtaining a common ontology model, into which the source data schema and the target data schema can both be embedded. The operation of ontology receiver/builder 220 is described hereinabove in steps 130-160 of FIG. 1.

The source and target data schema, and the common ontology model are used by a mapping processor 230 to generate respective source and target mappings, for mapping the source data schema into the common model and for mapping the target data schema into the common ontology model. In a preferred embodiment of the present invention, mapping processor 230 includes a class identifier 240 for identifying ontology classes with corresponding to components of the source and target data schema, and a property identifier 250 for identifying ontology properties corresponding to other components of the source and target data schema, as described in detail hereinbelow.

Preferably, the source and target mappings generated by mapping processor, and the imported source and target data schema are used by a transformation generator 260 to derive a source-to-target transformation, for transforming data conforming to the source data schema into data conforming to the target data schema.

Figure 3:
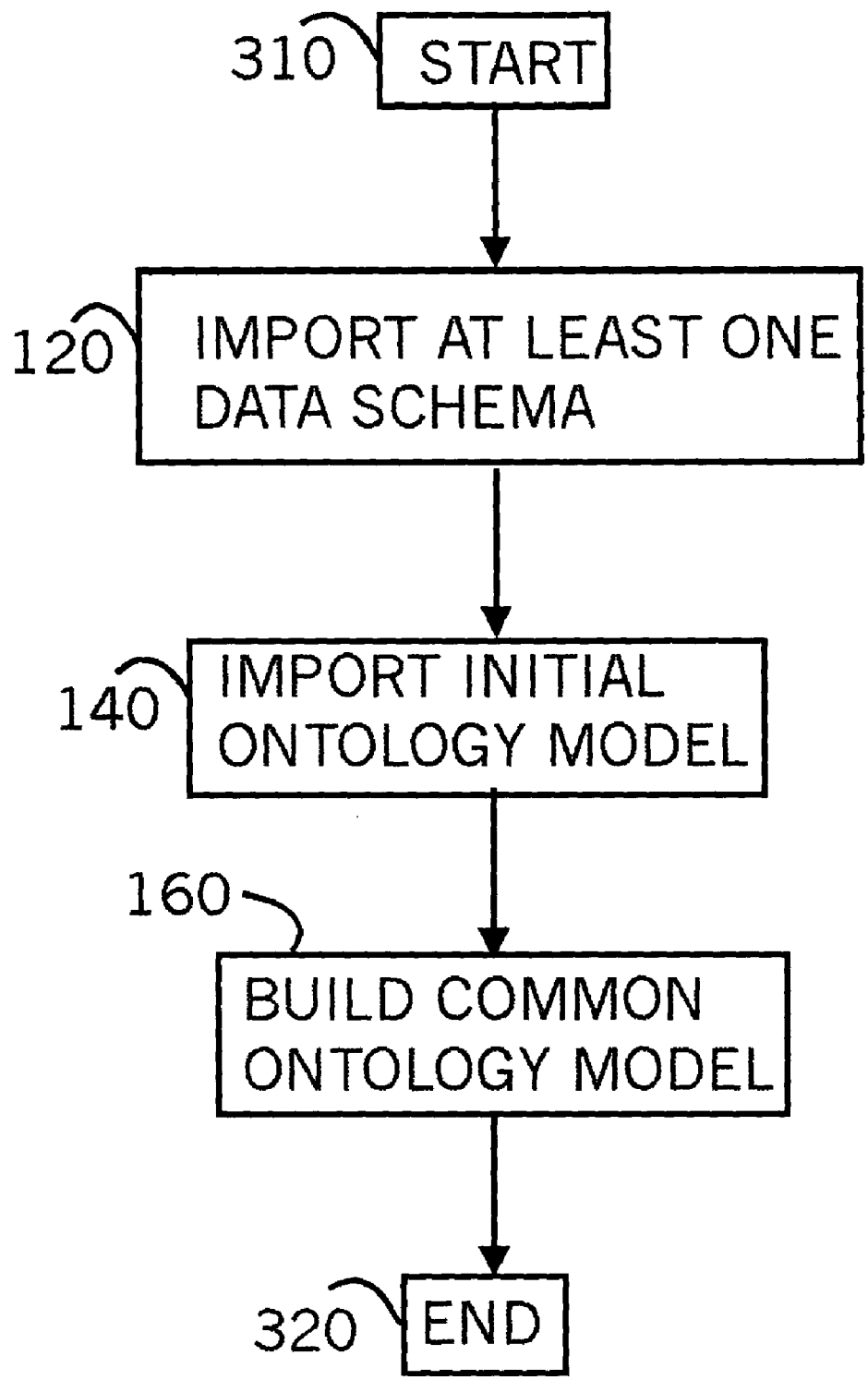
FIG. 3 is a simplified flowchart of a method for building a common ontology model into which one or more data schema can be embedded, in accordance with a preferred embodiment of the present invention.

Reference is now made to FIG. 3, which is a simplified flowchart of a method for building a common ontology model into which one or more data schema can be embedded, in accordance with a preferred embodiment of the present invention. The flowchart begins are step 310. Steps 120, 140 and 160 are similar to these same steps in FIG. 1, as described hereinabove. Finally, the flowchart terminates at step 320.

Figure 4:
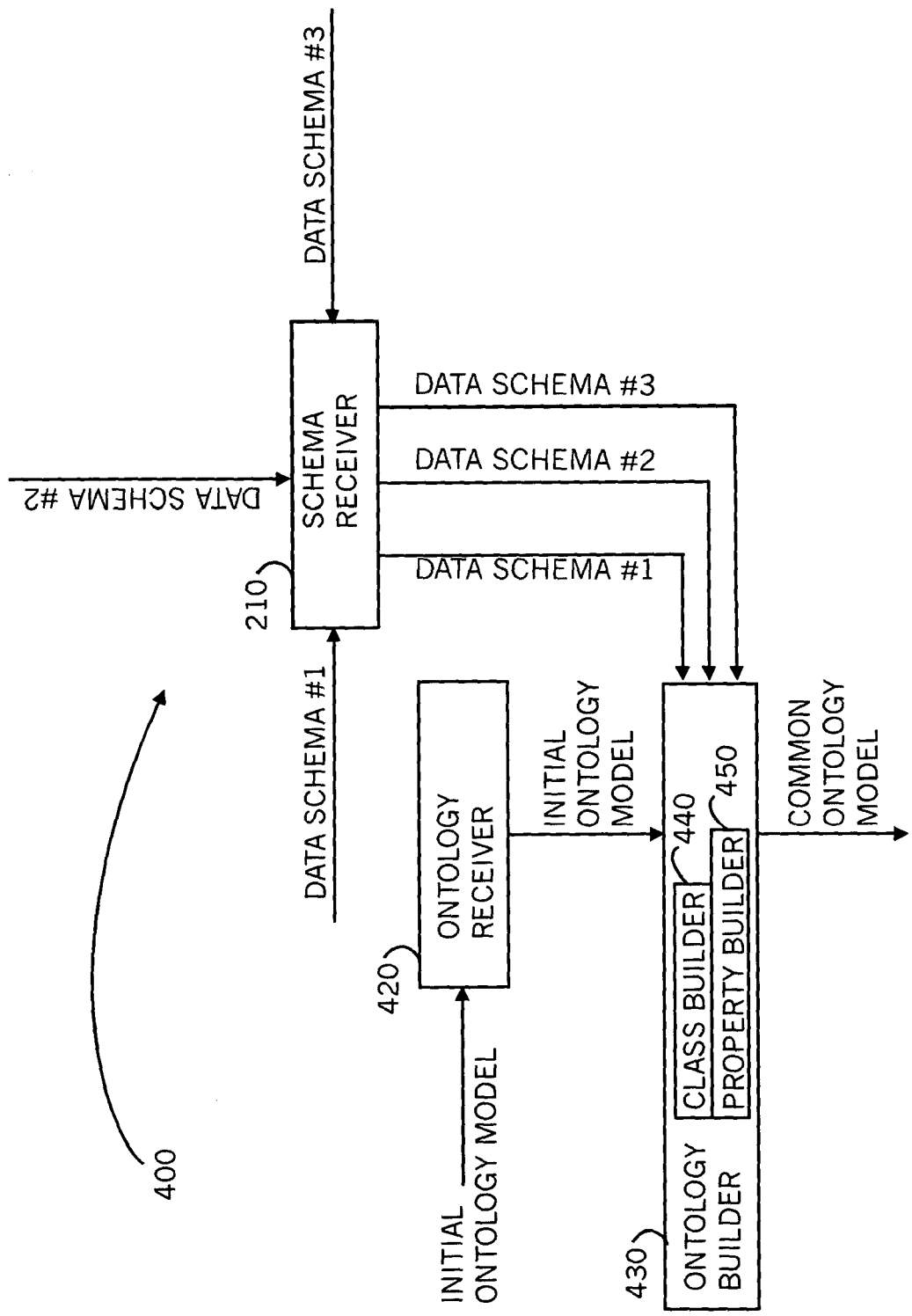
FIG. 4 is a simplified block diagram of a system for building a common ontology model into which one or more data schema can be embedded, in accordance with a preferred embodiment of the present invention.

Reference is now made to FIG. 4, which is a simplified block diagram of a system 400 for building a common ontology model into which one or more data schema can be embedded, in accordance with a preferred embodiment of the present invention. Shown in FIG. 4 is schema receiver 210 from FIG. 2 for importing data schema. Also shown in FIG. 4 is an ontology receiver 420, for importing an initial ontology model. If necessary, ontology receiver 420 converts the initial ontology model from an external format to an internal format.

The initial ontology model and the imported data schema are used by an ontology builder 430 for generating a common ontology model, into which the imported data schema can all be embedded. In a preferred embodiment of the present invention, ontology builder 430 generates the common ontology model by editing the initial ontology model; specifically, by using a class builder 440 to add classes thereto based on components of the imported data schema, and by using a property builder 450 to add properties thereto based on other components of the imported data schema.

Applications of the present invention include inter alia:
 integrating between two or more applications that need to share data;
 transmitting data from a database schema across a supply chain to a supplier or customer using a different database schema;
 moving data from two or more databases with different schemas into a common database, in order that queries may be performed across the two or more databases;

loading a data warehouse database for off-line analysis of data from multiple databases;

synchronizing two databases;

migrating data when a database schema is updated;

moving data from an old database or database application to a replacement database or database application, respectively.

Relational Database Schema

Relational database schema (RDBS), also referred to as table definitions or, in some instances, metadata, are used to define templates for organizing data into tables and table columns, also referred to as fields. Often multiple schema exist for the same source of data, and as such the data cannot readily be imported or exported from one application to another. The present invention describes a general method and system for transforming an input, or source relational database schema into an output, or target schema. In a preferred embodiment, the present invention can be used to provide an SQL query, which when applied to a relational database from the source schema, produces a relational database in the target schema.

As described in detail hereinbelow, the present invention preferably uses an ontology model to determine an SQL query that accomplishes a desired source to target transformation. Specifically, the present invention employs a common ontology model into which both the source RDBS and target RDBS can be mapped. By mapping the source and target RDBS into a common ontology model, the present invention derives interrelationships among their tables and fields, and uses the interrelationships to determine a suitable SQL query for transforming databases conforming with the source RDBS into databases conforming with the target RDBS.

The present invention can also be used to derive executable code that transforms source relational databases into the target relational databases. In a preferred embodiment, the present invention creates a Java program that executes the SQL query using the JDBC (Java Database Connectivity) library. In an alternative embodiment the Java program manipulates the databases directly, without use of an SQL query.

For enterprise applications, SQL queries generated by the present invention are preferably deployed within an Enterprise Application Integration infrastructure.

Although the source and target RDBS are mapped into a common ontology model, the derived transformations of the present invention go directly from source RDBS to target RDBS without having to transform data via an ontological format. In distinction, prior art Universal Data Model approaches transform via a neutral model.

The present invention applies to N relational database schema, where $N \geq 2$. Using the present invention, by mapping the RDBS into a common ontology model, data can be moved from any one of the RDBS to any other one.

In distinction to prior art approaches that require on the order of $N^2$ mappings, the present invention requires at most N mappings.

A "mapping" from an RDBS into an ontology model is defined as:

(i) an association of each table from the RDBS with a class in the ontology model, in such a way that rows of the table correspond to instances of the class; and (ii) for each given table from the RDBS, an association of each column of the table with a property or a composition of properties in the ontology model, the source of which is the class corresponding to the given table and the target of which has a data type that is compatible with the data type of the column.

A mapping from an RDBS into an ontology model need not be subjective. That is, there may be classes and properties in the ontology that do not correspond to tables and columns, respectively, in the RDBS. A mapping is useful in providing a graph representation of an RDBS.

In general, although a mapping from an RDBS into an ontology model may exist, the nomenclature used in the RDBS may differ entirely from that used in the ontology model. Part of the utility of the mapping is being able to translate between RDBS language and ontology language. It may be appreciated by those skilled in the art, that in addition to translating between RDBS table/column language and ontology class/property language, a mapping is also useful in translating between queries from an ontology query language and queries from an RDBS language such as SQL (standard query language).

Figure 5:
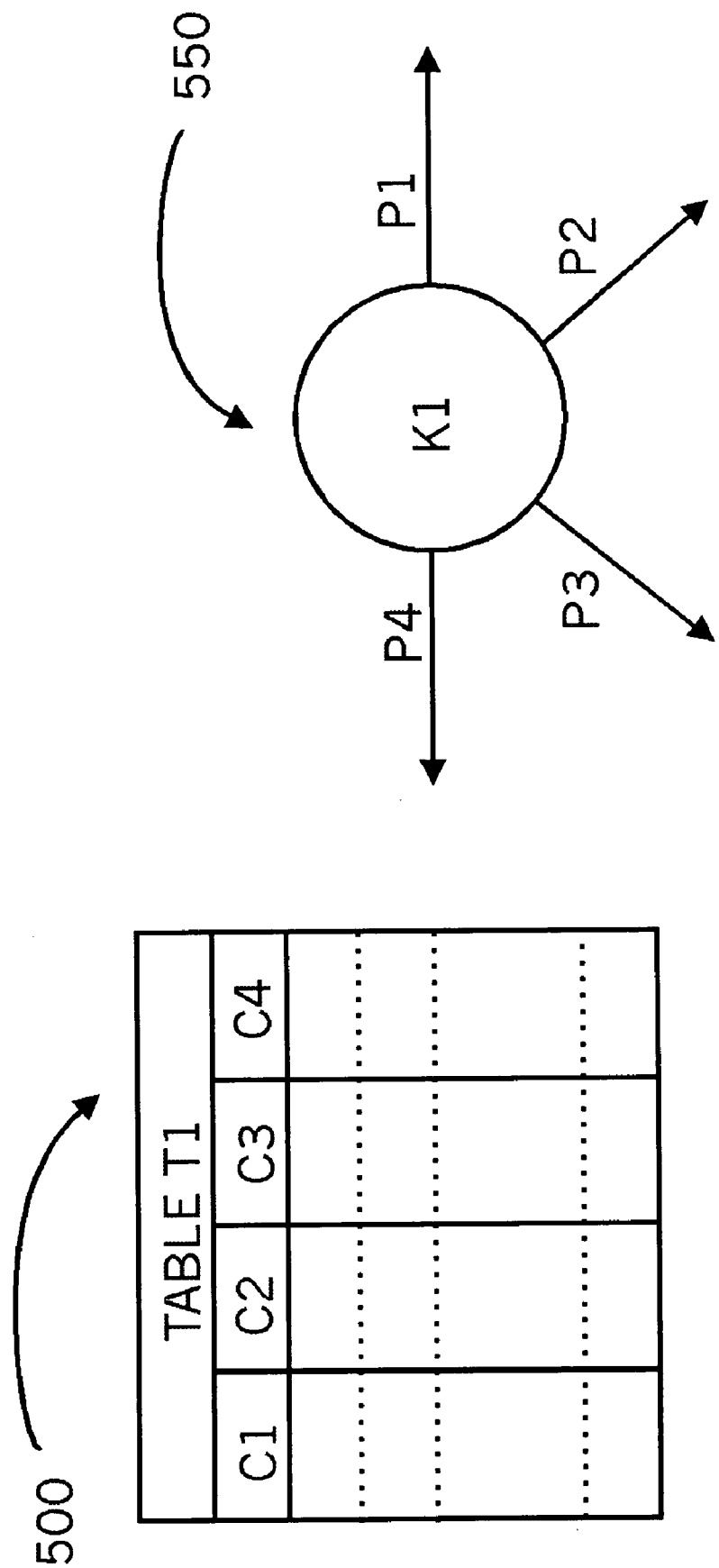
FIG. 5 is a simplified illustration of a mapping from an RDBS into an ontology model, in accordance with a preferred embodiment of the present invention.

Reference is now made to FIG. 5, which is a first simplified illustration of a mapping from an RDBS into an ontology model, in accordance with a preferred embodiment of the present invention. Shown in FIG. 5 is a table 500, denoted T1, having four columns denoted C1, C2, C3 and C4. Also shown in FIG. 5 is an ontology model 550 having a class denoted K1 and properties P1, P2, P3 and P4 defined on class T1. The labeling indicates a mapping from table T1 into class K1, and from columns C1, C2, C3 and C4 into respective properties P1, P2, P3 and P4.

Figure 6:
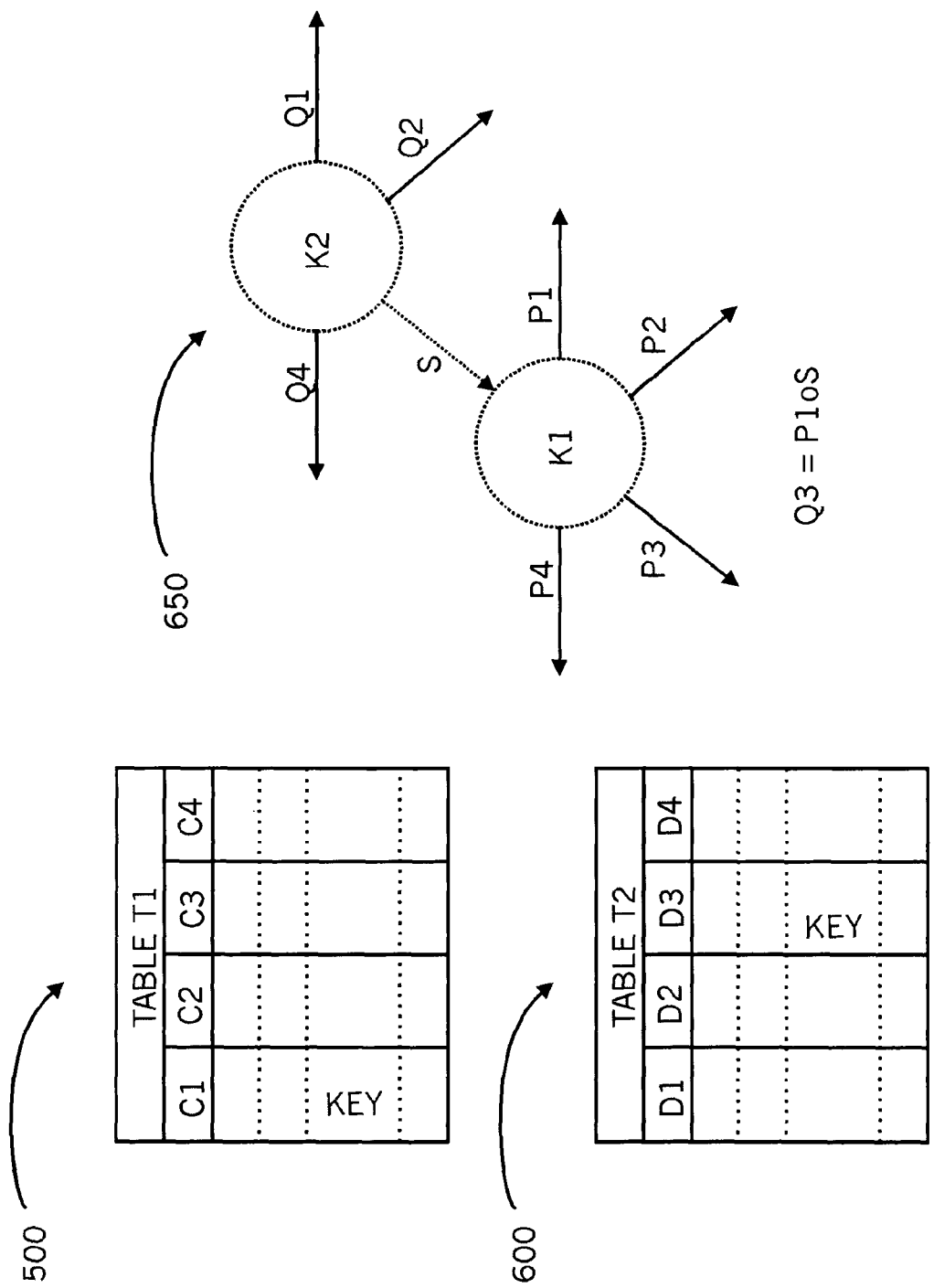
FIG. 6 is a second simplified illustration of a mapping from an RDBS into an ontology model, in accordance with a preferred embodiment of the present invention.

Reference is now made to FIG. 6, which is a second simplified illustration of a mapping from an RDBS into an ontology model, in accordance with a preferred embodiment of the present invention. Shown in FIG. 6 are table T1 from FIG. 5, and a second table 600, denoted T2, having four columns denoted D1, D2, D3 and D4. Column C1 of table T1 is a key; i.e., each entry for column C1 is unique, and can be used as an identifier for the row in which it is situated. Column D3 of table T2 refers to table T1, by use of the key from column C1. That is, each entry of column D3 refers to a row within table T1, and specifies such row by use of the key from C1 for the row.

Also shown in FIG. 6 is an ontology model 650 having two classes, denoted K1 and K2. Class K1 has properties P1, P2, P3 and P4 defined thereon, and class K2 has properties Q1, Q2, Q4 and S defined thereon. Property S has as its source class K1 and as its target class K2. The labeling indicates a mapping from table T1 into class K1, and from columns C1, C2, C3 and C4 into respective properties P1, P2, P3 and P4. The fact that C1 serves as a key corresponds to property P1 being one-to-one, so that no two distinct instances of class K1 have the same values for property P1.

The labeling also indicates a mapping from table T2 into class K2, and from columns D1, D2 and D4 into respective properties Q1, Q2 and Q4. Column D3 corresponds to a composite property P1oS, where o denotes function composition. In other words, column D3 corresponds to property P1 of S(K2).

The targets of properties P1, P2, P3, P4, Q1, Q2 and Q4 are not shown in FIG. 6, since these properties preferably map into fundamental types corresponding to the data types of the corresponding columns entries. For example, the target of P1 may be an integer, the target of P2 may be a floating point number, and the target of P3 may be a character string. Classes for such fundamental types are not shown in order to focus on more essential parts of ontology model 650.

Classes K1 and K2, and property S are indicated with dotted lines in ontology model 650. These parts of the ontology are transparent to the RDBS underlying tables T1 and T2. They represent additional structure present in the ontology model which is not directly present in the RDBS.

Given a source RDBS and a target RDBS, in a preferred embodiment of the present invention an appropriate transformation of source to target RDBS is generated by:

(i) mapping the source and target RDBS into a common ontology model;
(ii) representing fields of the source and target RDBS in terms of properties of the ontology model, using symbols for properties;
(iii) deriving expressions for target symbols in terms of source symbols; and
(iv) converting the expressions into one or more SQL queries.

Figure 7:
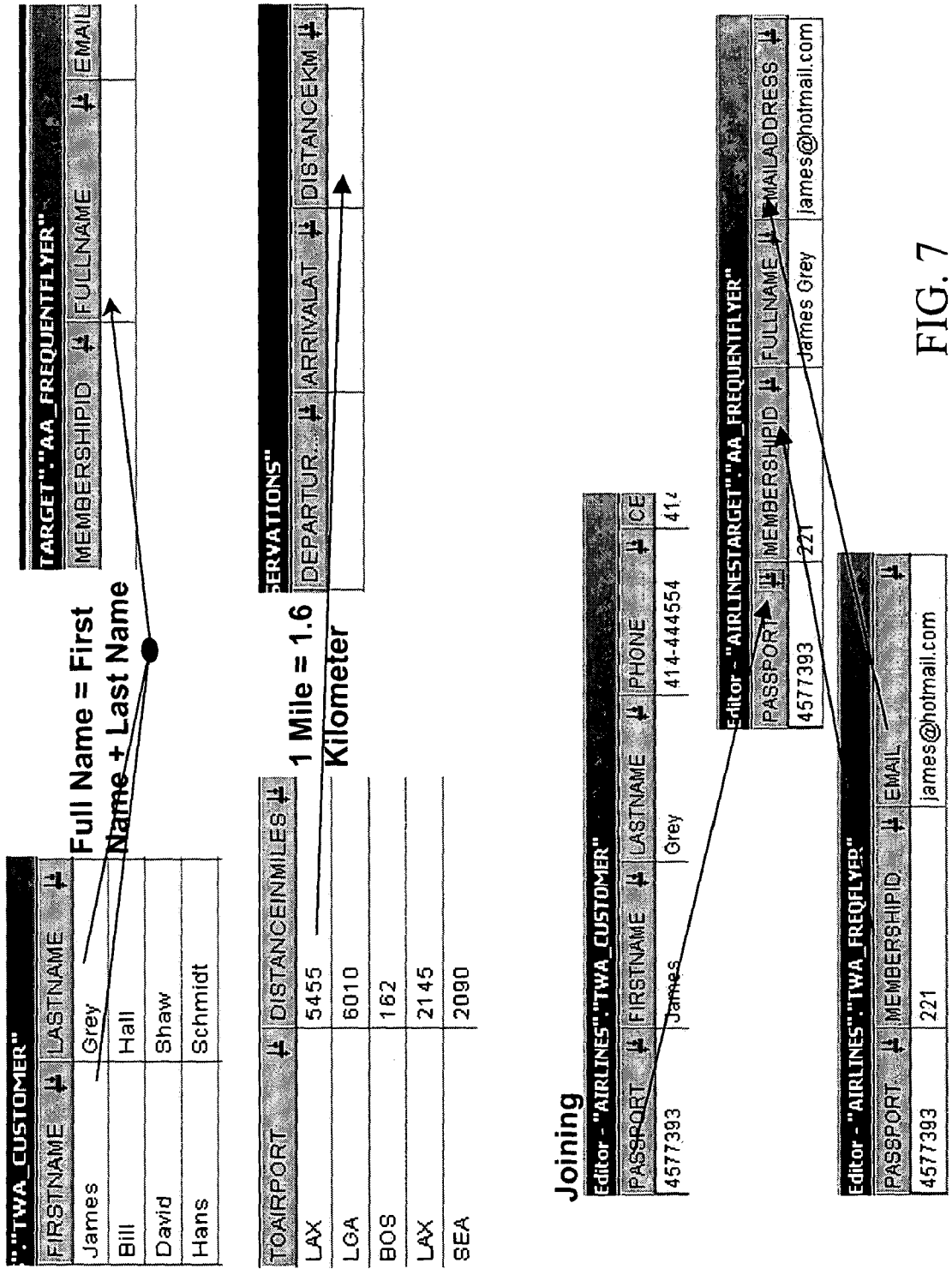
FIG. 7 is a simplified illustration of relational database transformations involving constraints and joins, in accordance with a preferred embodiment of the present invention.

Reference is now made to FIG. 7, which is a simplified illustration of relational database transformations involving constraints and joins, in accordance with a preferred embodiment of the present invention.

XML Schema

As described in detail hereinbelow, the present invention preferably uses an ontology model to determine an XSLT transformation that accomplishes a desired source to target transformation. Specifically, the present invention employs a common ontology model into which both the source XML schema and target XML schema can be mapped. By mapping the source and target XML schema into a common ontology model, the present invention derives interrelationships among their elements and attributes, and uses the interrelationships to determine suitable XSLT script for transforming and generating documents conforming with the target XML schema from documents conforming with the source XML schema.

The present invention can also be used to derive executable code that transforms source XML documents into the target XML documents. In a preferred embodiment, the present invention packages the derived XSLT script with a Java XSLT engine to provide an executable piece of Java code that can execute the transformation.

Preferably, this is used to deploy XSLTs within an EAI product such as Tibco. Specifically, in a preferred embodiment of the present invention, a function (similar to a plug-in) is installed in a Tibco MessageBroker, which uses the Xalan XSLT engine to run XSLT scripts that are presented in text form. As an optimization, the XSLT script files are preferably compiled to Java classfiles.

Figure 8:
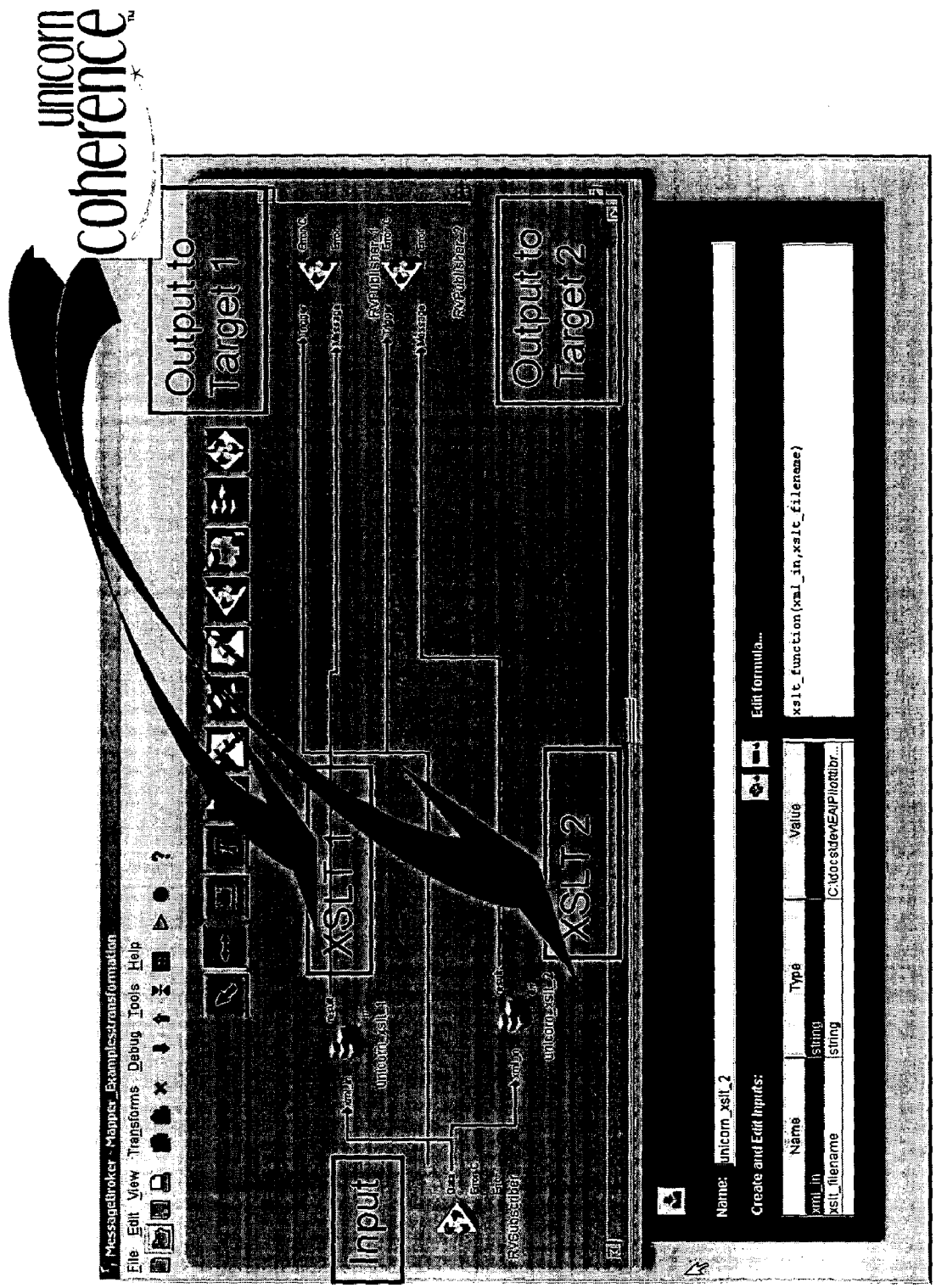
FIG. 8 is a simplified illustration of use of a preferred embodiment of the present invention to deploy XSLT scripts within an EAI product such as Tibco.

Reference is now made to FIG. 8, which is a simplified illustration of use of a preferred embodiment of the present invention to deploy XSLT scripts within an EAI product such as Tibco.

User Interface

Applicant has developed a software application, named COHERENCE™, which implements a preferred embodiment of the present invention to transform data from one schema to another. Coherence enables a user to import source and target RDBS;
to build an ontology model into which both the source and target RDBS can be mapped;
to map the source and target RDBS into the ontology model; and
to impose constraints on properties of the ontology model.

Once the mappings are defined, Coherence generates an SQL query to transform the source RDBS into the target RDBS.

Figure 9A:
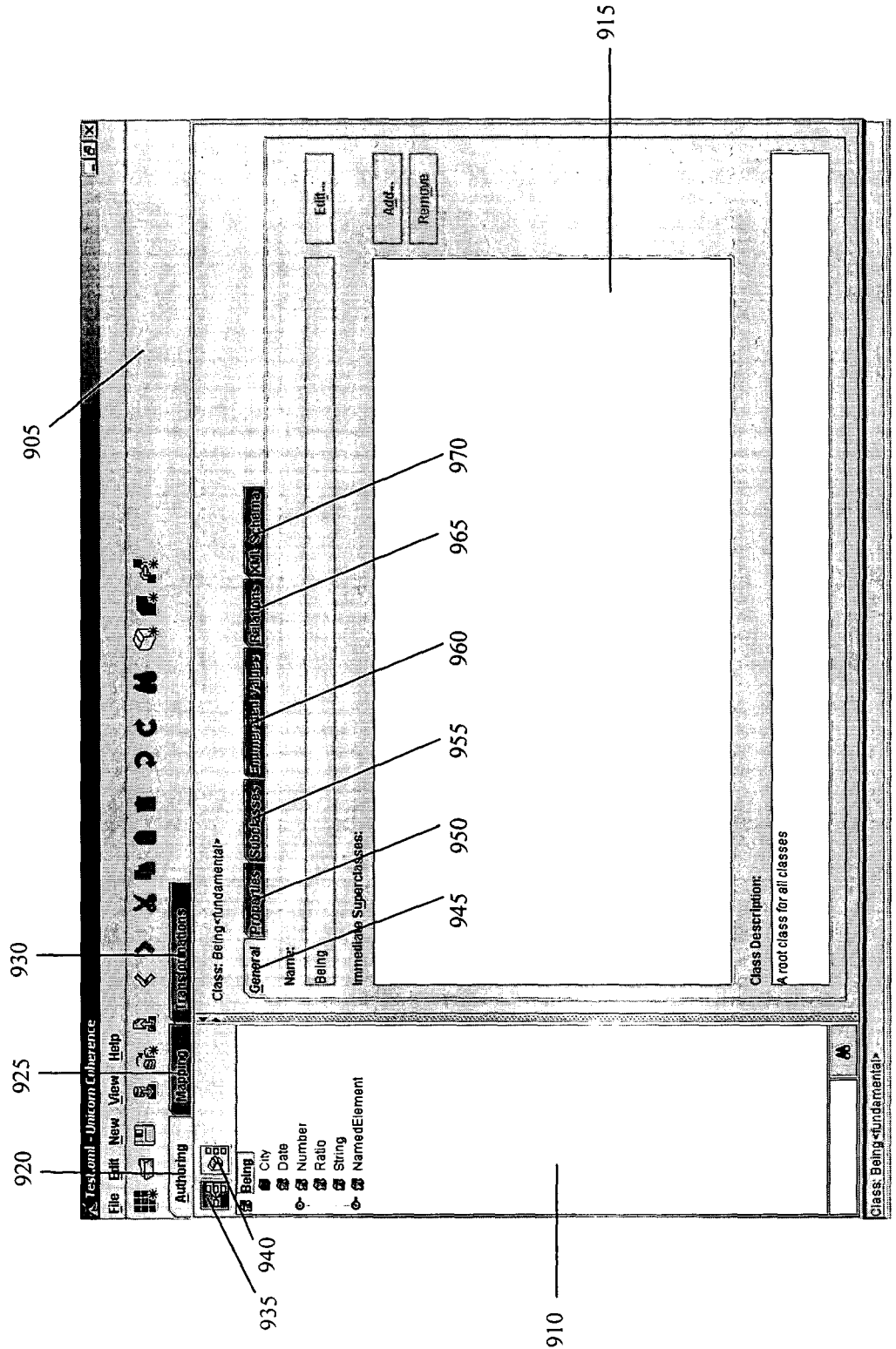
FIGS. 9A-9E are illustrations of a user interface for a software application that transforms data from one relational database schema to another, in accordance with a preferred embodiment of the present invention.

Reference is now made to FIGS. 9A-9E, which are illustrations of a user interface for transforming data from one relational database schema to another using the Coherence software application, in accordance with a preferred embodiment of the present invention. Shown in FIG. 9A is a main Coherence window 905 with a left pane 910 and a right pane 915. Window 905 includes three primary tabs 920, 925 and 930, labeled Authoring, Mapping and Transformations, respectively. Authoring tab 920 is invoked in order to display information about the ontology model, and to modify the model by adding, deleting and editing classes and properties. Mapping tab 925 is invoked in order to display information about the RDBS and the mappings of the RDBS into the ontology, and to edit the mappings. Transformations tab 930 is invoked to display transformations in the form of SQL queries, from a source RDBS into a target RDBS. In FIG. 9A, tab 920 for Authoring is shown selected.

Left pane 910 includes icons for two modes of viewing an ontology: icon 935 for viewing in inheritance tree display mode, and icon 940 for viewing in package display mode.

Inheritance tree display mode shows the classes of the ontology in a hierarchical fashion corresponding to superclass and subclass relationships. As illustrated in FIG. 9A, in addition to the fundamental classes for Date, Number, Ratio, String and NamedElement, there is a class for City. Corresponding to the class selected in left pane 910, right pane 915 displays information about the selected class. Right pane 915 includes six tabs for class information display: tab 945 for General, tab 950 for Properties, tab 955 for Subclasses, tab 960 for Enumerated Values, tab 965 for Relations and tab 970 for XML schema. Shown in FIG. 9A is a display under tab 945 for General. The display includes the name of the class, Being, and the package to which it belongs; namely, fundamental. Also shown in the display is a list of immediate superclasses, which is an empty list for class Being. Also shown in the display is a textual description of the class; namely, that Being is a root class for all classes.

Tab 960 for Enumerated Values applies to classes with named elements; i.e., classes that include a list of all possible instances. For example, a class Boolean has enumerated values "True" and "False," and a class Gender may have enumerated values "Male" and "Female."

Figure 9B:
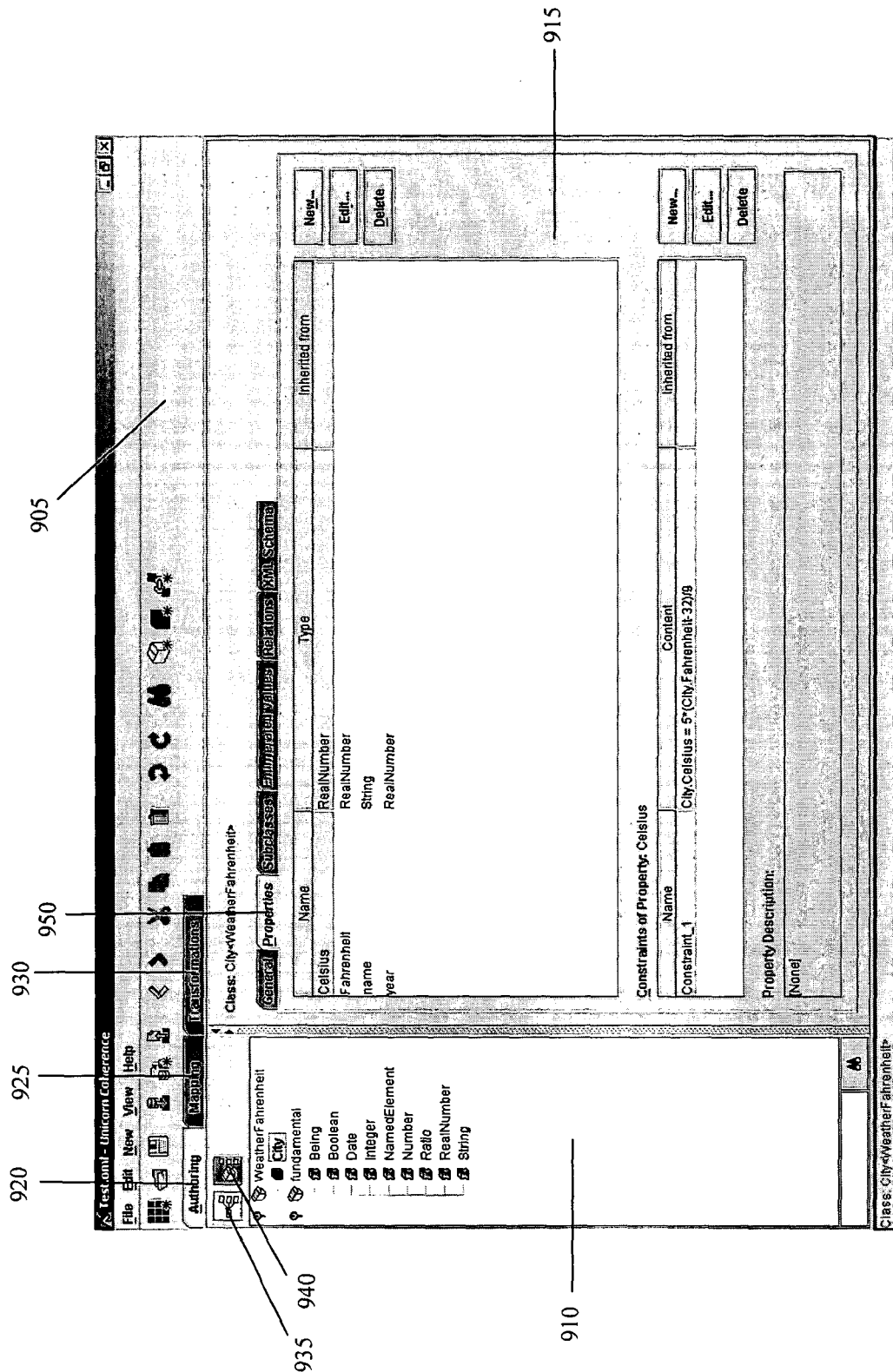

FIG. 9B illustrates package display mode for the ontology. Packages are groups including one or more ontology concepts, such as classes, and properties. Packages are used to organize information about an ontology into various groupings. As illustrated in FIG. 9B, there is a fundamental package that includes fundamental classes, such as Being, Boolean, Date and Integer. Also shown in FIG. 9B is a package named WeatherFahrenheit, which includes a class named City.

As shown in FIG. 9B, City is selected in left pane 910 and, correspondingly, right pane 915 displays information about the class City. Right pane 915 display information under Tab 950 for Properties. As can be seen, class City belongs to the package WeatherFahrenheit, and has four properties; namely, Celsius of type RealNumber, city of type String, Fahrenheit of type RealNumber and year of type RealNumber. FIG. 9B indicates that the property Celsius satisfies a constraint. Specifically, Celsius=5*(Fahrenheit−32)/9.

Figure 9C:
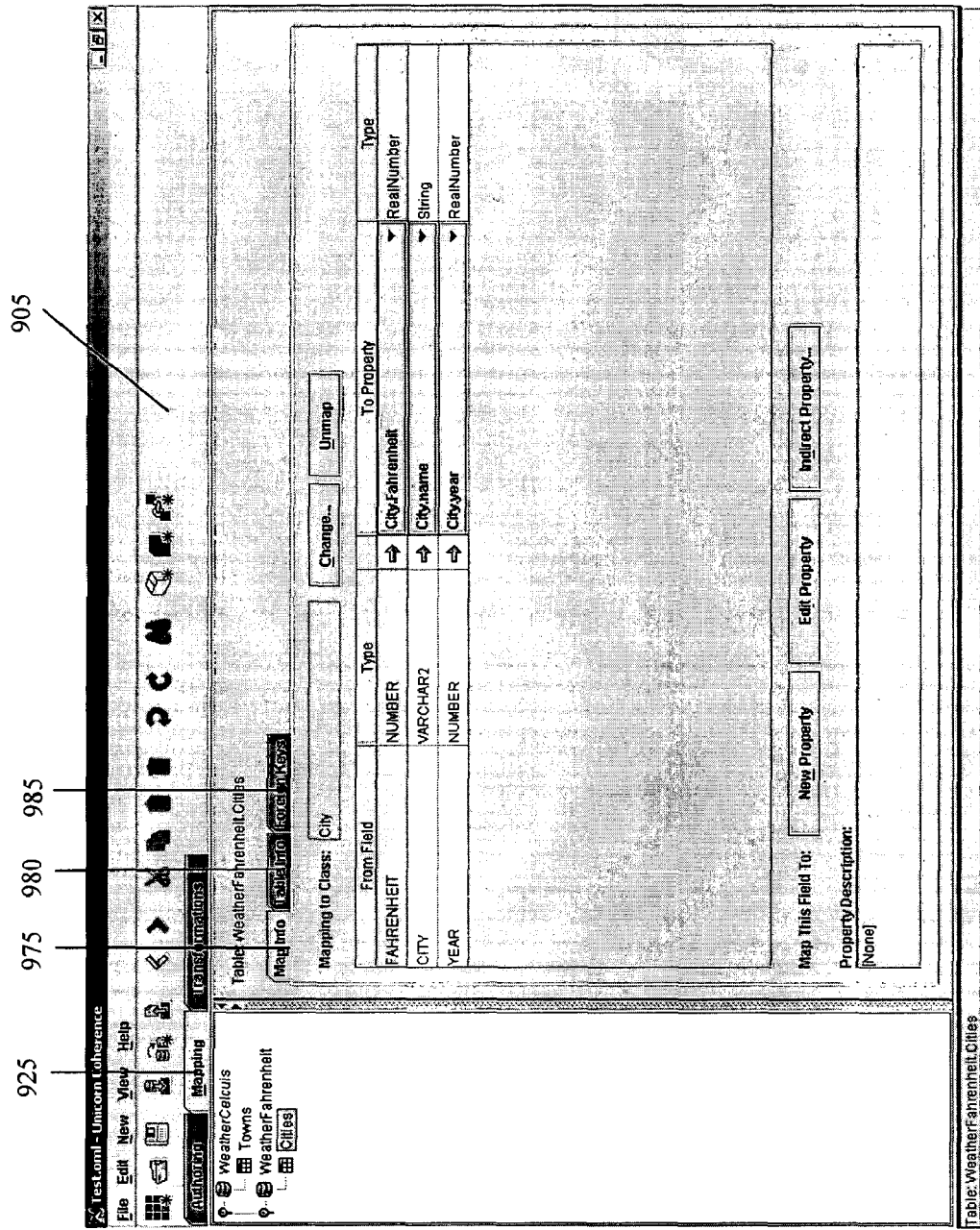

In FIG. 9C, the tab 925 for Mapping is shown selected. As shown in the left pane of FIG. 9C, two RDBS have been imported into Coherence. A first RDBS named WeatherCelsius, which includes a table named Towns, and a second RDBS named WeatherFahrenheit, which includes a table named Cities.

The table named Cities is shown selected in FIG. 9C, and correspondingly the right pane display information regarding the mapping of Cities into the ontology. As can be seen, the table Cities contains three fields; namely, Fahrenheit, city and year. The table Cities has been mapped into the ontology class City, the field Fahrenheit has been mapped into the ontology property Fahrenheit, the field city has been mapped into the ontology property name, and the field year has been mapped into the ontology property year. The RDBS WeatherFahrenheit will be designated as the source RDBS.

When tab 925 for Mapping is selected, the right pane includes three tabs for displaying information about the RDBS: tab 975 for Map Info, tab 980 for Table Info and tab 985 for Foreign Keys.

Figure 9D:
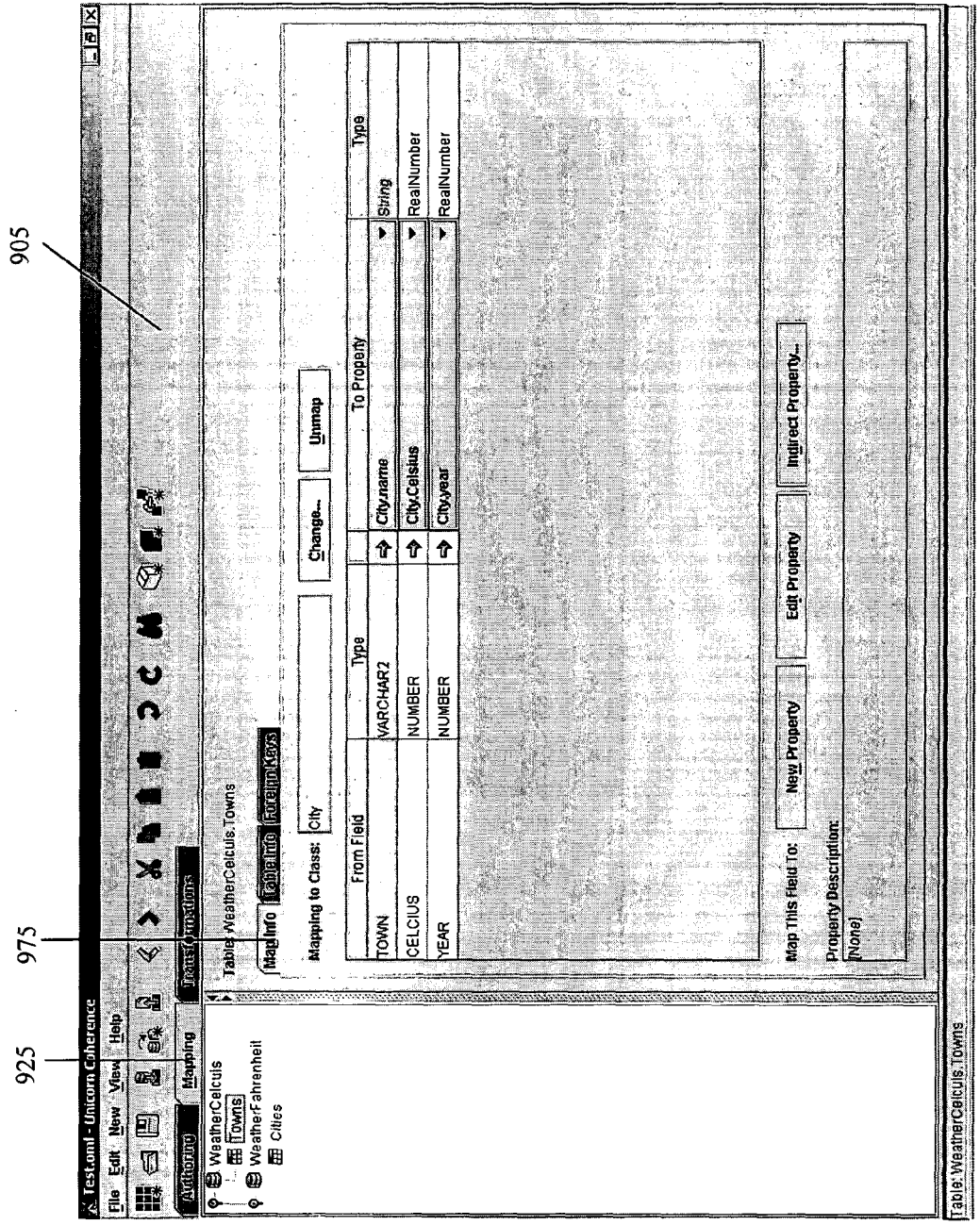

The RDBS named WeatherCelsius is displayed in FIG. 9D. As can be seen, the table Towns contains three fields; namely, town, Celcius and year. The table Towns has been mapped into the ontology class City, the field town has been mapped into the ontology property name, the field Celcius has been mapped into the ontology property Celcius, and the field year had been mapped into the ontology property year. The RDBS WeatherCelcius will be designated as the target RDBS.

As such, the target RDBS is

TABLE I

| Towns | | |
|---|---|---|
| Town | Celcius | Year | and the source RDBS is

TABLE II

| Cities | | |
|---|---|---|
| Fahrenheit | City | Year |

Figure 9E:
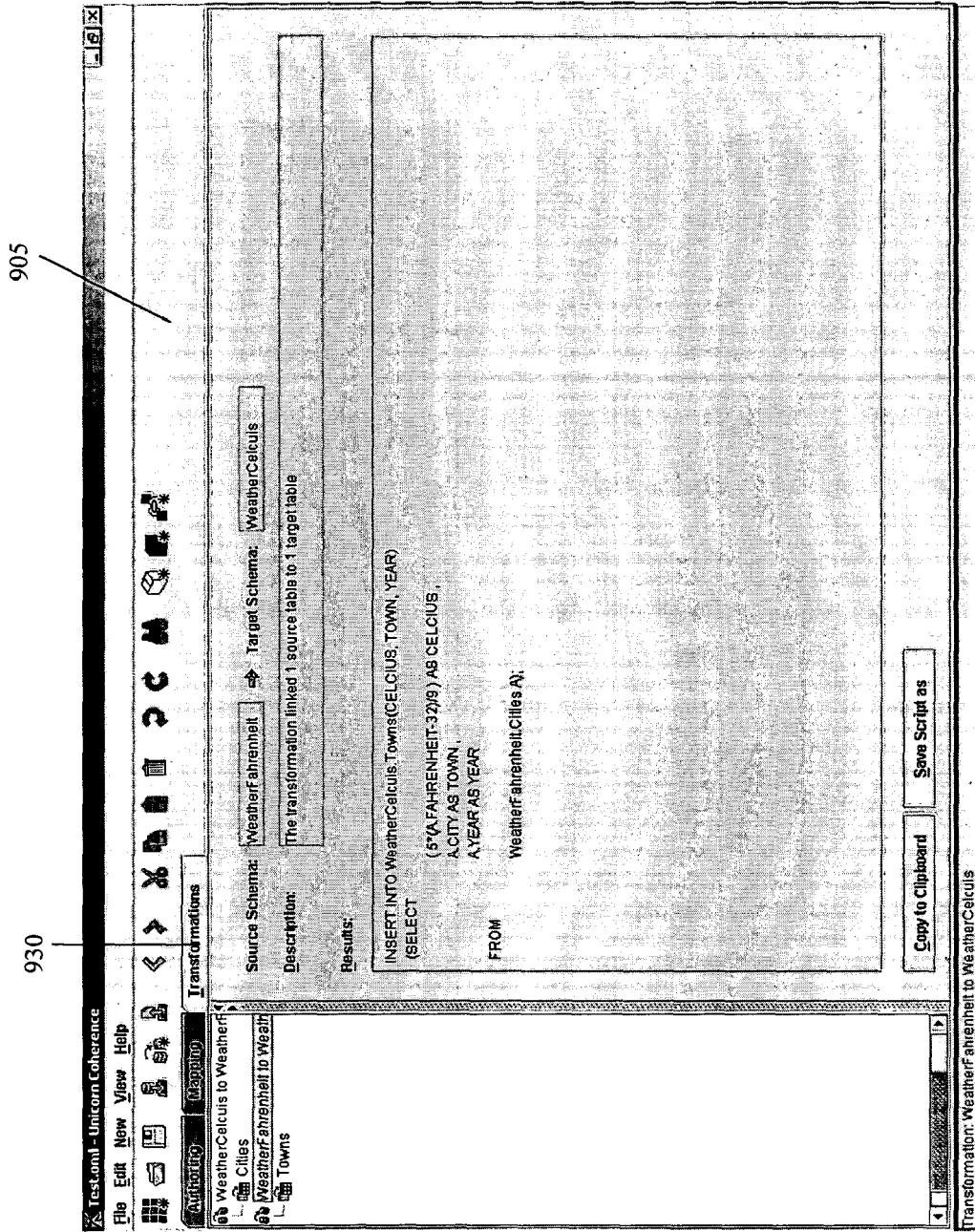

In FIG. 9E, the tab 930 for Transformations is shown selected. As can be seen in the right pane, the source table is Cities and the target table is Towns. The SQL query

```
INSERT INTO WeatherCelcius.Towns(CELCIUS, TOWN, YEAR)
(SELECT
            (5 * (A.FAHRENHEIT - 32)/9) AS CELCIUS,
            A.CITY AS TOWN,
            A.YEAR AS YEAR
 FROM
            WeatherFahrenheit.Cities A);
``` accomplishes the desired transformation.

Figure 10:
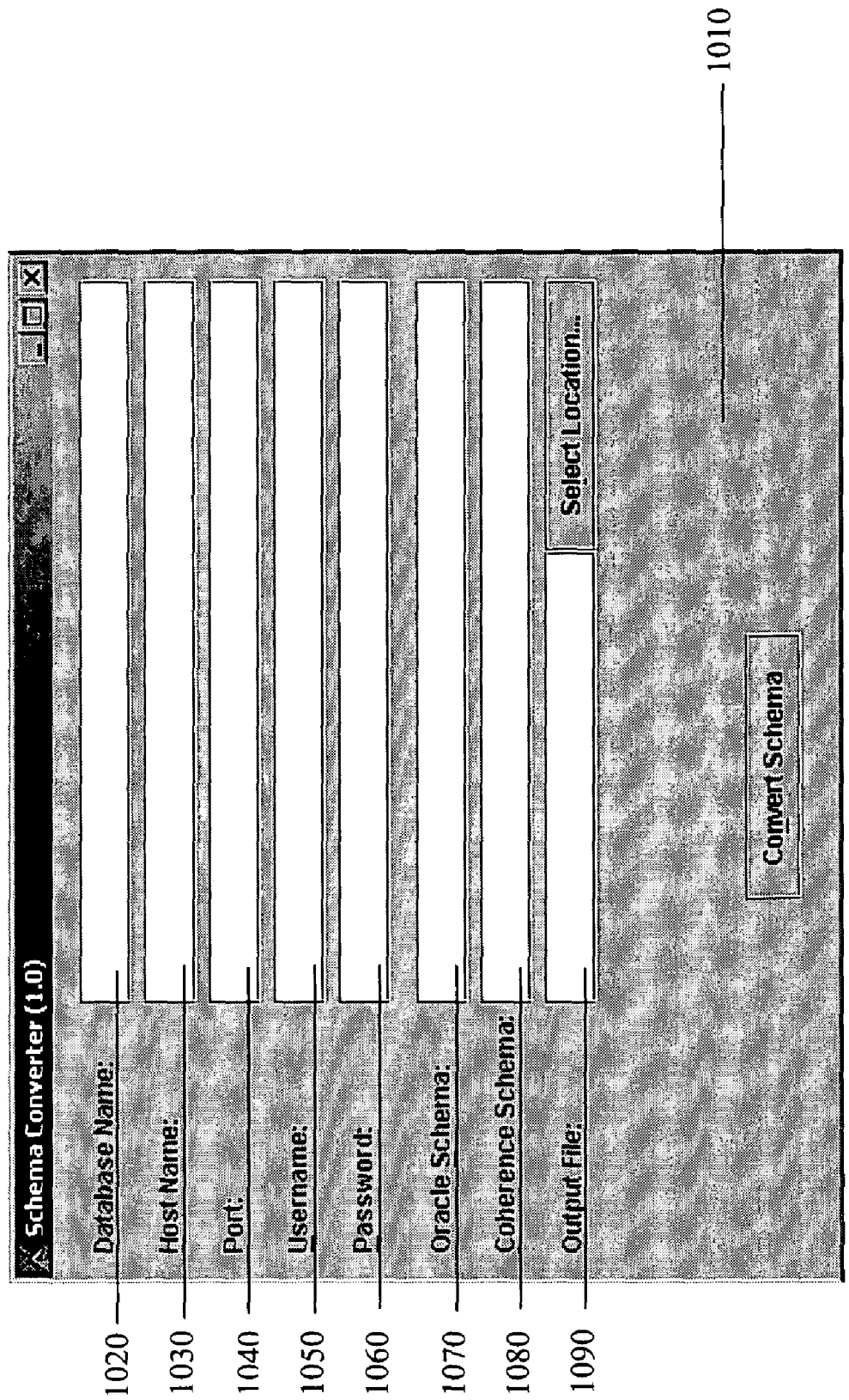
FIG. 10 is an illustration of a user interface for an application that imports an RDBS into the software application illustrated in FIGS. 8A-8E, in accordance with a preferred embodiment of the present invention.

Reference is now made to FIG. 10, which is an illustration of a user interface for an application that imports an RDBS into Coherence, in accordance with a preferred embodiment of the present invention. Shown in FIG. 10 is a window 1010 for a schema convertor application. Preferably, a user specifies the following fields:

Database Name 1020: What Oracle refers to as an SID (System Identifier).

Host Name 1030: The name of an Oracle 8i server (or Global Database Name).

Port 1040: Port number

Username 1050: The username of a user with privileges to the relevant schemas.

Password 1060: The password of the user with privileges to the relevant schemas.

Oracle schema 1070: The schema or database in Oracle to be converted to .SML format. The .SML format is an internal RDBS format used by Coherence. When importing more than one schema, a semicolon (;) is placed between schema names.

Coherence schema 2080: The label identifying the RDBS that is displayed on the Mapping Tab in Coherence. This field is optional; if left blank, the Oracle schema name will be used.

Output File 1090: A name for the .SML file generated.

Figure 11A:
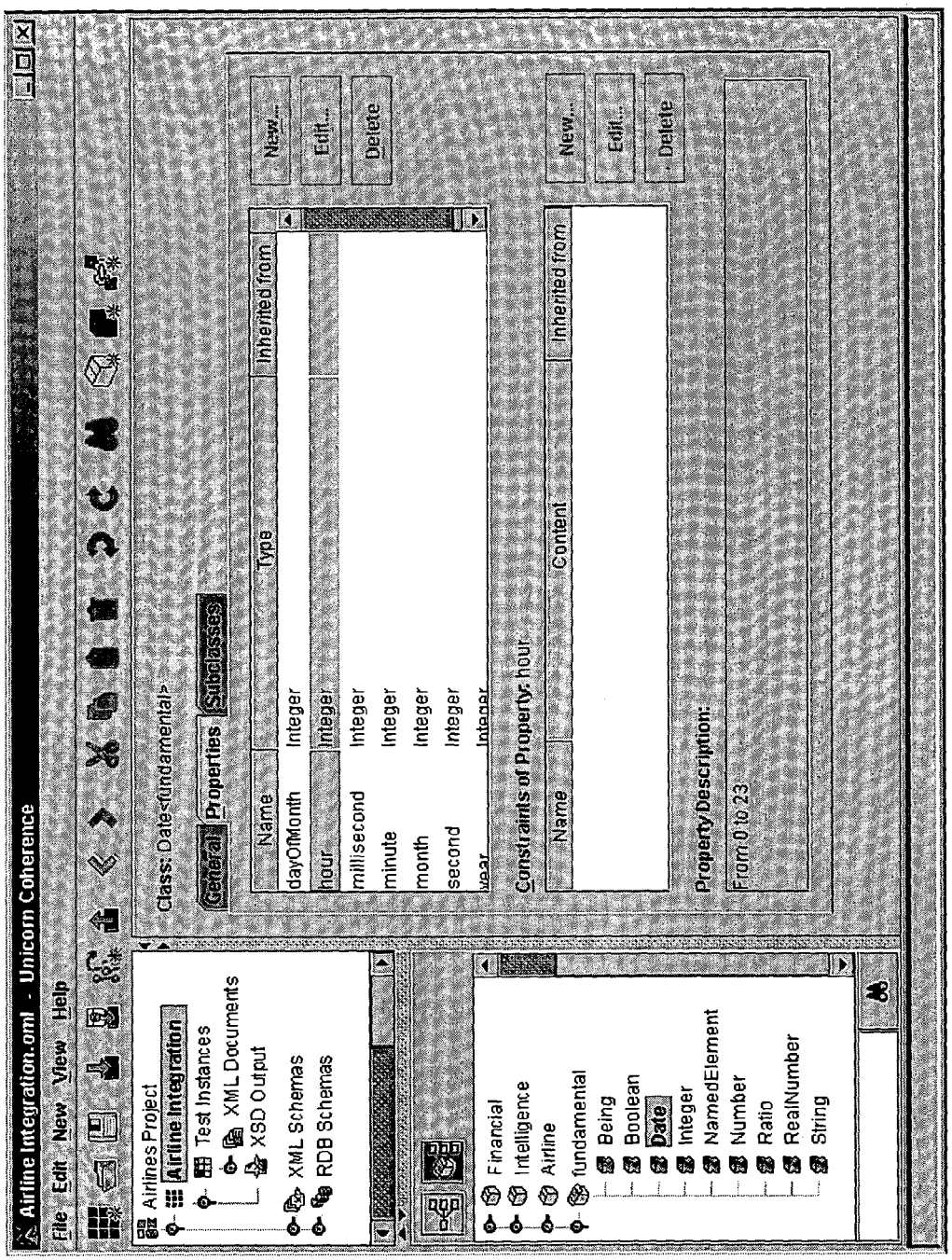
FIGS. 11A-11R are illustrations of a user interface for a software application that transforms data from one XML schema to another, in accordance with a preferred embodiment of the present invention.
Figure 11B:
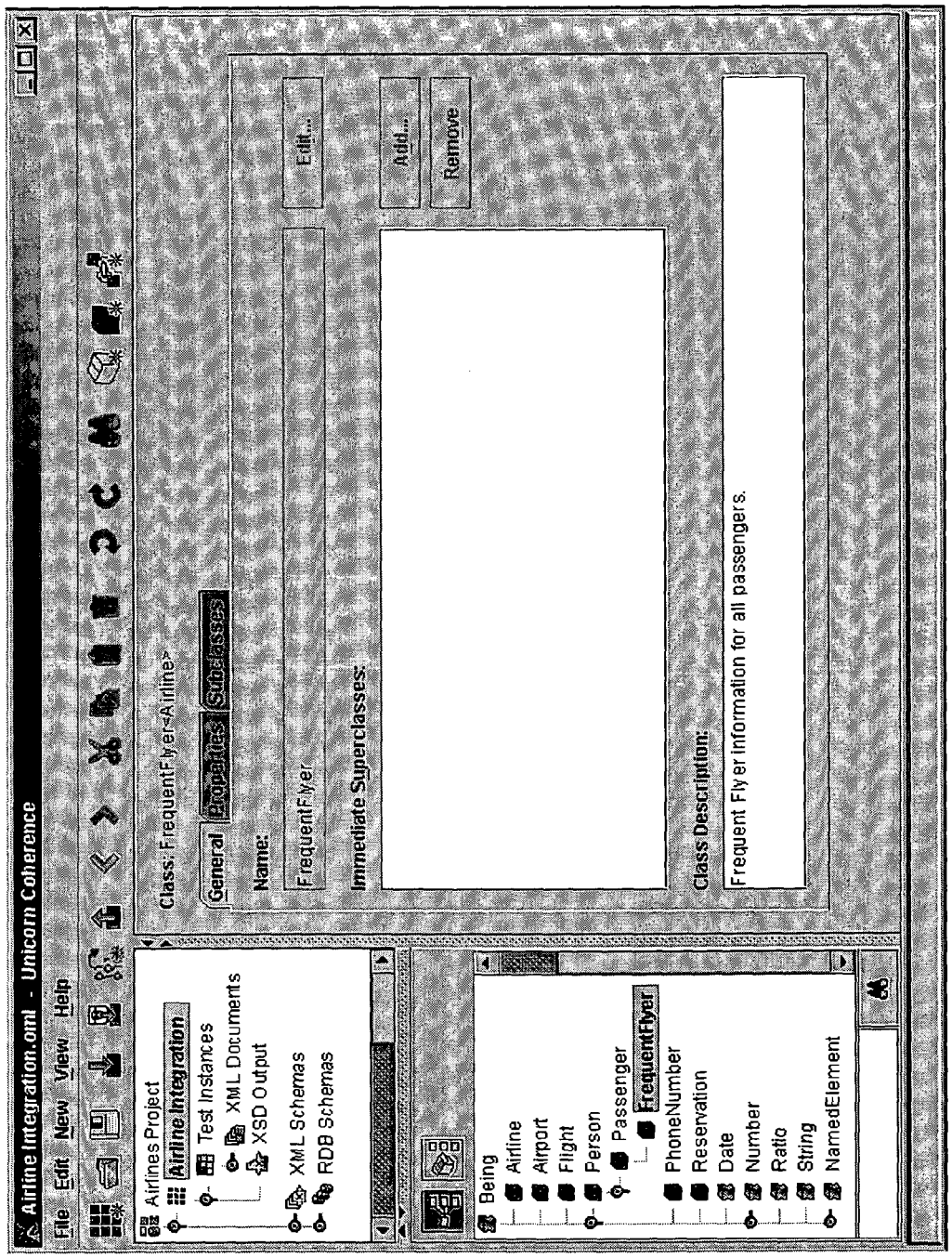
Figure 11C:
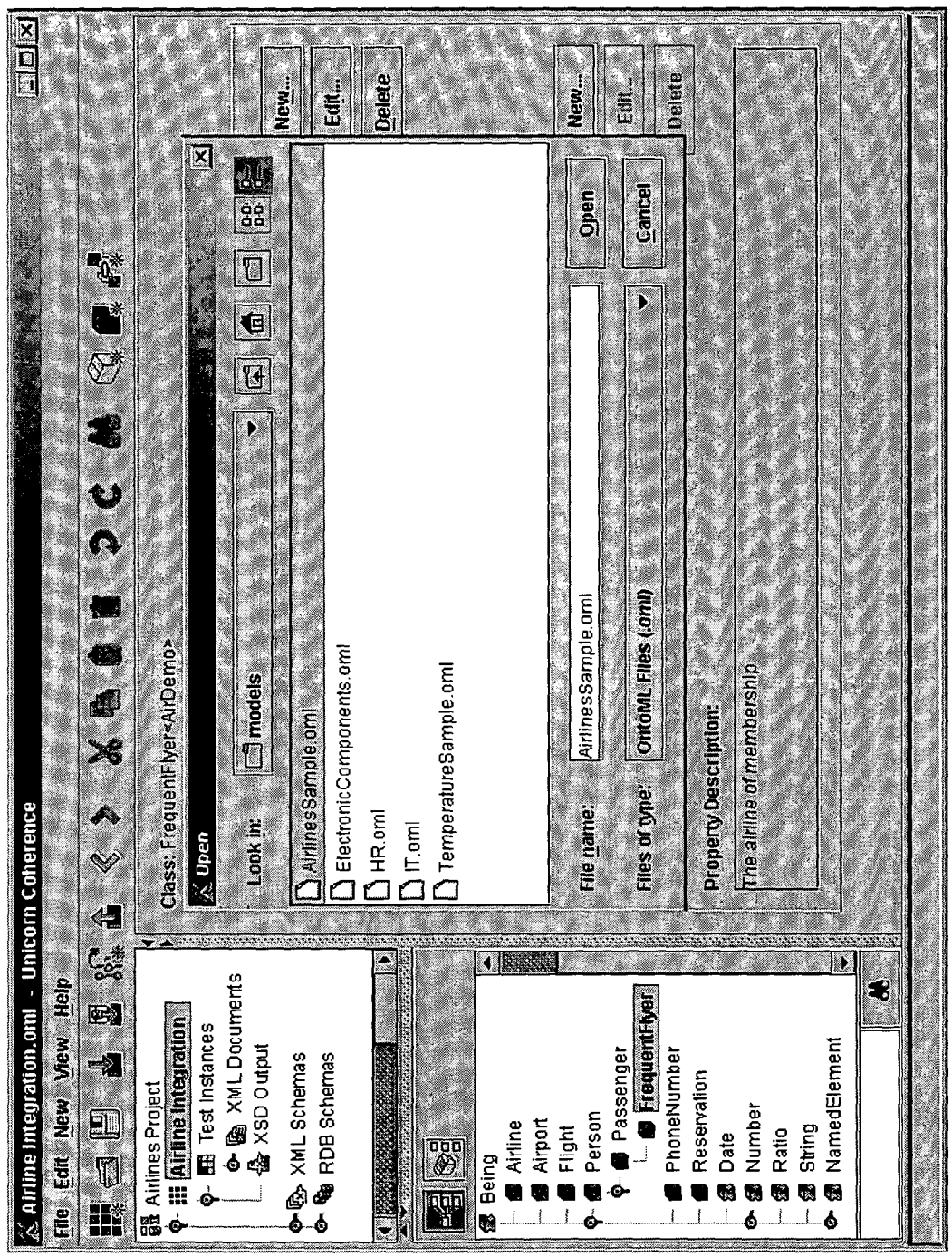
Figure 11D:
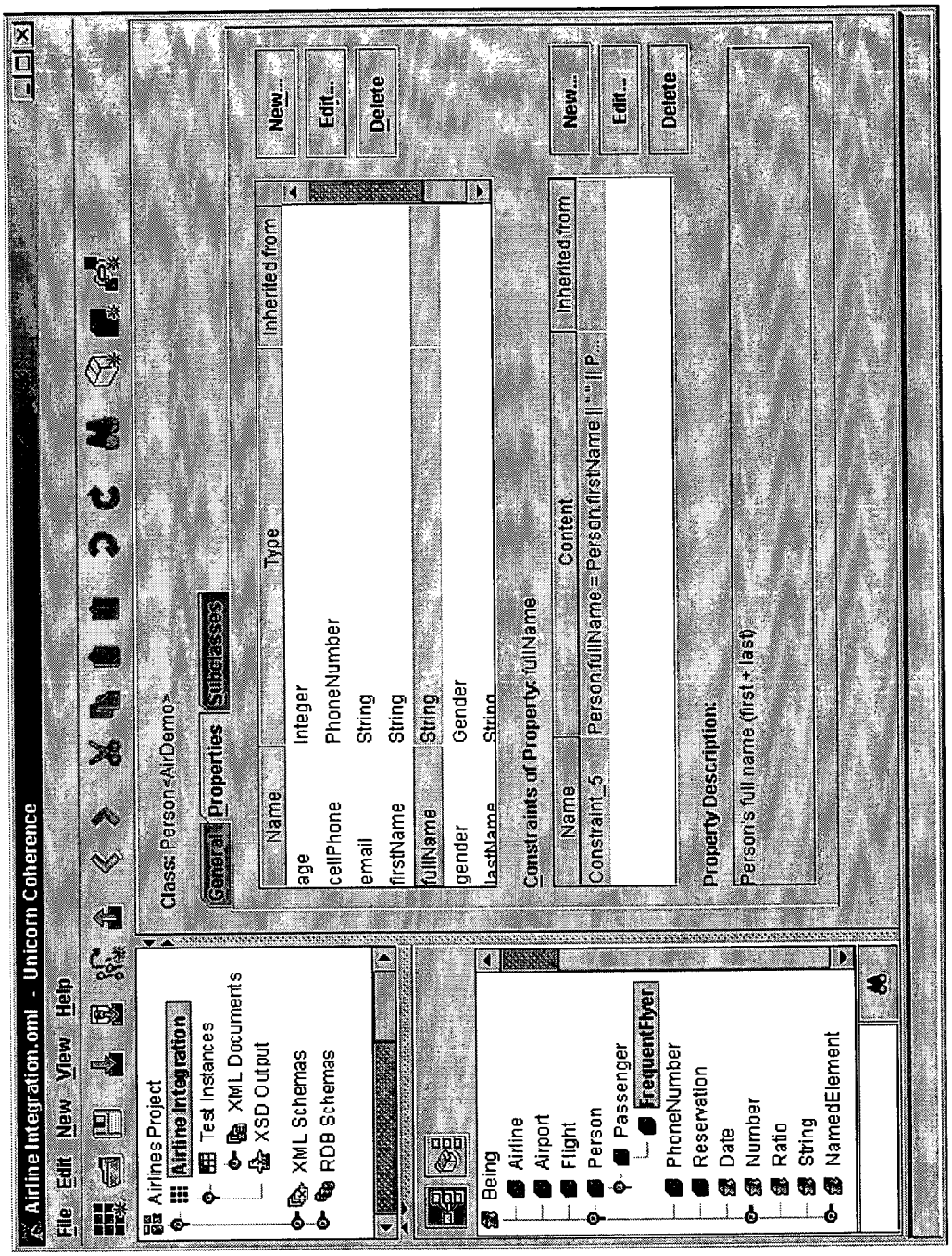
Figure 11E:
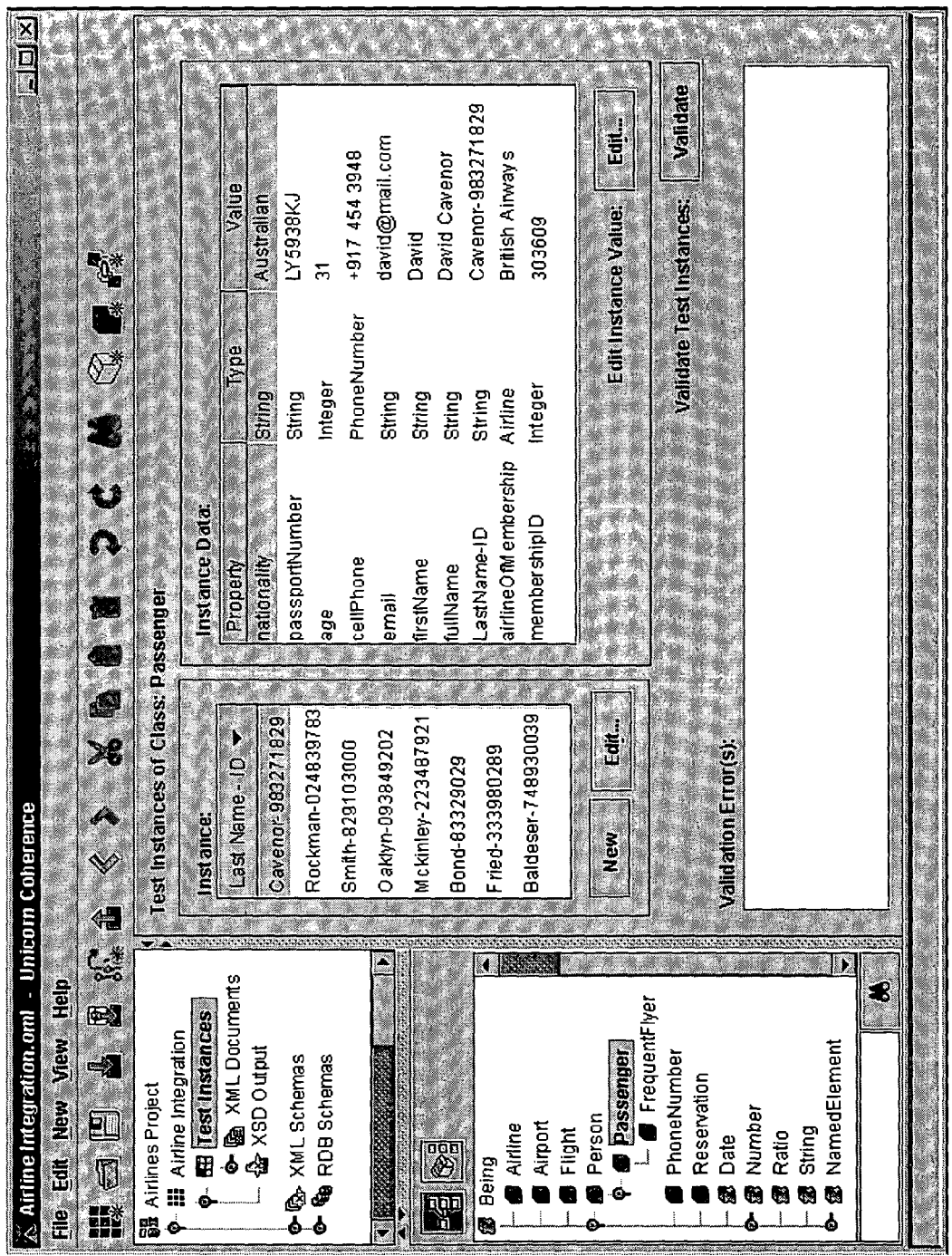
Figure 11G:
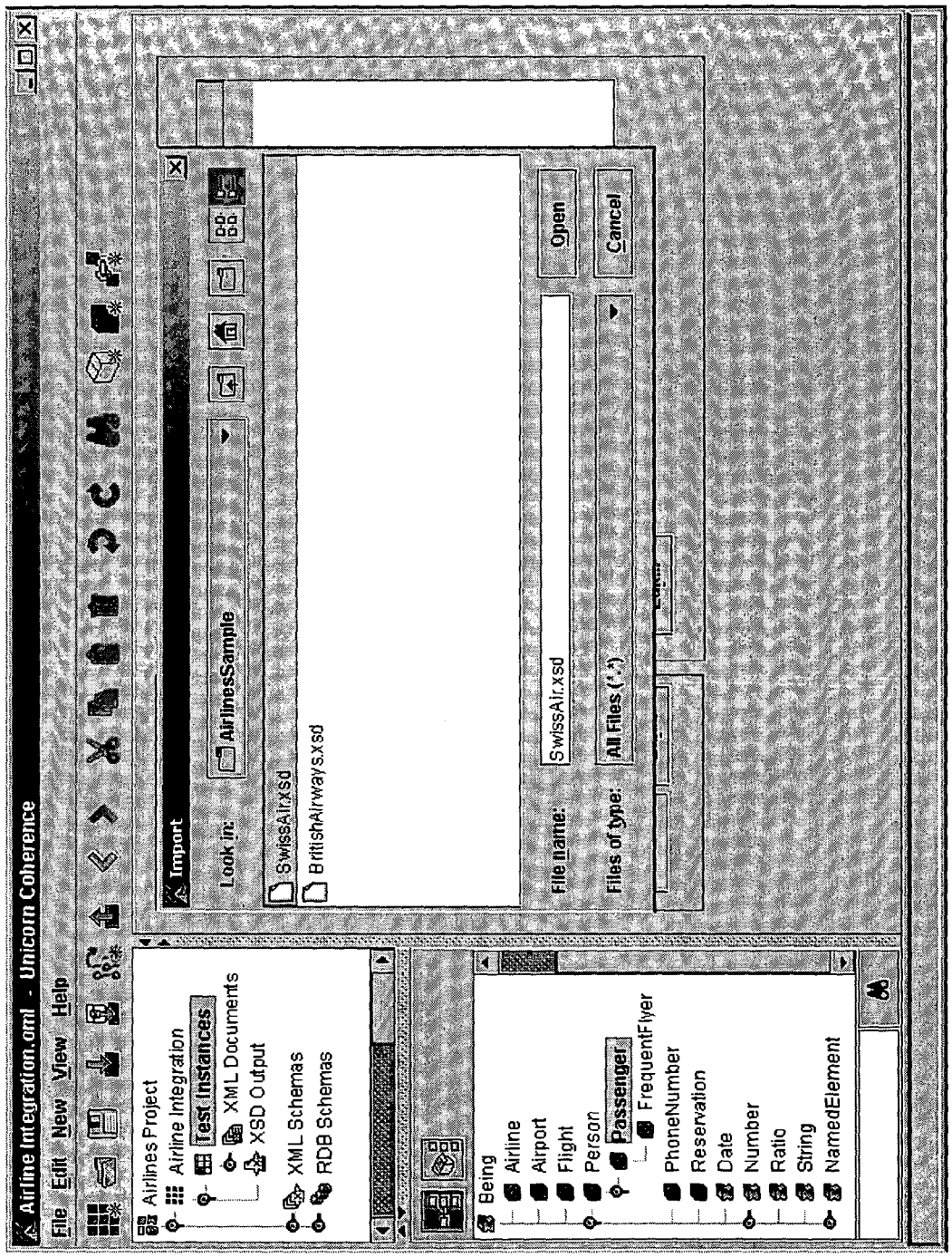
Figure 11H:
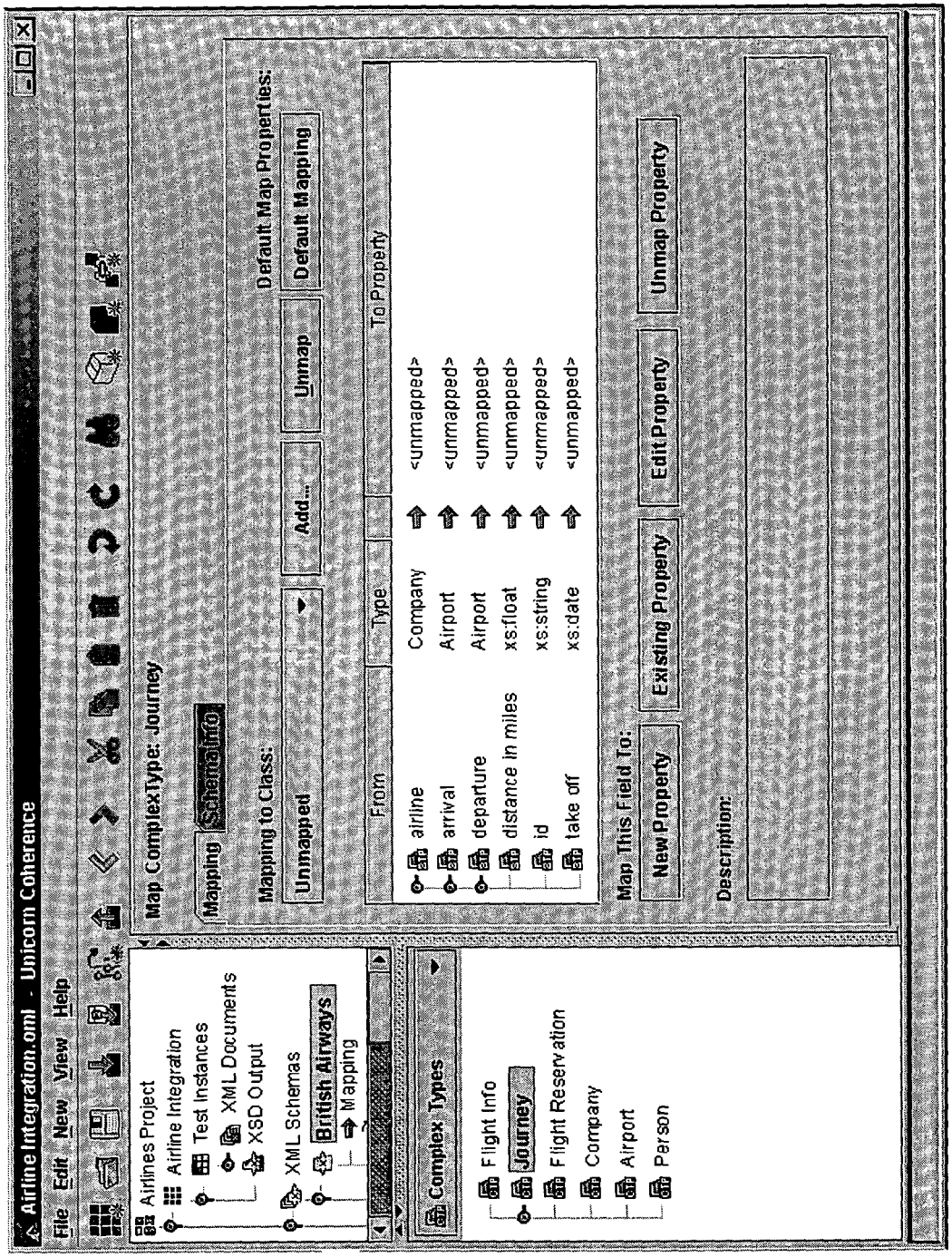
Figure 11I:
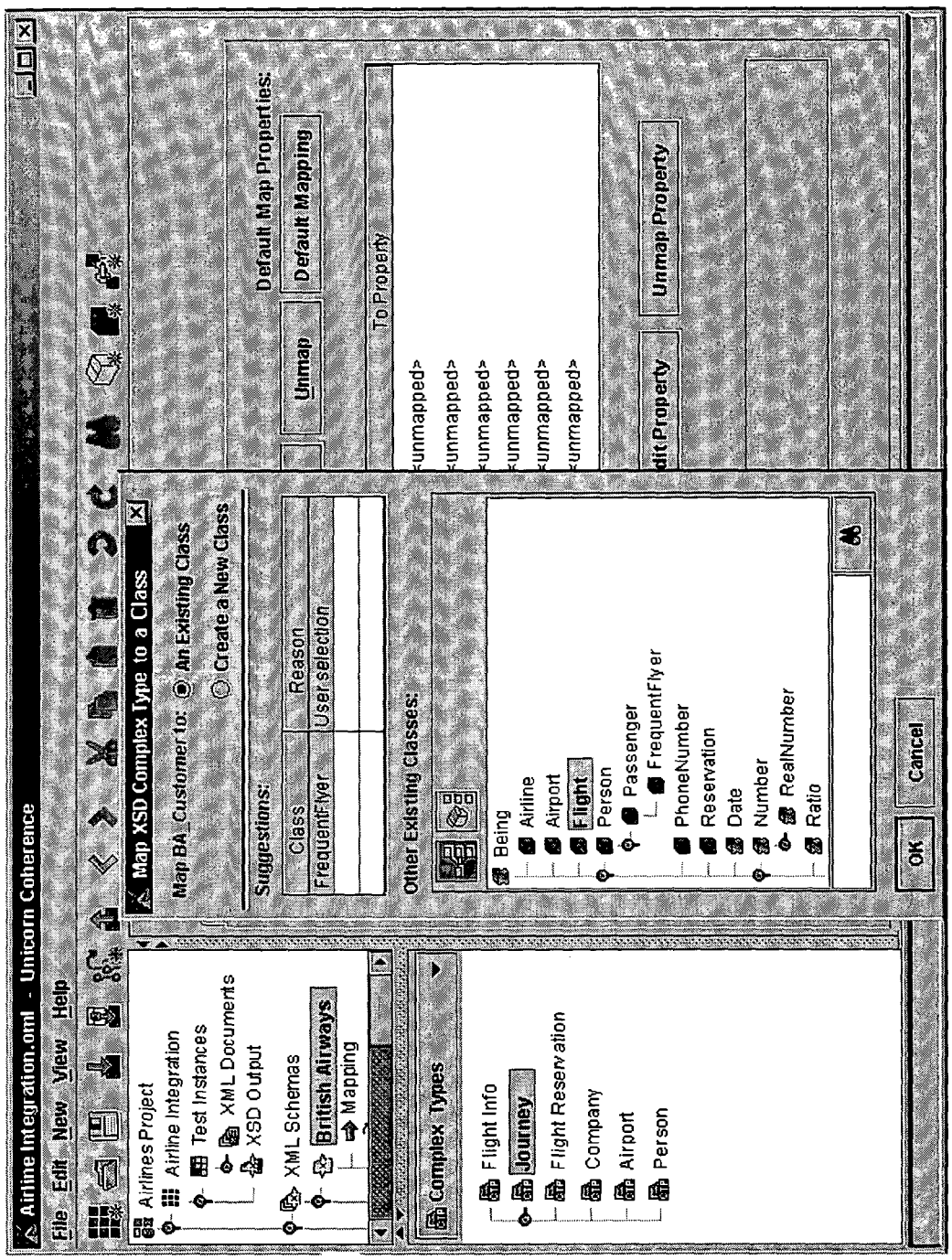
Figure 11J:
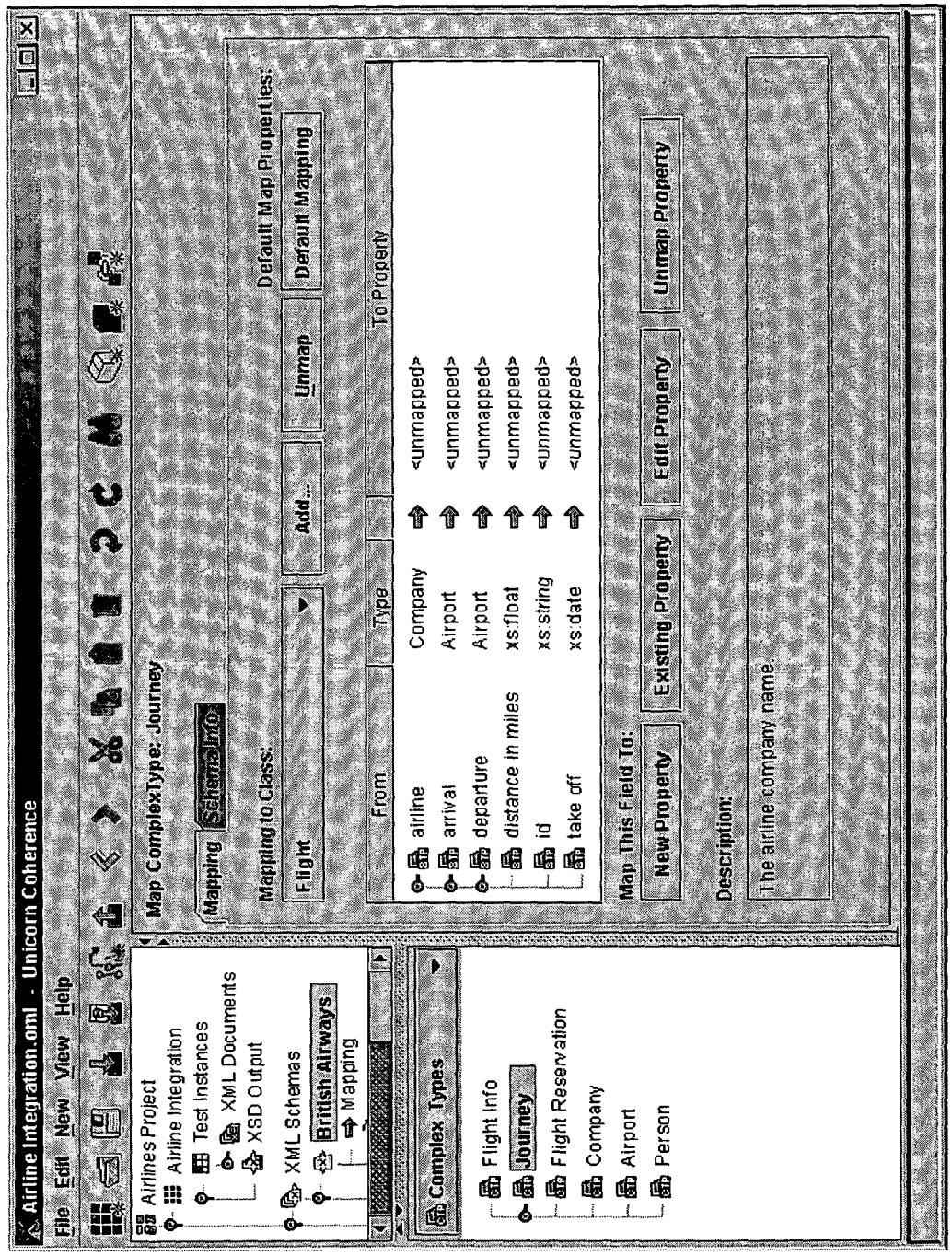
Figure 11K:
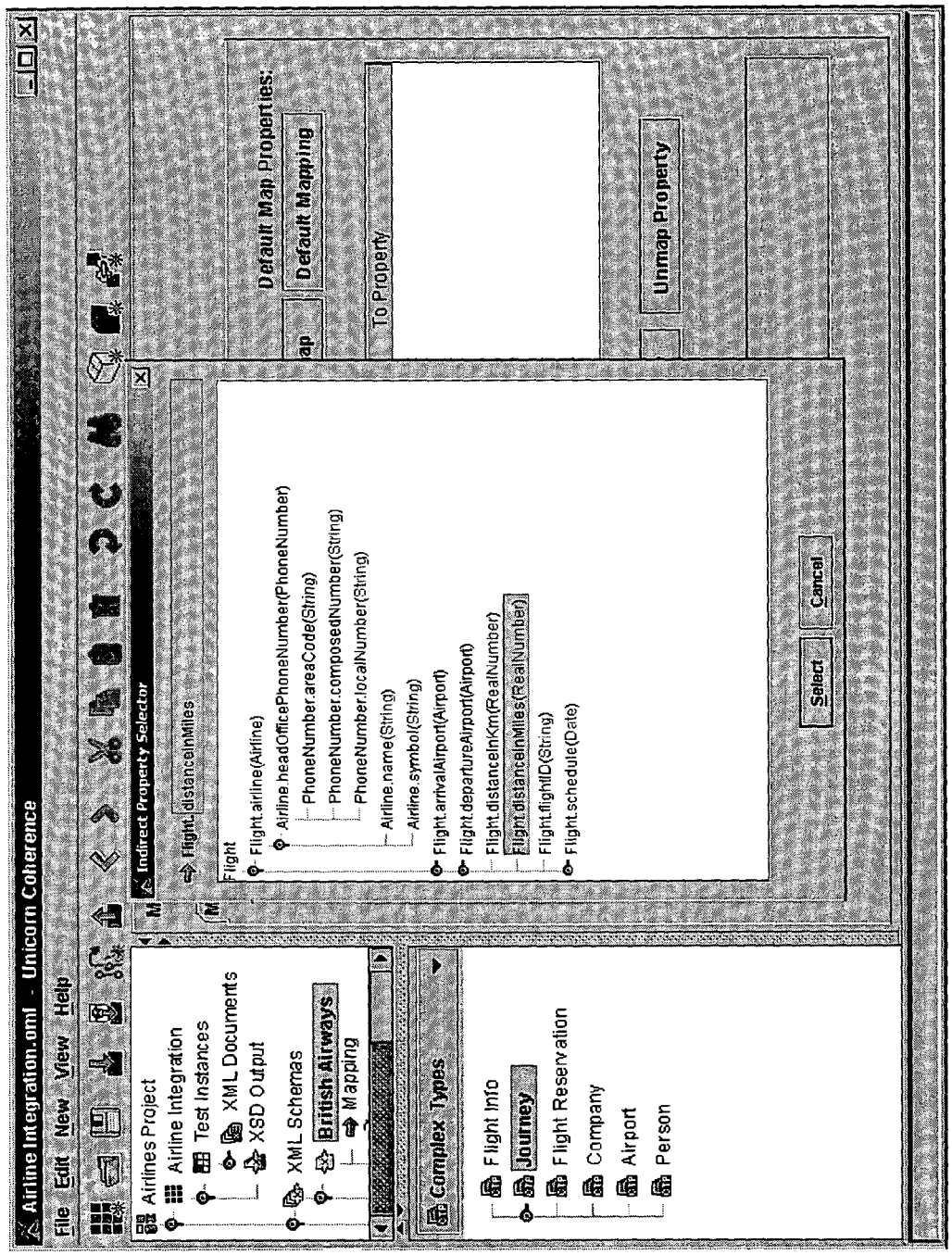
Figure 11L:
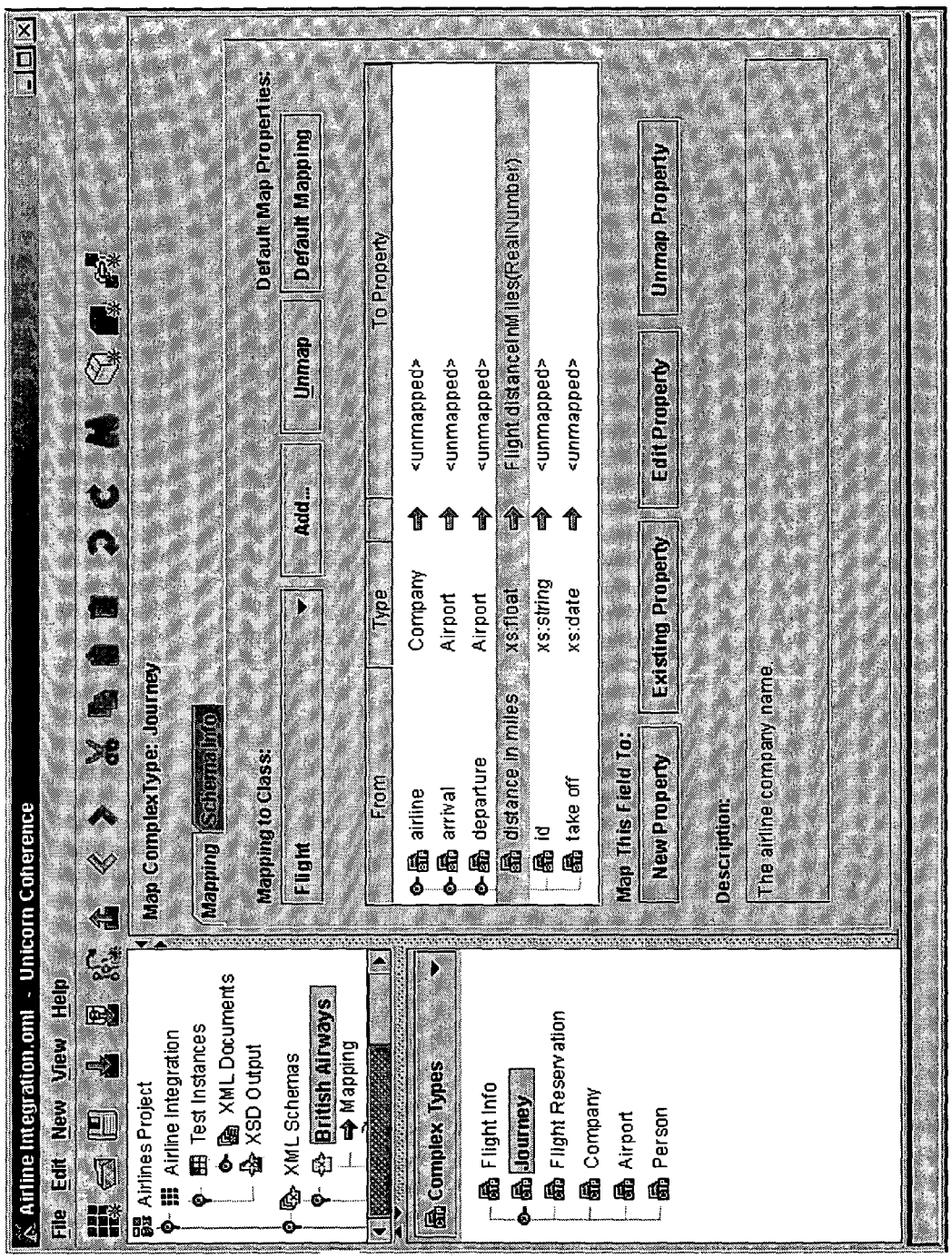
Figure 11M:
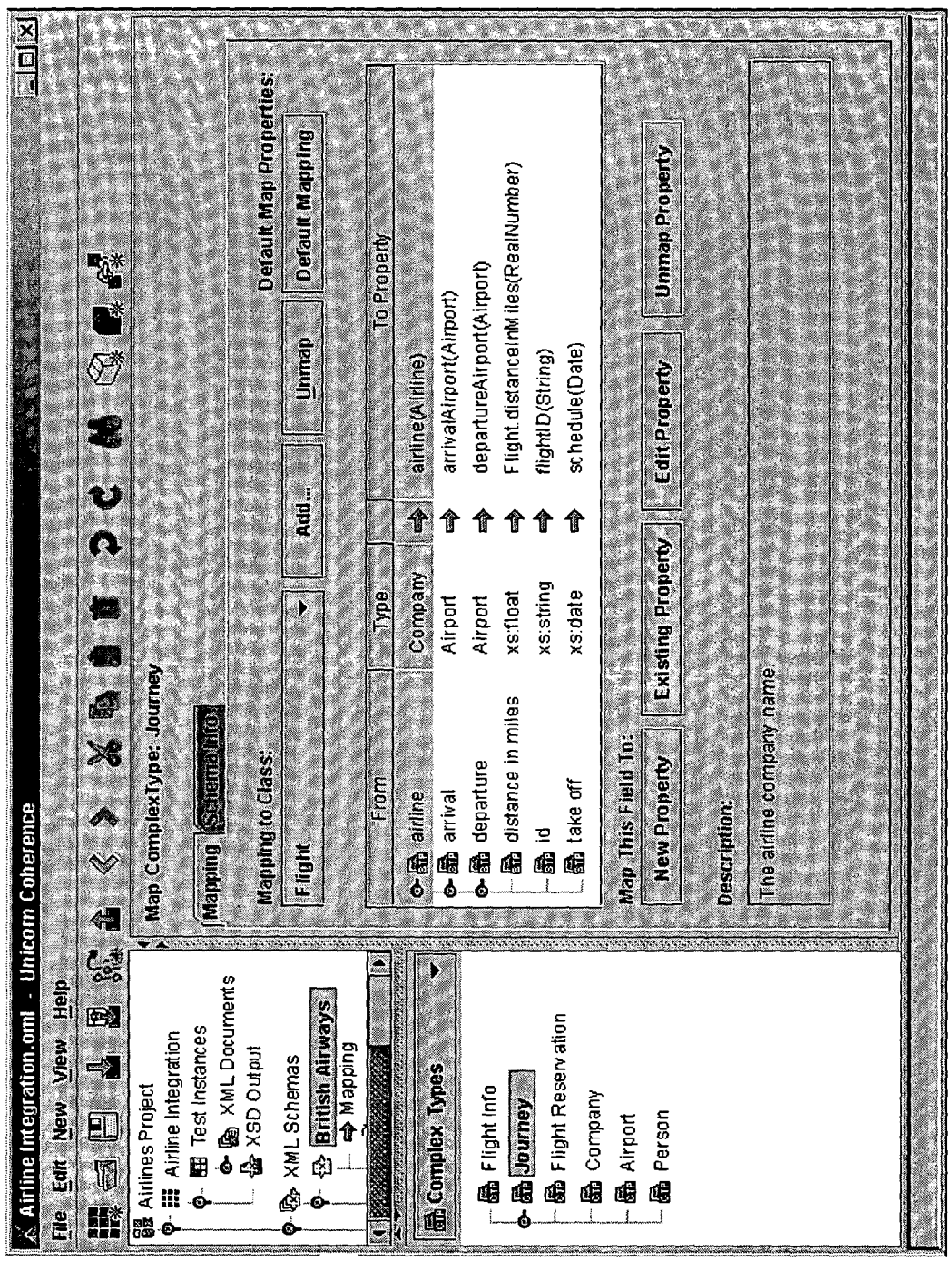
Figure 11N:
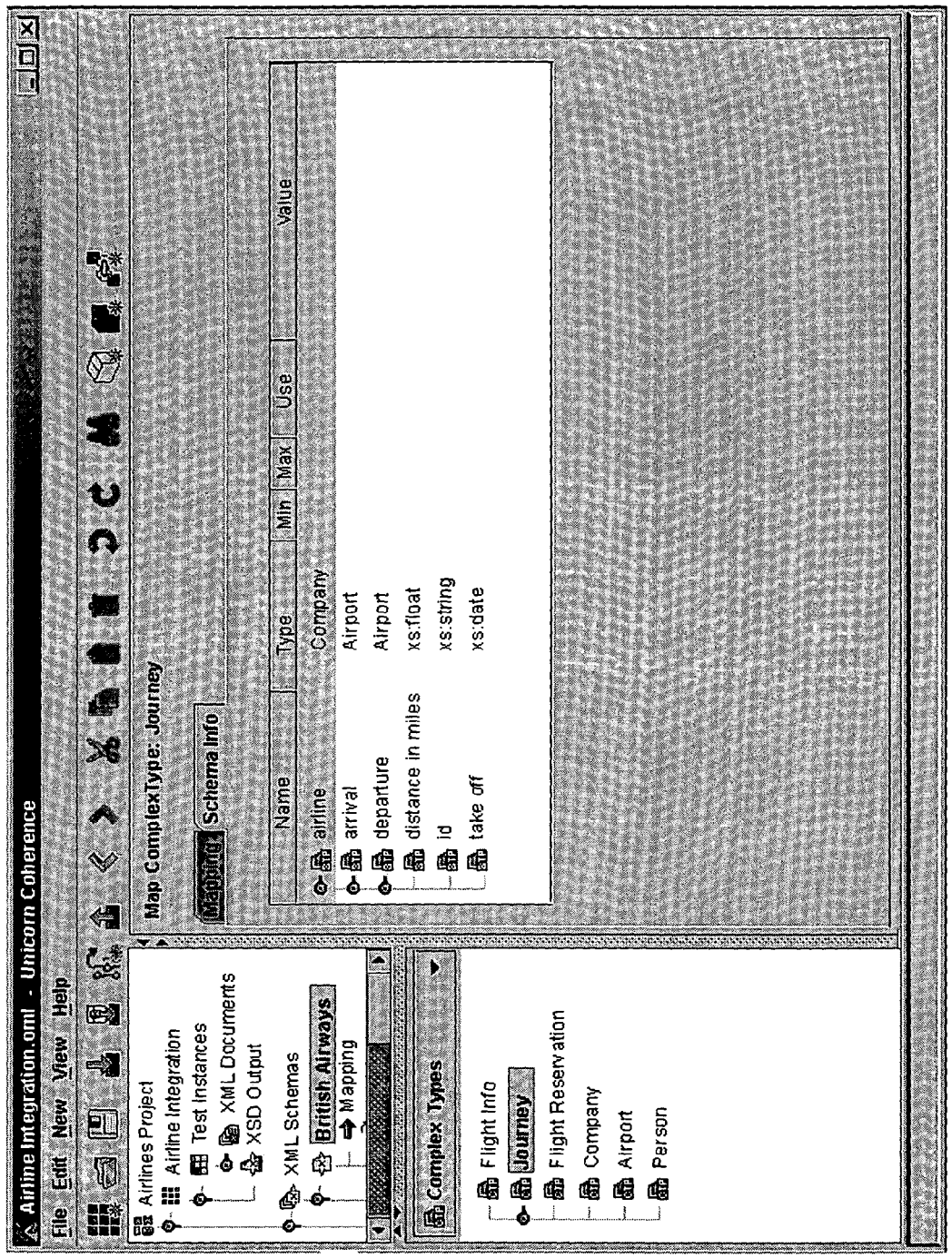
Figure 11O:
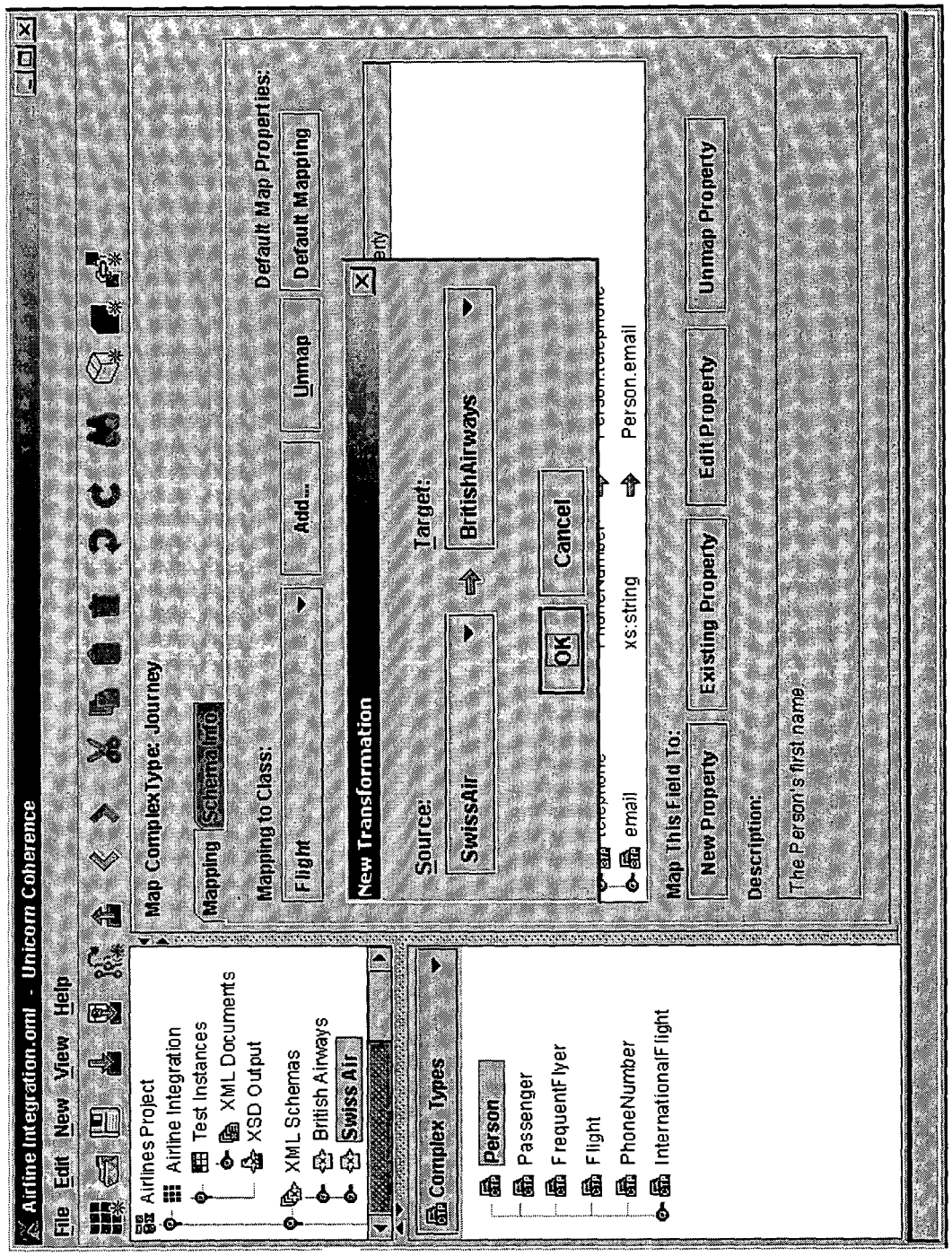
Figure 11P:
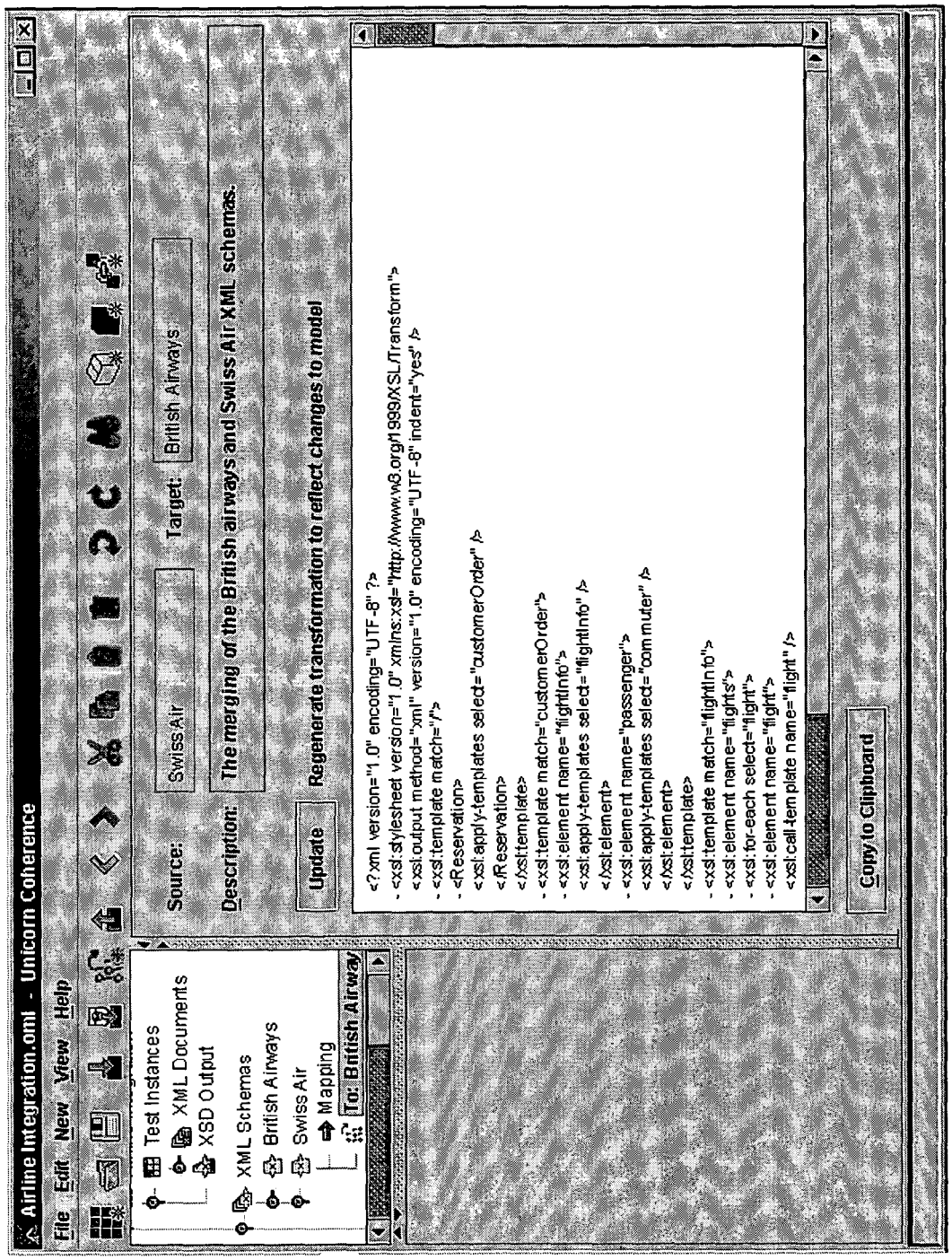
Figure 11Q:
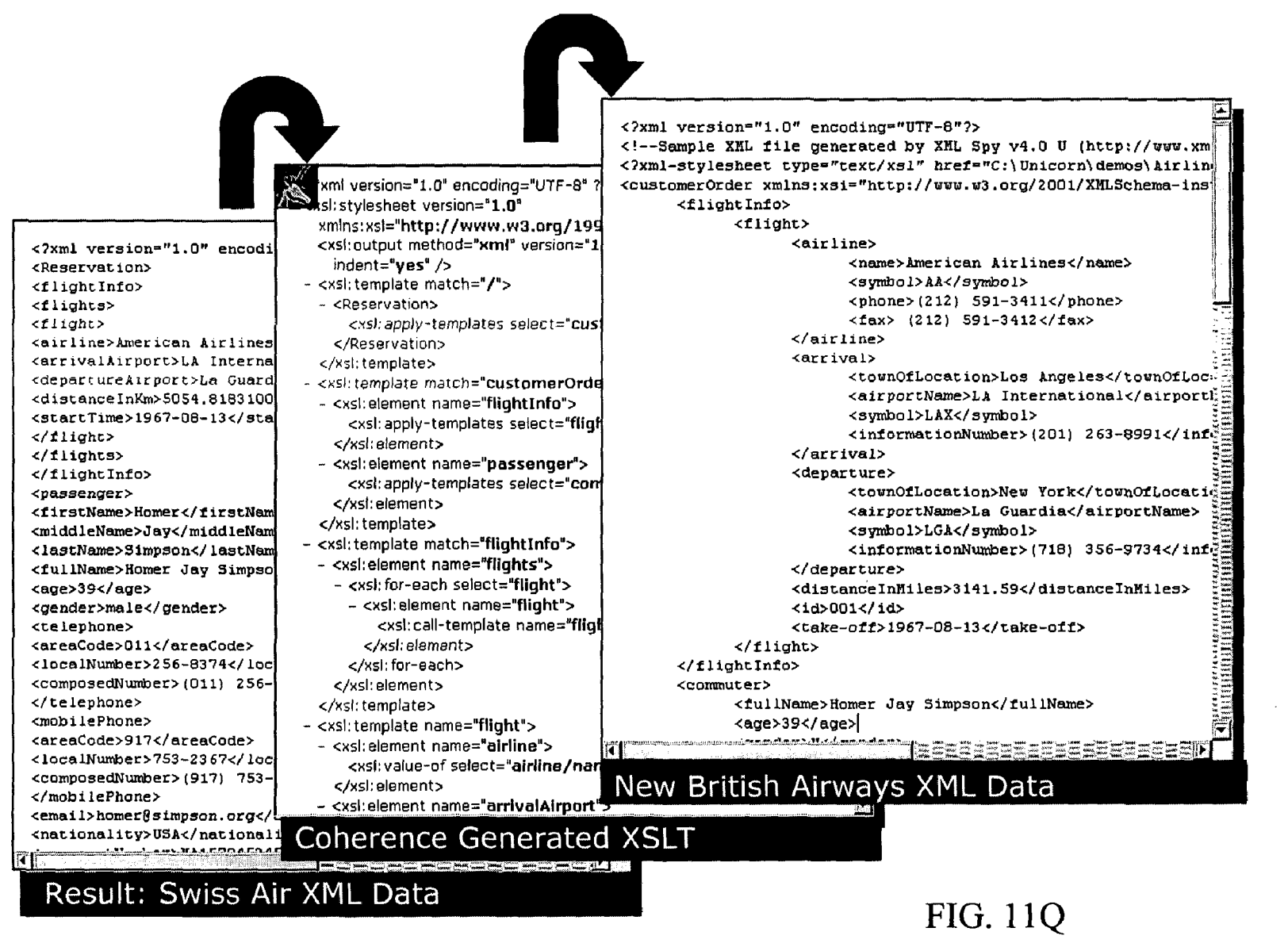
Figure 11R:
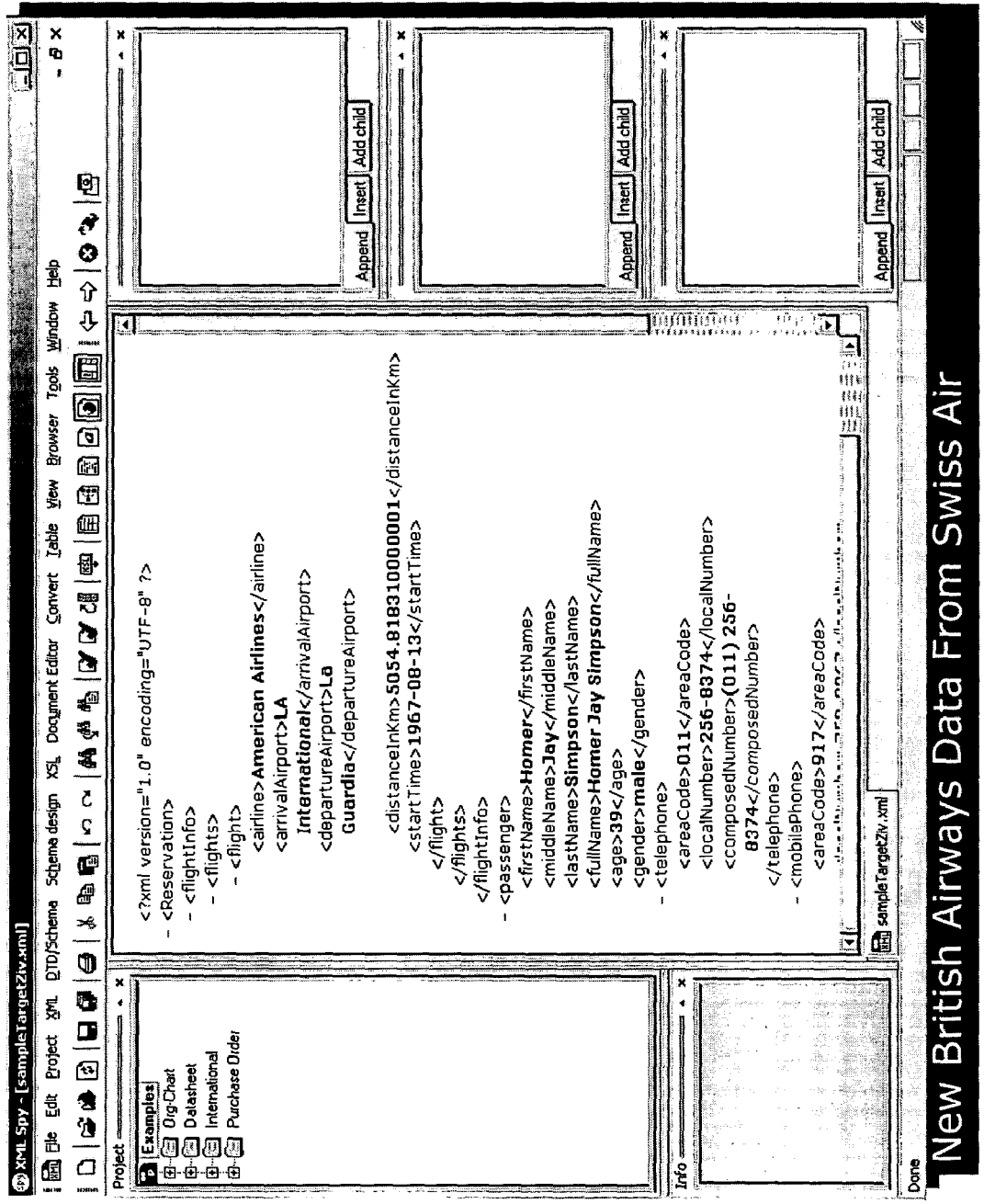

Reference is now made to FIGS. 11A-11R, which are illustrations of a for transforming data from one XML schema to another using the Coherence software application, in accordance with a preferred embodiment of the present invention. Shown in FIG. 11A is a window with package view of an Airline Integration ontology model in its left lane. The left pane displays classes from a fundamental package. A class Date is shown highlighted, and its properties are shown in the right pane. Fundamental packages are used for standard data types. Shown in FIG. 11B is a window with a hierarchical view of the Airline Integration ontology model in its left pane. The left pane indicates that FrequentFlyer is a subclass of Passenger, Passenger is a subclass of Person, and Person is a subclass of Being. The right pane displays general information about the class FrequentFlyer.

FIG. 11C shows a window used for opening an existing ontology model. In the Coherence software application, ontology models are described using XML and stored in .oml files. Such files are described in applicant's co-pending patent application U.S. Ser. No. 09/866,101 filed on May 25, 2001 and entitled METHOD AND SYSTEM FOR COLLABORATIVE ONTOLOGY MODELING, the contents of which are hereby incorporated by reference.

FIG. 11D shows the hierarchical view from FIG. 11B, indicating properties of the FrequentFlyer class. The property fullName is highlighted, and a window for constraint information indicates that there is a relationship among the ontology properties firstName, lastName and fullName; namely, that fullName is the concatenation of firstName and lastName with a white space therebetween. This relationship is denoted as Constraint_5.

FIG. 11E shows the hierarchical view from FIG. 11B, indicating test instance of the Passenger class. A list of instances is displayed in the right pane, along with property values for a specific selected instance from the list.

FIG. 11F shows two imported XML schema for airline information. FIG. 11G shows a window for importing XML schema into Coherence. FIG. 11H shows a window with a display of an imported XML schema for British Airways, with a list of complexTypes from the imported schema. The complexType Journey is selected, and the right pane indicates that Journey and its elements are currently not mapped to a class and properties of the ontology model.

FIG. 11I shows a window for generating a mapping from the British Airways XML schema into the Airline Integration ontology model. The ontology class Flight is shown selected to correspond to the XML ComplexType Journey. FIG. 11J shows the left pane from FIG. 11H, with the right pane now indicating that the XML complexType Journey from the British Airways XML schema has been mapped to the class Flight from the Airline Integration ontology model. FIG. 11K shows the left pane from FIG. 11H, with a window for selecting properties and indirect properties (i.e., compositions of properties) to correspond to elements from the XML schema. Shown selected in FIG. 11K is a property distanceInMiles( ) of the class Flight. FIG. 11L shows the left pane from FIG. 11H, with the right pane now indicated that Journey has been mapped to Flight, and the XML element distance_in_miles within the complexType Journey has been mapped to the property distanceInMiles( ) of the class Flight. FIG. 11M shows the left pane from FIG. 11H, with the right pane now indicating that the mapping has been extended to all XML elements of the complexType Journey, showing the respective properties to which each element is mapped. FIG. 11N shows schema info for the complexType Journey, listing its elements and their data types.

FIG. 11O shows a window for specifying a transformation to be derived. Shown in FIG. 11O is a request to derive a transformation from a source data schema, namely, the imported SwissAir XML schema to a target data schema, namely, the imported British Airways XML schema. Shown in FIG. 11P is an XSLT script generated to transform XML documents conforming to the SwissAir schema to XML documents conforming to the British Airways schema. FIG. 11Q shows a specific transformation of a SwissAir XML document to a British Airways XML document, obtained by applying the derived XSLT script from FIG. 11P. Finally, FIG. 11R shows a display of the newly generated British Airways XML document with specific flights and passengers.

EXAMPLES

For purposes of clarity and exposition, the workings of the present invention are described first through a series of twenty-three examples, followed by a general description of implementation. Two series of examples are presented. The first series, comprising the first eleven examples, relates to RDBS transformations. For each of these examples, a source RDBS and target RDBS are presented as input, along with mappings of these schema into a common ontology model. The output is an appropriate SQL query that transforms database tables that conform to the source RDBS, into database tables that conform to the target RDBS. Each example steps through derivation of source and target symbols, expression of target symbols in terms of source symbols and derivation of an appropriate SQL query based on the expressions.

The second series of examples, comprising the last twelve examples, relates to XSLT transformation. For each of these examples, a source XML schema and target XML schema are presented as input, along with mappings of these schema into a common ontology model. The output is an appropriate XSLT script that transforms XML documents that conform to the source schema into XML documents that conform to the target schema.

A First Example

Schoolchildren

In a first example, a target table is of the following form:

TABLE III

Target Table T for First Example

| Child_Name | Mother_Name | School_Location | Form |
|---|---|---|---|

Four source tables are given as follows:

TABLE IV

Source Table $S_1$ for First Example

| Name | School_Attending | Mother_NI_Number |
|---|---|---|

TABLE V

Source Table $S_2$ for First Example

| NI_Number | Name | Region | Car_Number |
|---|---|---|---|

TABLE VI

Source Table $S_3$ for First Example

| Name | Location | HeadTeacher |
|---|---|---|

TABLE VII

Source Table $S_4$ for First Example

| Name | Year | Form |
|---|---|---|

Figure 12:
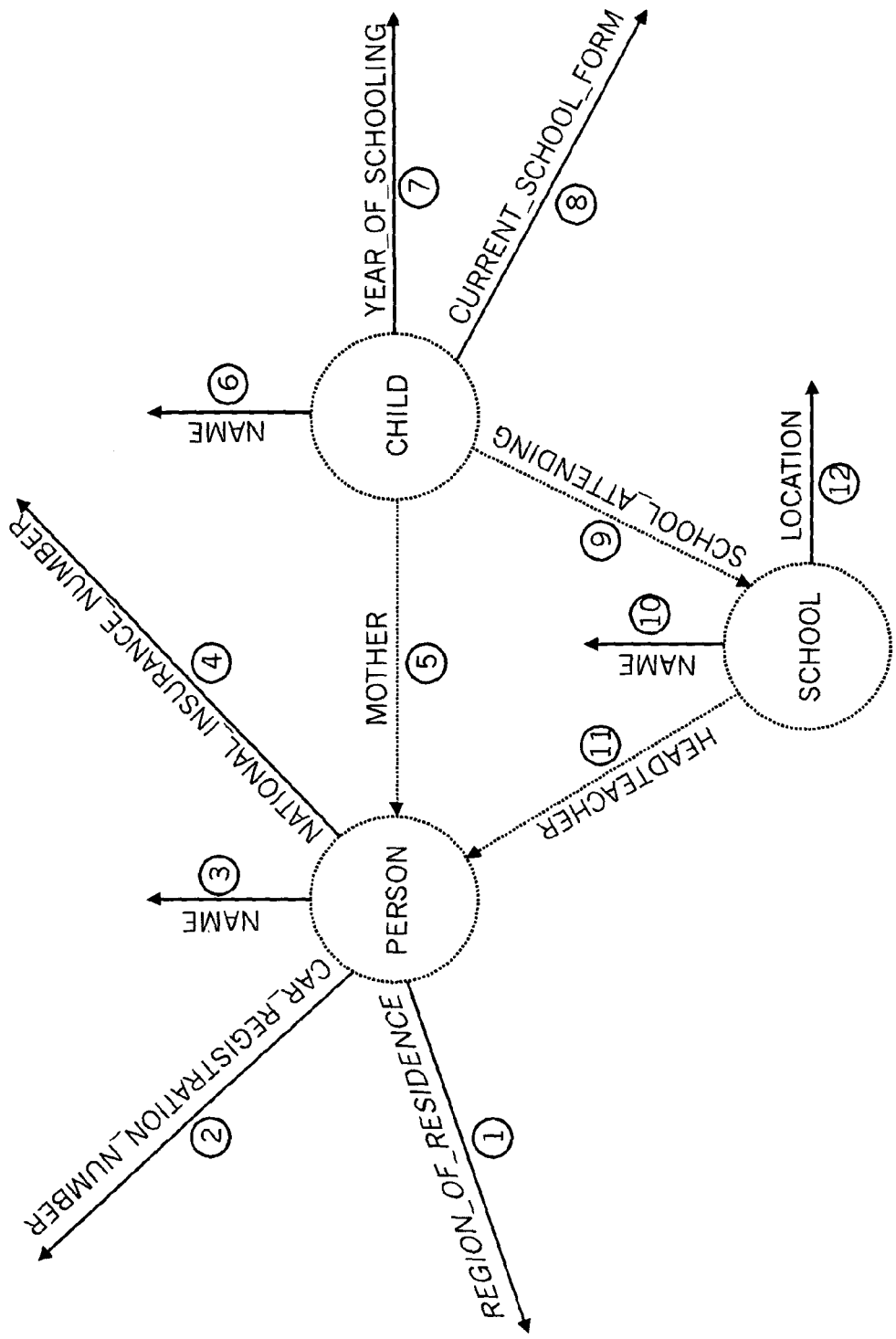
FIG. 12 is an illustration of ontology model corresponding to a first example.

The underlying ontology is illustrated in FIG. 12. The dotted portions of the ontology in FIG. 12 show additional ontology structure that is transparent to the relational database schema. Using the numbering of properties indicated in FIG. 12, the unique properties of the ontology are identified as:

TABLE VIII

Unique Properties within Ontology for First Example

| Property | Property Index |
|---|---|
| name(Child) | 6 |
| national_insurance_number(Person) | 4 |
| name(School) | 10 |

The mapping of the target schema into the ontology is as follows:

TABLE IX

Mapping from Target schema to Ontology for First Example

| schema | Ontology | Property Index |
|---|---|---|
| T | Class: Child | |
| T.Child_Name | Property: name(Child) | 6 |
| T.Mother_Name | Property: name(mother(Child)) | 3o5 |
| T.School_Location | Property: location(school_attending(Child)) | 12o9 |
| T.Form | Property: current_school_form(Child) | 8 |

The symbol o is used to indicate composition of properties. The mapping of the source schema into the ontology is as follows:

TABLE X

Mapping from Source schema to Ontology for First Example

| schema | Ontology | Property Index |
|---|---|---|
| $S_1$ | Class: Child | |
| $S_1$.Name | Property: name(Child) | 6 |
| $S_1$.School_Attending | Property: name(school_attending(Child)) | $10o9$ |
| $S_1$.Mother_NI_Number | Property: national_insurance_number(mother(Child)) | $4o5$ |
| $S_2$ | Class: Person | |
| $S_2$.NI_Number | Property: national_insurance_number(Person) | 4 |
| $S_2$.Name | Property: name(Person) | 3 |
| $S_2$.Region | Property: region_of_residence(Person) | 1 |
| $S_2$.Car_Number | Property: car_registration_number(Person) | 2 |
| $S_3$ | Class: School | |
| $S_3$.Name | Property: name(School) | 10 |
| $S_3$.Location | Property: location(School) | 12 |
| $S_3$.HeadTeacher | Property: name(headteacher(School)) | $3o11$ |
| $S_4$ | Class: Child | |
| $S_4$.Name | Property: name(Child) | 6 |
| $S_4$.Year | Property: year_of_schooling(Child) | 7 |
| $S_4$.Form | Property: current_school_form(Child) | 8 |

The indices of the source properties are:

TABLE XI

Source Symbols for First Example

| Source Table | Source Symbols |
|---|---|
| $S_1$ | $10o9o6^{-1}$ |
| | $4o5o6^{-1}$ |
| $S_2$ | $3o4^{-1}$ |
| | $1o4^{-1}$ |
| | $2o4^{-1}$ |
| $S_3$ | $12o10^{-1}$ |
| | $3o11o10^{-1}$ |
| $S_4$ | $7o6^{-1}$ |
| | $8o6^{-1}$ |

The symbols in Table XI relate fields of a source table to a key field. Thus in table $S_1$ the first field, $S_1$.Name is a key field. The second field, $S_1$.School_Attending is related to the first field by the composition $10o9o6^{-1}$, and the third field, $S_1$.Mother_NI_Number is related to the first field by the composition $4o5o6^{-1}$. In general, if a table contains more than one key field, then expressions relative to each of the key fields are listed.

The inverse notation, such as $6^{-1}$ is used to indicate the inverse of property 6. This is well defined since property 6 is a unique, or one-to-one, property in the ontology model. The indices of the target properties, keyed on Child_Name are:

TABLE XII

Target Symbols for First Example

| Target Table | Target Symbols | Paths |
|---|---|---|
| T | $3o5o6^{-1}$ | $(3o4^{-1}) o (4o5o6^{-1})$ |
| | $12o9o6^{-1}$ | $(12o10^{-1}) o (10o9o6^{-1})$ |
| | $8o6^{-1}$ | $(8o6^{-1})$ |

Based on the paths given in Table XII, the desired SQL query is:

INSERT INTO T(Child_Name, Mother_Name, School_Location, Form)

-continued (SELECT $S_1$.Name AS Child_Name,
$S_2$.Name AS Mother_Name,
$S_3$.Location AS School_Location,
$S_4$.Form AS Form

FROM $S_1, S_2, S_3, S_4$

WHERE $S_2$.NI_Number = $S_1$.Mother_NI_Number AND
$S_3$.Name = $S_1$.School_Attending AND
$S_4$.Name = $S_1$.Name);

The rules provided with the examples relate to the stage of converting expressions of target symbols in terms of source symbols, into SQL queries. In general, Rule 1: When a target symbol is represented using a source symbols, say $(aob^{-1})$, from a source table, S, then the column of S mapping to a is used in the SELECT clause of the SQL query and the column of S mapping to b is used in the WHERE clause.

Rule 2: When a target symbol is represented as a composition of source symbols, say $(aob^{-1}) o (boc^{-1})$, where $aob^{-1}$ is taken from a first source table, say $S_1$, and $boc^{-1}$ is taken from a second source table, say $S_2$, then $S_1$ and $S_2$ must be joined in the SQL query by the respective columns mapping to b.

Rule 3: When a target symbol is represented using a source symbols, say $(aob^{-1})$, from a source table, S, and is not composed with another source symbol of the form $boc^{-1}$, then table S must be joined to the target table through the column mapping to b.

When applied to the following sample source data, Tables XIII, XIV, XV and XVI, the above SQL query produces the target data in Table XVII.

TABLE XIII

Sample Source Table $S_1$ for First Example

| Name | School Attending | Mother_NI_Number |
|---|---|---|
| Daniel Ashton | Chelsea Secondary School | 123456 |
| Peter Brown | Warwick School for Boys | 673986 |
| Ian Butler | Warwick School for Boys | 234978 |

TABLE XIII-continued

Sample Source Table $S_1$ for First Example

| Name | School Attending | Mother_NI_Number |
|---|---|---|
| Matthew Davies | Manchester Grammar School | 853076 |
| Alex Douglas | Weatfields Secondary School | 862085 |
| Emma Harrison | Camden School for Girls | 275398 |
| Martina Howard | Camden School for Girls | 456398 |

TABLE XIV

Sample Source Table $S_2$ for First Example

| NI_Number | Name | Region | Car_Number |
|---|---|---|---|
| 123456 | Linda | London | NULL |
| 673986 | Amanda | Warwick | NULL |
| 456398 | Claire | Cambridgeshire | NULL |
| 862085 | Margaret | NULL | NULL |
| 234978 | Amanda | NULL | NULL |
| 853076 | Victoria | Manchester | NULL |
| 275398 | Elizabeth | London | NULL |

TABLE XV

Sample Source Table $S_3$ for First Example

| Name | Location | HeadTeacher |
|---|---|---|
| Manchester Grammar School | Manchester | M. Payne |
| Camden School for Girls | London | J. Smith |
| Weatfields Secondary School | Cambridgeshire | NULL |
| Chelsea Secondary School | London | I. Heath |
| Warwick School for Boys | Warwickshire | NULL |

TABLE XVI

Sample Source Table $S_4$ for First Example

| Name | Year | Form |
|---|---|---|
| Peter Brown | 7 | Lower Fourth |
| Daniel Ashton | 10 | Mid Fifth |
| Matthew Davies | 4 | Lower Two |
| Emma Harrison | 6 | Three |
| James Kelly | 3 | One |
| Greg McCarthy | 5 | Upper Two |
| Tina Reynolds | 8 | Upper Fourth |

TABLE XVII

Sample Target Table T for First Example

| Child_Name | Mother_Name | School_Location | Form |
|---|---|---|---|
| Daniel Ashton | Linda | London | Mid Fifth |
| Peter Brown | Amanda | Warwickshire | Lower Fourth |
| Matthew Davies | Victoria | Manchester | Lower Two |
| Emma Harrison | Elizabeth | London | Three |

A Second Example

Employees

In a second example, a target table is of the following form:

TABLE XVIII

Target Table T for Second Example

| Name | Department | Supervisor | Room# |
|---|---|---|---|

Four source tables are given as follows:

TABLE XIX

Source Table $S_1$ for Second Example

| Emp_ID# | Name | Department |
|---|---|---|

TABLE XX

Source Table $S_2$ for Second Example

| Employee_Name | Supervisor | Project |
|---|---|---|

TABLE XXI

Source Table $S_3$ for Second Example

| ID# | Room_Assignment | Telephone# |
|---|---|---|

TABLE XXII

Source Table $S_4$ for Second Example

| Department | Budget |
|---|---|

Figure 13:
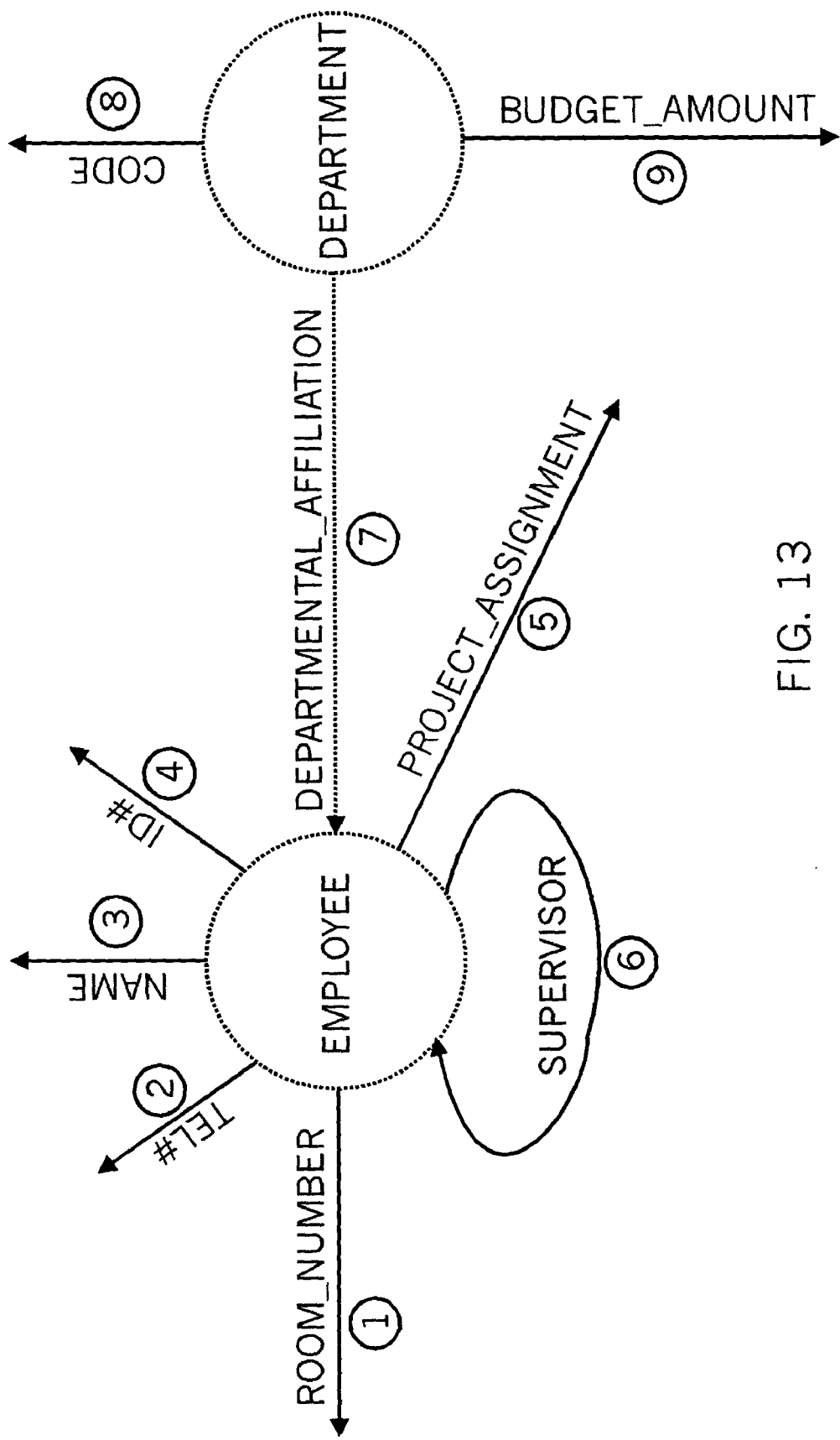
FIG. 13 is an illustration of ontology model corresponding to a second example.

The underlying ontology is illustrated in FIG. 13. The dotted portions of the ontology in FIG. 13 are additional ontology structure that is transparent to the relational database schema. The unique properties of the ontology are:

TABLE XXIII

Unique Properties within Ontology for Second Example

| Property | Property Index |
|---|---|
| name(Employee) | 3 |
| ID#(Employee) | 4 |

The mapping of the target schema into the ontology is as follows:

TABLE XXIV

Mapping from Target schema to Ontology for Second Example

| schema | Ontology | Property Index |
|---|---|---|
| T | Class: Employee | |
| T.Name | Property: name(Employee) | 3 |
| T.Department | Property: code(departmental_affiliation(Employee)) | 8o7 |
| T.Supervisor | Property: name(supervisor(Employee)) | 3o6 |
| T.Room# | Property: room_number(Employee) | 1 |

The mapping of the source schema into the ontology is as follows:

TABLE XXV

Mapping from Source schema to Ontology for Second Example

| schema | Ontology | Property Index |
|---|---|---|
| $S_1$ | Class: Employee | |
| $S_1$.Emp_ID# | Property: ID#(Employee) | 4 |
| $S_1$.Name | Property: name(Employee) | 3 |
| $S_1$.Department | Property: code(departmental_affiliation(Employee)) | 8o7 |
| $S_2$ | Class: Employee | |
| $S_2$.Employee_Name | Property: name(Employee) | 3 |
| $S_2$.Supervisor | Property: name(supervisor(Employee)) | 3o6 |
| $S_2$.Project | Property: project_assignment(Employee) | 5 |
| $S_3$ | Class: Employee | |
| $S_3$.ID# | Property: ID#(Employee) | 4 |
| $S_3$.Room_Assignment | Property: room_number(Employee) | 1 |
| $S_3$.Telephone# | Property: tel#(Employee) | 2 |
| $S_4$ | Class: Department | |
| $S_4$.Department | Property: code(Department) | 8 |
| $S_4$.Budget | Property: budget_amount(Department) | 9 |

The indices of the source properties are:

TABLE XXVI

Source Symbols for Second Example

| Source Table | Source Symbols |
|---|---|
| $S_1$ | $3o4^{-1}$ |
| | $8o7o4^{-1}$ |
| | $4o3^{-1}$ |
| | $8o7o3^{-1}$ |
| $S_2$ | $3o6o3^{-1}$ |
| | $5o3^{-1}$ |
| $S_3$ | $1o4^{-1}$ |
| | $2o4^{-1}$ |
| $S_4$ | $9o8^{-1}$ |

The indices of the target properties, keyed on Name are:

TABLE XXVII

Target Symbols for Second Example

| Target Table | Target Symbols | Paths |
|---|---|---|
| T | $8o7o3^{-1}$ | $(8o7o3^{-1})$ |
| | $3o6o3^{-1}$ | $(3o6o3^{-1})$ |
| | $1o3^{-1}$ | $(1o4^{-1}) \circ (4o3^{-1})$ |

Based on the paths given in Table XXVII, the desired SQL query is:

```
INSERT INTO T(Name, Department, Supervisor, Room#)
(SELECT
        S₁.Name AS Name,
        S₁.Department AS Department,
        S₂.Supervisor AS Supervisor,
        S₃.Room_Assignment AS Room#
 FROM
        S₁, S₂, S₃
 WHERE
        S₂.Employee_Name = S₁.Name AND S₃.ID# =
        S₁.Emp_ID#);
```

It is noted that Table $S_4$ not required in the SQL. When applied to the following sample source data, Tables XXVIII, XXIX and XXX, the above SQL query produces the target data in Table XXXI.

TABLE XXVIII

Sample Source Table $S_1$ for Second Example

| Emp_ID# | Name | Department |
|---|---|---|
| 198 | Patricia | SW |
| 247 | Eric | QA |
| 386 | Paul | IT |

TABLE XXIX

Sample Source Table $S_2$ for Second Example

| Employee_Name | Supervisor | Project |
|---|---|---|
| Eric | John | Release 1.1 |
| Patricia | George | Release 1.1 |
| Paul | Richard | Release 1.1 |

TABLE XXX

Sample Source Table $S_3$ for Second Example

| ID# | Room_Assignment | Telephone# |
|---|---|---|
| 386 | 10 | 106 |
| 198 | 8 | 117 |
| 247 | 7 | 123 |

TABLE XXXI

Sample Target Table T for Second Example

| Name | Department | Supervisor | Room# |
|---|---|---|---|
| Patricia | SW | George | 8 |
| Eric | QA | John | 7 |
| Paul | IT | Richard | 10 |

A Third Example

Airline Flights

In a third example, a target table is of the following form:

TABLE XXXII

Target Table T for Third Example

| FlightID | DepartingCity | ArrivingCity |
|---|---|---|

Two source tables are given as follows:

TABLE XXXIII

Source Table $S_1$ for Third Example

| Index | APName | Location |
|---|---|---|

TABLE XXXIV

Source Table $S_2$ for Third Example

| FlightID | FromAirport | ToAirport |
|---|---|---|

Figure 14:
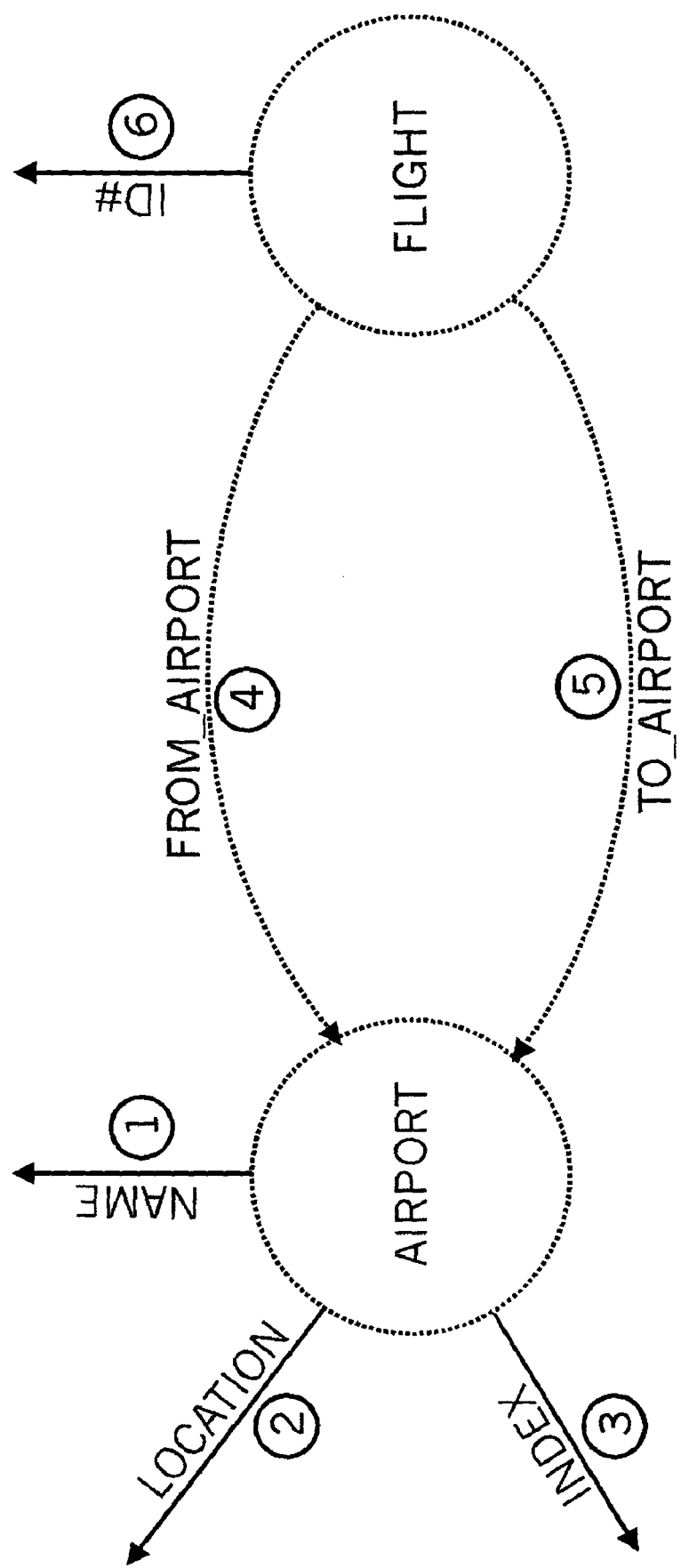
FIG. 14 is an illustration of ontology model corresponding to a third example.

The underlying ontology is illustrated in FIG. 14. The dotted portions of the ontology in FIG. 14 are additional ontology structure that is transparent to the relational database schema. The unique properties of the ontology are:

TABLE XXXV

Unique Properties within Ontology for Third Example

| Property | Property Index |
|---|---|
| name(Airport) | 1 |
| ID(Flight) | 6 |

The mapping of the target schema into the ontology is as follows:

TABLE XXXVI

Mapping from Target schema to Ontology for Third Example

| schema | Ontology | Property Index |
|---|---|---|
| T | Class: Flight | |
| T.FlightID | Property: ID#(Flight) | 6 |
| T.DepartingCity | Property: location(from_airport(Flight)) | 2o4 |
| T.ArrivingCity | Property: location(to_airport(Flight)) | 2o5 |

The mapping of the source schema into the ontology is as follows:

TABLE XXXVII

Mapping from Source schema to Ontology for Third Example

| schema | Ontology | Property Index |
|---|---|---|
| $S_1$ | Class: Airport | |
| $S_1$.Index | Property: Index(Airport) | 3 |
| $S_1$.APName | Property: name(Airport) | 1 |
| $S_1$.Location | Property: location(Airport) | 2 |
| $S_2$ | Class: Flight | |
| $S_2$.FlightID | Property: ID#(Flight) | 6 |
| $S_2$.FromAirport | Property: name(from_airport(Flight)) | 1o4 |
| $S_2$.ToAirport | Property: name(to_airport(Flight)) | 1o5 |

The indices of the source properties are:

TABLE XXXVIII

Source Symbols for Third Example

| Table | Source Symbols |
|---|---|
| $S_1$ | $1o3^{-1}$ |
|  | $2o3^{-1}$ |
|  | $3o1^{-1}$ |
|  | $2o1^{-1}$ |
| $S_2$ | $1o4o6^{-1}$ |
|  | $1o5o6^{-1}$ |

The indices of the target properties, keyed on FlightID are:

TABLE XXXIX

Target Symbols for Third Example

| Table | Target Symbols | Paths |
|---|---|---|
| T | $2o4o6^{-1}$ | $(2o1^{-1}) \circ (1o4o6^{-1})$ |
|  | $2o5o6^{-1}$ | $(2o1^{-1}) \circ (1o5o6^{-1})$ |

Since the path $(2o1^{-1})$ appears in two rows of Table XXXIX, it is necessary to create two tables for $S_1$ in the SQL query. Based on the paths given in Table XXXVII, the desired SQL query is:

```
INSERT INTO T(FlightID,
DepartingCity, ArrivingCity)
(SELECT          S_2.FlightID AS FlightID,
                 S_11.Location AS DepartingCity,
                 S_12.Location AS ArrivingCity
FROM             S_1 S_11, S_1 S_12, S_2
WHERE            S_11.APName = S_2.FromAirport AND
                 S_12.APName = S_2.ToAirport);
```

In general,

Rule 4: When the same source symbol is used multiple times in representing target symbols, each occurrence of the source symbol must refer to a different copy of the source table containing it.

When applied to the following sample source data, Tables XL and XLI, the above SQL query produces the target data in Table XLII.

TABLE XL

Sample Source Table $S_1$ for Third Example

| Index | APName | Location |
|---|---|---|
| 1 | Orly | Paris |
| 2 | JFK | New York |
| 3 | LAX | Los Angeles |
| 4 | HNK | Hong Kong |
| 5 | TLV | Tel Aviv |
| 6 | Logan | Boston |

TABLE XLI

Sample Source Table $S_2$ for Third Example

| FlightID | FromAirport | ToAirport |
|----------|-------------|-----------|
| 001 | Orly | JFK |
| 002 | JFK | LAX |
| 003 | TLV | HNK |
| 004 | Logan | TLV |

TABLE XLII

Sample Target Table T for Third Example

| FlightID | DepartingCity | ArrivingCity |
|----------|---------------|--------------|
| 001 | Paris | New York |
| 002 | New York | Los Angeles |
| 003 | Tel Aviv | Hong Kong |
| 004 | Boston | Tel Aviv |

A Fourth Example

Lineage

In a fourth example, a target table is of the following form:

TABLE XLIII

Target Table T for Fourth Example

| ID | Name | Father_Name |
|----|------|-------------|

One source table is given as follows:

TABLE XLIV

Source Table S for Fourth and Fifth Examples

| ID | Name | Father_ID |
|----|------|-----------|

Figure 15:
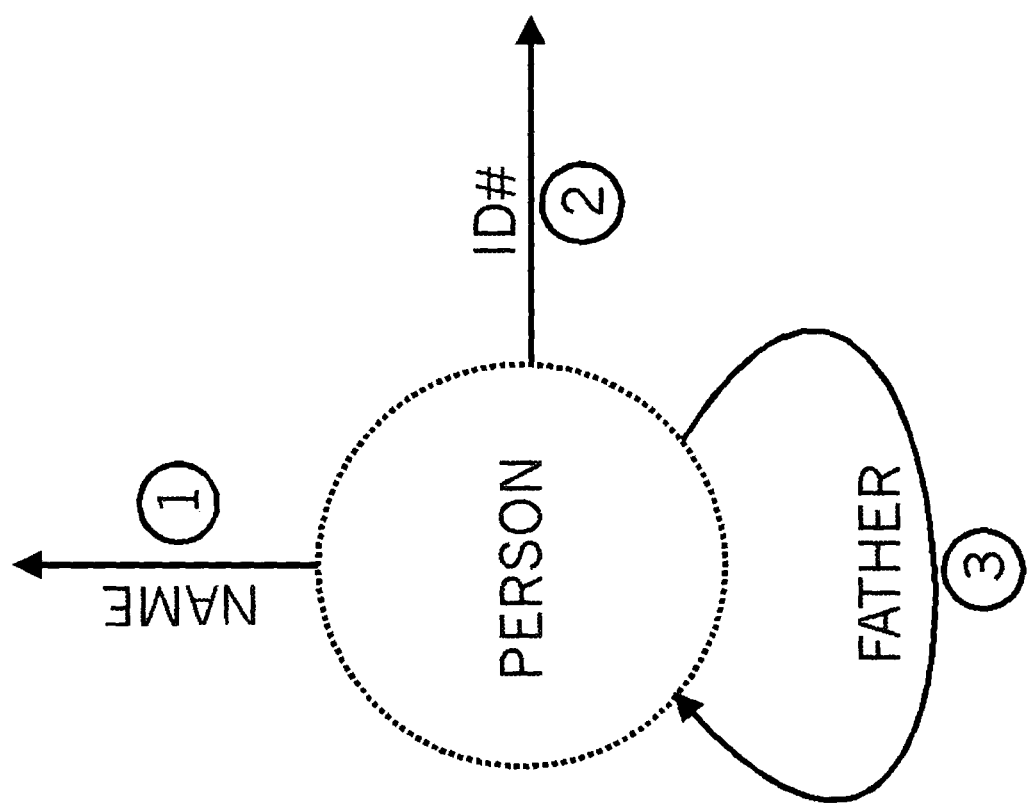
FIG. 15 is an illustration of ontology model corresponding to a fourth example.

The underlying ontology is illustrated in FIG. 15. The dotted portions of the ontology in FIG. 15 are additional ontology structure that is transparent to the relational database schema. The unique properties of the ontology are:

TABLE XLV

Unique Properties within Ontology for Fourth and Fifth Examples

| Property | Property Index |
|----------|----------------|
| name(Person) | 1 |
| ID#(Person) | 2 |

The mapping of the target schema into the ontology is as follows:

TABLE XLVI

Mapping from Target schema to Ontology for Fourth Example

| schema | Ontology | Property Index |
|--------|----------|----------------|
| T | Class: Person | |
| T.ID | Property: ID#(Person) | 2 |
| T.Name | Property: name(Person) | 1 |
| T.Father_Name | Property: name(father(Person)) | 1o3 |

The mapping of the source schema into the ontology is as follows:

TABLE XLVII

Mapping from Source schema to Ontology for Fourth and Fifth Examples

| schema | Ontology | Property Index |
|--------|----------|----------------|
| S | Class: Person | |
| S.ID | Property: ID#(Person) | 2 |
| S.Name | Property: name(Person) | 1 |
| S.Father_ID | Property: ID#(father(Person)) | 2o3 |

The indices of the source properties are:

TABLE XLVIII

Source Symbols for Fourth and Fifth Examples

| Table | Source Symbols |
|-------|----------------|
| $S_1$ | $1o2^{-1}$ |
|  | $2o3o2^{-1}$ |

The indices of the target properties, keyed on ID are:

TABLE XLIX

Target Symbols for Fourth Example

| Table | Target Symbols | Paths |
|-------|----------------|-------|
| T | $1o2^{-1}$ | $(1o2^{-1})$ |
|  | $1o3o2^{-1}$ | $(1o2^{-1}) \circ (2o3o2^{-1})$ |

Based on the paths given in Table XLIX, the desired SQL query is:

```
INSERT INTO T(ID, Name, Father_ID)
(SELECT      S_1.ID AS ID,
             S_1.Name AS Name,
             S_2.ID AS Father_ID
FROM         S S_1, S S_2
WHERE        S_2.ID = S_1.Father_ID);
```

A Fifth Example

Lineage

In a fifth example, the target property of Father_Name in the fourth example is changed to Grandfather_Name, and the target table is thus of the following form:

TABLE L

Target Table T for Fifth Example

| ID | Name | Grandfather_Name |
|----|------|------------------|

One source table is given as above in Table XLIV.

The underlying ontology is again illustrated in FIG. 15. The unique properties of the ontology are as above in Table XLV.

The mapping of the target schema into the ontology is as follows:

TABLE LI

Mapping from Target schema to Ontology for Fifth Example

| schema | Ontology | Property Index |
|---|---|---|
| T | Class: Person | |
| T.ID | Property: ID#(Person) | 2 |
| T.Name | Property: name(Person) | 1 |
| T.Grandfather_Name | Property: name(father(father(Person))) | 1o3o3 |

The mapping of the source schema into the ontology is given in Table XLVII above.

The indices of the source properties are given in Table XLVIII above.

The indices of the target properties, keyed on ID are:

TABLE LII

Target Symbols for Fifth Example

| Table | Target Symbols | Paths |
|---|---|---|
| T | $1o2^{-1}$ | $(1o2^{-1})$ |
| | $1o3o3o2^{-1}$ | $(1o2^{-1}) \circ (2o3o2^{-1}) \circ (2o3o2^{-1})$ |

Based on the paths given in Table LII, the desired SQL query is:

```
INSERT INTO T(ID, Name,
Grandfather_ID)
(SELECT       S₁.ID AS ID, S₁.Name AS Name,
              S₃.ID AS Grandfather_ID
FROM          S S₁, S S₂, S S₃
WHERE         S₃.ID = S₂.Father_ID AND
              S₂.ID = S₁.Father_ID);
```

A Sixth Example

Dog Owners

In a sixth example, a target table is of the following form:

TABLE LIII

Target Table T for Sixth Example

| ID | Name | Dogs_Previous_Owner |
|---|---|---|

Two source tables are given as follows:

TABLE LIV

Source Table $S_1$ for Sixth Example

| ID | Name | Dog |
|---|---|---|

TABLE LV

Source Table $S_2$ for Sixth Example

| Owner | Name | Previous_Owner |
|---|---|---|

Figure 16:
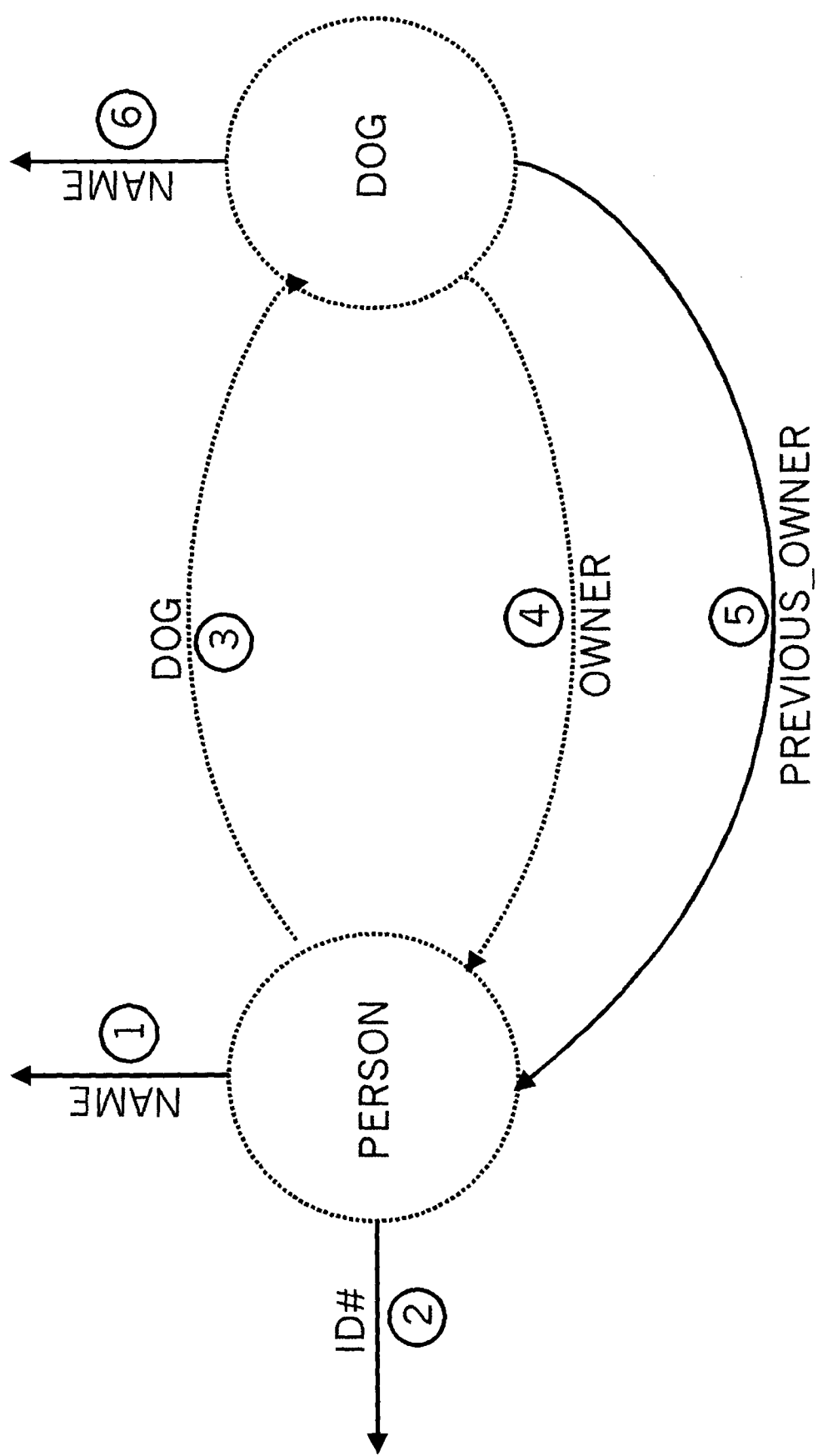
FIG. 16 is an illustration of ontology model corresponding to a fifth and sixth example.

The underlying ontology is illustrated in FIG. 16. The dotted portions of the ontology in FIG. 16 are additional ontology structure that is transparent to the relational database schema. The unique properties of the ontology are:

TABLE LVI

Unique Properties within Ontology for Sixth Example

| Property | Property Index |
|---|---|
| ID#(Person) | 2 |
| name(Dog) | 6 |

The mapping of the target schema into the ontology is as follows:

TABLE LVII

Mapping from Target schema to Ontology for Sixth Example

| schema | Ontology | Property Index |
|---|---|---|
| T | Class: Person | |
| T.ID | Property: ID#(Person) | 2 |
| T.Name | Property: name(Person) | 1 |
| T.Dogs_Previous_Owner | Property: previous_owner(dog(Person)) | 5o3 |

The mapping of the source schema into the ontology is as follows:

TABLE LVIII

Mapping from Source schema to Ontology for Sixth Example

| schema | Ontology | Property Index |
|---|---|---|
| $S_1$ | Class: Person | |
| $S_1$.ID | Property: ID#(Person) | 2 |
| $S_1$.Name | Property: name(Person) | 1 |
| $S_1$.Dog | Property: name(dog(Person)) | 6o3 |
| $S_2$ | Class: Dog | |
| $S_2$.Owner | Property: name(owner(Dog)) | 1o4 |
| $S_2$.Name | Property: name(Dog) | 6 |
| $S_2$.Previous_Owner | Property: name(previous_owner(Dog)) | 1o5 |

The indices of the source properties are:

TABLE LIX

Source Symbols for Sixth Example

| Table | Source Symbols |
|---|---|
| $S_1$ | $1o2^{-1}$ |
| | $6o3o2^{-1}$ |
| $S_2$ | $1o4o6^{-1}$ |
| | $1o5o6^{-1}$ |

The indices of the target properties, keyed on ID are:

TABLE LX

Target Symbols for Sixth Example

| Table | Target Symbols | Paths |
|---|---|---|
| T | $1o2^{-1}$ | $(1o2^{-1})$ |
|   | $5o3o2^{-1}$ | $(1o5o6^{-1}) \circ (6o3o2^{-1})$ |

Based on the paths given in Table LX, the desired SQL query is:

```
INSERT INTO T(ID, Name, Dogs_
Previous_Owner)
(SELECT      S₁.ID AS ID, S₁.Name AS Name,
             S₂.Previous_Owner AS Dogs_
             Previous_Owner
FROM         S₁, S₂
WHERE        S₂.Name = S₁.Dog);
```

A Seventh Example

Employees

In a seventh example, a target table is of the following form:

TABLE LXI

Target Table T for Seventh Example

| ID | Name | Email | Department |
|---|---|---|---|

Five source tables are given as follows:

TABLE LXII

Source Table $S_1$ for Seventh Example

| ID | Department |
|---|---|

TABLE LXIII

Source Table $S_2$ for Seventh Example

| ID | Email |
|---|---|

TABLE LXIV

Source Table $S_3$ for Seventh Example

| ID | Name |
|---|---|

TABLE LXV

Source Table $S_4$ for Seventh Example

| ID | Email |
|---|---|

TABLE LXVI

Source Table $S_5$ for Seventh Example

| ID | Department |
|---|---|

Figure 17:
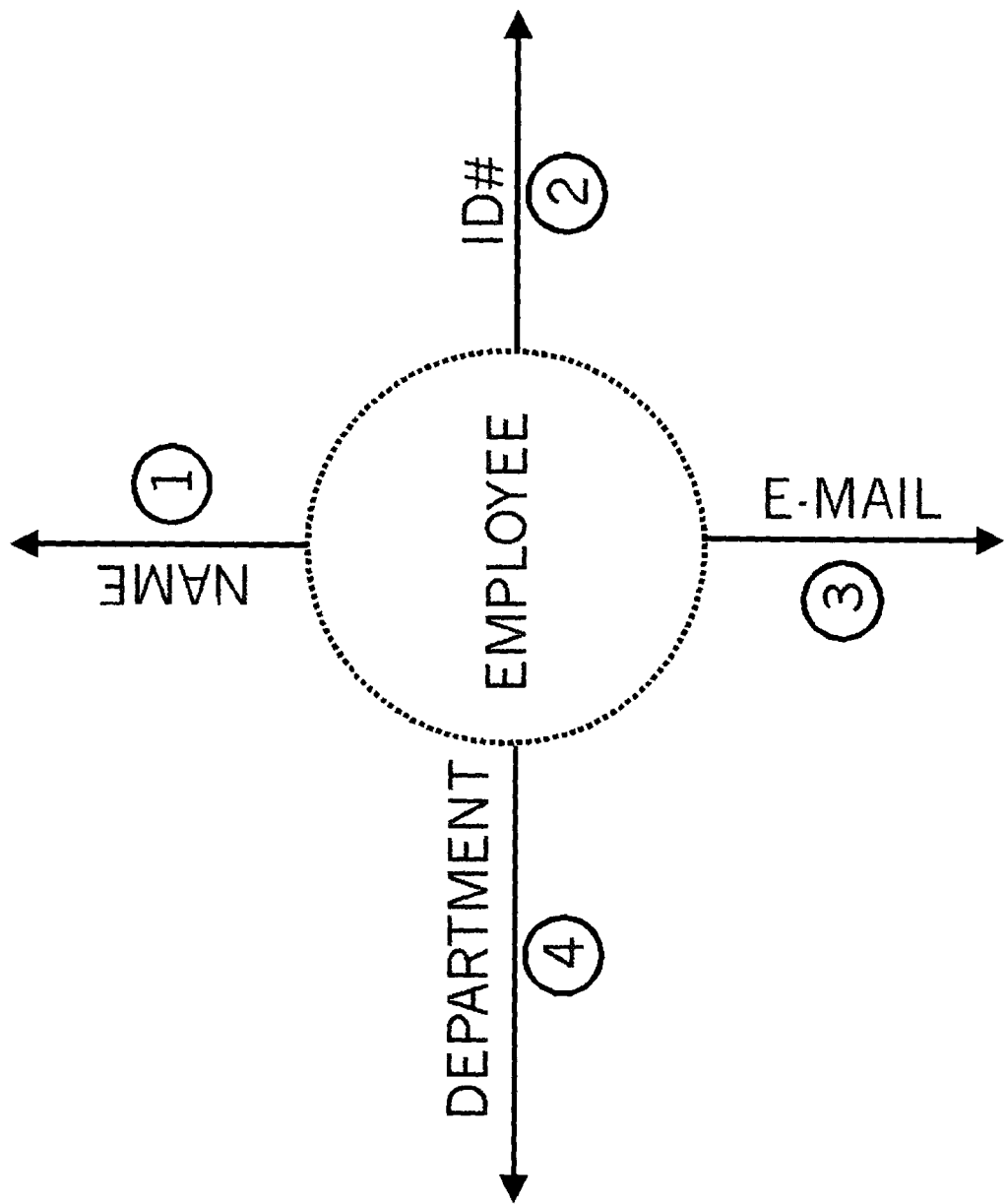
FIG. 17 is an illustration of ontology model corresponding to a seventh example.

The underlying ontology is illustrated in FIG. 17. The dotted portions of the ontology in FIG. 17 are additional ontology structure that is transparent to the relational database schema. The unique properties of the ontology are:

TABLE LXVII

Unique Properties within Ontology for Seventh Example

| Property | Property Index |
|---|---|
| ID#(Person) | 2 |

The mapping of the target schema into the ontology is as follows:

TABLE LXVIII

Mapping from Target schema to Ontology for Seventh Example

| schema | Ontology | Property Index |
|---|---|---|
| T | Class: Person | |
| T.ID | Property: ID#(Person) | 2 |
| T.Name | Property: name(Person) | 1 |
| T.Email | Property: e-mail(Person) | 3 |
| T.Department | Property: department(Person) | 4 |

The mapping of the source schema into the ontology is as follows:

TABLE LXIX

Mapping from Source schema to Ontology for Seventh Example

| schema | Ontology | Property Index |
|---|---|---|
| $S_1$ | Class: Employee | |
| $S_1$.ID | Property: ID#(Employee) | 2 |
| $S_1$.Department | Property: department(Employee) | 4 |
| $S_2$ | Class: Employee | |
| $S_2$.ID | Property: ID#(Employee) | 2 |
| $S_2$.Email | Property: e-mail(Employee) | 3 |
| $S_3$ | Class: Employee | |
| $S_3$.ID | Property: ID#(Employee) | 2 |
| $S_3$.Name | Property: name(Employee) | 1 |
| $S_4$ | Class: Employee | |
| $S_4$.ID | Property: ID#(Employee) | 2 |
| $S_4$.Email | Property: e-mail(Employee) | 3 |
| $S_5$ | Class: Employee | |
| $S_5$.ID | Property: ID#(Employee) | 2 |
| $S_5$.Department | Property: department(Employee) | 4 |

The indices of the source properties are:

TABLE LXX

Source Symbols for Seventh Example

| Table | Source Symbols |
|---|---|
| $S_1$ | $4o2^{-1}$ |
| $S_2$ | $3o2^{-1}$ |
| $S_3$ | $1o2^{-1}$ |
| $S_4$ | $3o2^{-1}$ |
| $S_5$ | $4o2^{-1}$ |

The indices of the target properties, keyed on ID are:

TABLE LXXI

Target Symbols for Seventh Example

| Table | Target Symbols | Paths |
|---|---|---|
| T | $1o2^{-1}$ | $(1o2^{-1})$ |
|   | $3o2^{-1}$ | $(3o2^{-1})$ |
|   | $4o2^{-1}$ | $(4o2^{-1})$ |

Based on the paths given in Table LXXI, the desired SQL query is:

```
INSERT INTO T(ID, Name, Email, Department)
(SELECT
         S₁.ID AS ID, S₃.Name AS Name,
         S₂.Email AS Email,
         S₁.Department AS Department
FROM
         S₁, S₂, S₃
WHERE
         S2. ID = S₁.ID AND S₃.ID = S₁.ID
UNION
SELECT
         S₁.ID AS ID,
         S₃.Name AS Name,
         S₄.Email AS Email,
         S₁.Department AS Department
FROM
         S₁, S₃, S₄
WHERE
         S₃.ID = S₁.ID AND S₄.ID = S₁.ID
UNION
SELECT
         S₁.ID AS ID,
         S₃.Name AS Name,
         S₂.Email AS Email,
         S₅.Department AS Department
FROM
         S₁, S₂, S₃, S₅
WHERE
         S₂.ID = S₁.ID AND S₃.ID = S₁.ID AND S₅.ID = S₁.ID
UNION
SELECT
         S₁.ID AS ID,
         S₃.Name AS Name,
         S₄.Email AS Email,
         S₅.Department AS Department
FROM
         S₁, S₃, S₄, S₅
WHERE
         S₂.ID = S₁.ID AND S₃.ID = S₁.ID AND
         S₄.ID = S₁.ID AND S₅.ID = S₁.ID);
```

In general,

Rule 5: When a source symbol used to represent a target symbol is present in multiple source tables, each such table must be referenced in an SQL query and the resultant queries joined.

When applied to the following sample source data, Tables LXXII, LXXIII, LXXIV, LXXV and LXXVI, the above SQL query produces the target data in Table LXXVII.

TABLE LXXII

Sample Source Table $S_1$ for Seventh Example

| ID | Department |
|---|---|
| 123 | SW |
| 456 | PdM |
| 789 | SW |

TABLE LXXIII

Sample Source Table $S_2$ for Seventh Example

| ID | Email |
|---|---|
| 123 | jack@company |
| 456 | jan@company |
| 789 | jill@company |

TABLE LXXIV

Sample Source Table $S_3$ for Seventh Example

| ID | Name |
|---|---|
| 123 | Jack |
| 456 | Jan |
| 789 | Jill |
| 999 | Joe |
| 111 | Jim |
| 888 | Jeffrey |

TABLE LXXV

Sample Source Table $S_4$ for Seventh Example

| ID | Email |
|---|---|
| 999 | joe@company |
| 111 | jim@company |
| 888 | jeffrey@company |

TABLE LXXVI

Sample Source Table $S_5$ for Seventh Example

| ID | Department |
|---|---|
| 999 | Sales |
| 111 | Business_Dev |
| 888 | PdM |

TABLE LXXVII

Sample Target Table T for Seventh Example

| ID | Name | Email | Department |
|---|---|---|---|
| 123 | Jack | jack@company | SW |
| 456 | Jan | jan@company | PdM |
| 789 | Jill | jill@company | SW |
| 111 | Jim | jim@company | Business_Dev |
| 888 | Jeffrey | jeffrey@company | PdM |
| 999 | Joe | joe@company | Sales |

A Eighth Example

Employees

In an eighth example, a target table is of the following form:

TABLE LXXVIII

Target Table T for Eighth Example

| Emp_Name | Emp_Division | Emp_Tel_No |
|---|---|---|

Two source tables are given as follows:

TABLE LXXIX

Source Table $S_1$ for Eighth Example

| Employee_Division | Employee_Tel# | Employee_Name | Room# |
|---|---|---|---|

TABLE LXXX

Source Table $S_2$ for Eighth Example

| Name | Employee_Tel | Division |
|---|---|---|

Figure 18:
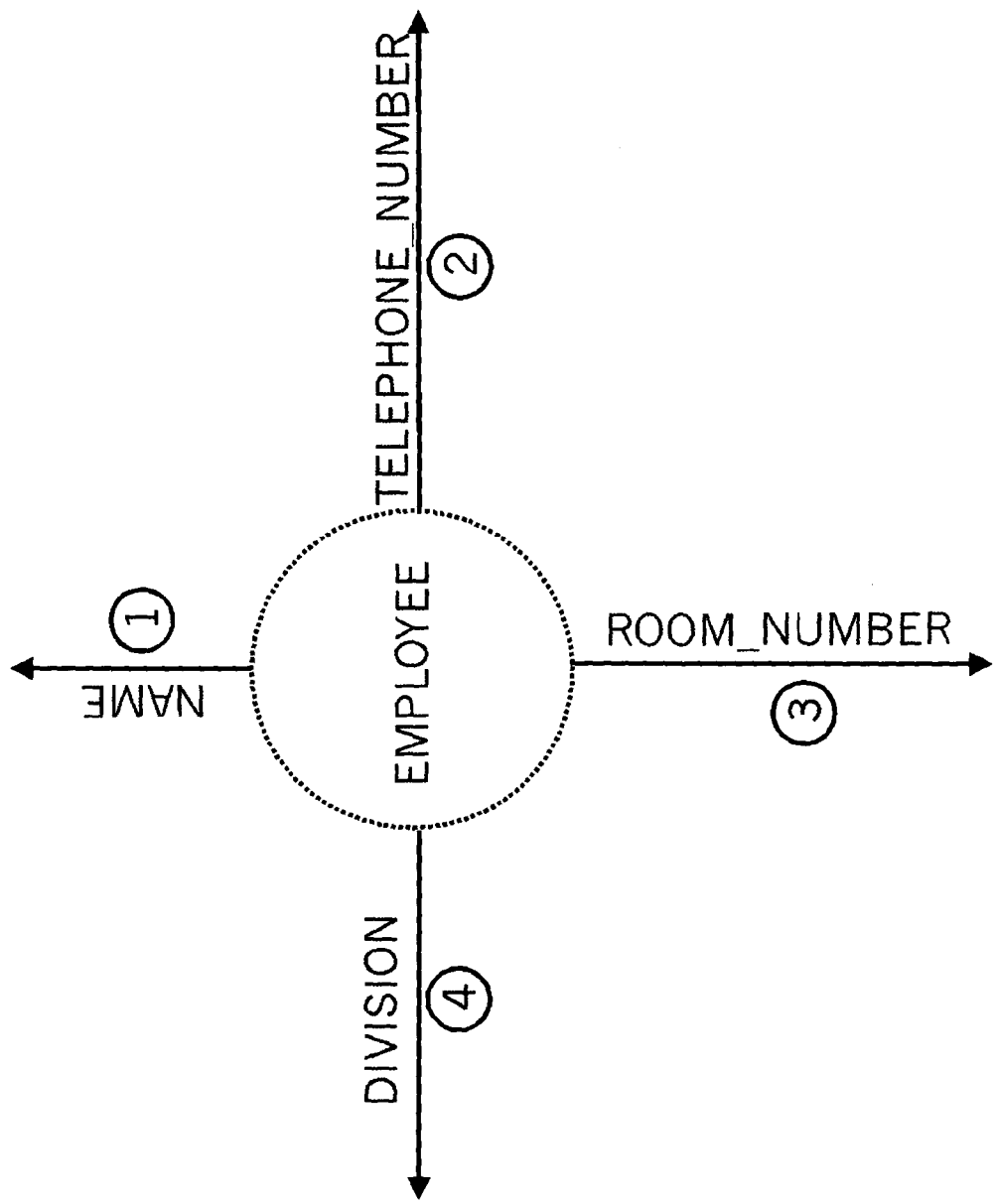
FIG. 18 is an illustration of ontology model corresponding to an eighth example

The underlying ontology is illustrated in FIG. 18. The dotted portions of the ontology in FIG. 18 are additional ontology structure that is transparent to the relational database schema. The unique properties of the ontology are:

TABLE LXXXI

Unique Properties within Ontology for Eighth Example

| Property | Property Index |
|---|---|
| name(Employee) | 1 |

The mapping of the target schema into the ontology is as follows:

TABLE LXXXII

Mapping from Target schema to Ontology for Eighth Example

| schema | Ontology | Property Index |
|---|---|---|
| T | Class: Employee | |
| T.Emp_Name | Property: name(Employee) | 1 |
| T.Emp_Division | Property: division(Employee) | 4 |
| T.Emp_Tel_No | Property: telephone_number(Employee) | 2 |

The mapping of the source schema into the ontology is as follows:

TABLE LXXXIII

Mapping from Source schema to Ontology for Eighth Example

| schema | Ontology | Property Index |
|---|---|---|
| $S_1$ | Class: Employee | |
| $S_1$.Employee_Division | Property: division(Employee) | 4 |
| $S_1$.Employee_Tel# | Property: telephone_number(Employee) | 2 |
| $S_1$.Employee_Name | Property: name(Employee) | 1 |
| $S_1$.Employee_Room# | Property: room_number(Employee) | 3 |

TABLE LXXXIII-continued

Mapping from Source schema to Ontology for Eighth Example

| schema | Ontology | Property Index |
|---|---|---|
| $S_2$ | Class: Employee | |
| $S_2$.Name | Property: name(Employee) | 1 |
| $S_2$.Employee_Tel | Property: telephone_number(Employee) | 2 |
| $S_2$.Division | Property: division(Employee) | 4 |

The indices of the source properties are:

TABLE LXXXIV

Source Symbols for Eighth Example

| Table | Source Symbols |
|---|---|
| $S_1$ | $4o1^{-1}$ |
|  | $2o1^{-1}$ |
|  | $3o1^{-1}$ |
| $S_2$ | $2o1^{-1}$ |
|  | $4o1^{-1}$ |

The indices of the target properties, keyed on Emp_Name are:

TABLE LXXXV

Target Symbols for Eighth Example

| Table | Target Symbols | Paths |
|---|---|---|
| T | $4o1^{-1}$ | $(4o1^{-1})$ |
|   | $2o1^{-1}$ | $(2o1^{-1})$ |

Since each of the source tables $S_1$ and $S_2$ suffice to generate the target table T, the desired SQL is a union of a query involving $S_1$ alone and a query involving $S_2$ alone. Specifically, based on the paths given in Table LXXXV, the desired SQL query is:

```
INSERT INTO T(Emp_Name, Emp_Division, Emp_Tel_No)
(SELECT
            S1.Employee_Name AS Emp_Name,
            S1.Employee_Division AS Emp_Division,
            S1.Employee_Tel# AS Emp_Tel_No
FROM
            S1
UNION
SELECT
            S2.Employee_Name AS Emp_Name,
            S2.Employee_Division AS Emp_Division,
            S2.Employee_Tel# AS Emp_Tel_No
FROM S2);
```

In general,

Rule 6: When one or more source tables contain source symbols sufficient to generate all of the target symbols, then each such source table must be used alone in an SQL query, and the resultant queries joined. (Note that Rule 6 is consistent with Rule 5.)

When applied to the following sample source data, Tables LXXXVI and LXXXVII, the above SQL query produces the target data in Table LXXXVIII.

TABLE LXXXVI

Sample Source Table $S_1$ for Eighth Example

| Employee_Division | Employee_Tel# | Employee_Name | Room# |
|---|---|---|---|
| Engineering | 113 | Richard | 10 |
| SW | 118 | Adrian | 4 |
| Engineering | 105 | David | 10 |

TABLE LXXXVII

Sample Source Table $S_2$ for Eighth Example

| Name | Employee_Tel | Division |
|---|---|---|
| Henry | 117 | SW |
| Robert | 106 | IT |
| William | 119 | PdM |
| Richard | 113 | Engineering |

TABLE LXXXVIII

Sample Target Table T for Eighth Example

| Emp_Name | Emp_Division | Emp_Tel_No |
|---|---|---|
| Tom | Engineering | 113 |
| Adrian | SW | 118 |
| David | Engineering | 105 |
| Henry | SW | 117 |
| Robert | IT | 106 |
| William | PdM | 119 |

A Ninth Example

Data Constraints

In a ninth example, a target table is of the following form:

TABLE LXXXIX

Target Table T for Ninth Example

| City | Temperature |
|---|---|

Two source tables are given as follows:

TABLE XC

Source Table $S_1$ for Ninth Example

| City | Temperature |
|---|---|

TABLE XCI

Source Table $S_2$ for Ninth Example

| City | C_Temperature |
|---|---|

Figure 19:
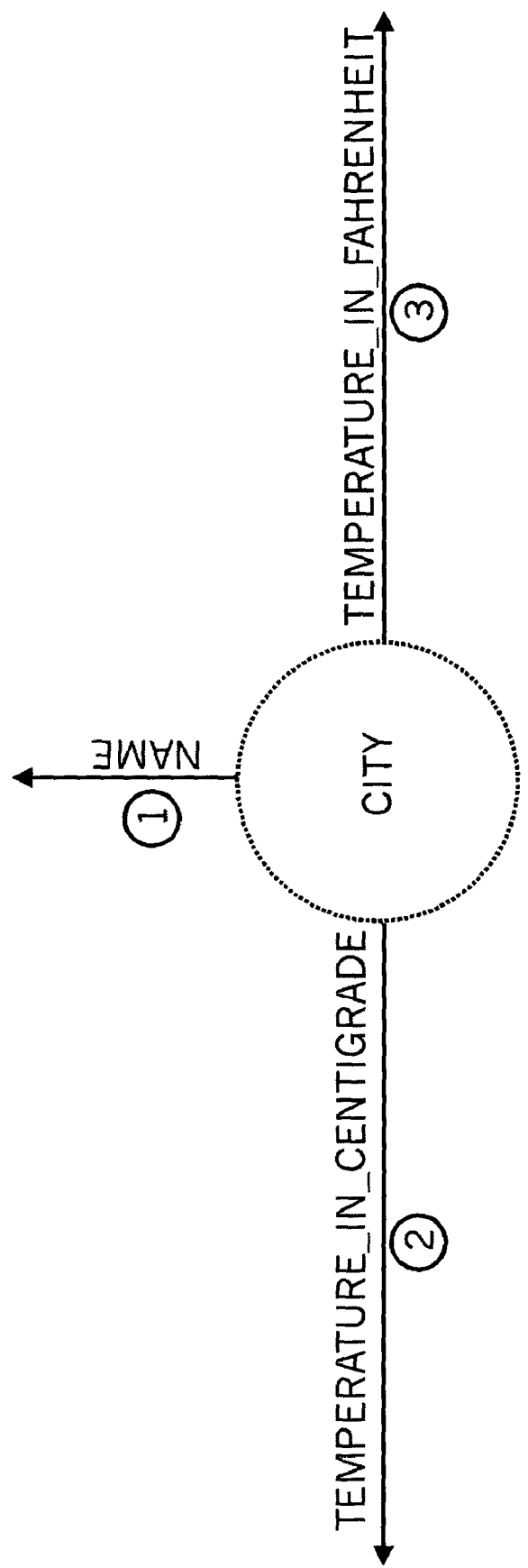
FIG. 19 is an illustration of ontology model corresponding to a ninth example

The underlying ontology is illustrated in FIG. 19. The dotted portions of the ontology in FIG. 19 are additional ontology structure that is transparent to the relational database schema. The properties temperature_in_Centrigade and temperature_in_Fahrenheit are related by the constraint:

Temperature_in_Centrigade(City)=5/9*(Temperature_in_Fahrenheit(City)−32)

The unique properties of the ontology are:

TABLE XCII

Unique Properties within Ontology for Ninth Example

| Property | Property Index |
|---|---|
| name(City) | 1 |

The mapping of the target schema into the ontology is as follows:

TABLE XCIII

Mapping from Target schema to Ontology for Ninth Example

| schema | Ontology | Property Index |
|---|---|---|
| T | Class: City | |
| T.City | Property: name(City) | 1 |
| T.Temperature | Property: temperature_in_Centigrade(City) | 2 |

The mapping of the source schema into the ontology is as follows:

TABLE XCIV

Mapping from Source schema to Ontology for Ninth Example

| schema | Ontology | Property Index |
|---|---|---|
| $S_1$ | Class: City | |
| $S_1$.City | Property: name(City) | 1 |
| $S_1$.Temperature | Property: temperature_in_Fahrenheit(City) | 3 |
| $S_2$ | Class: City | |
| $S_2$.City | Property: name(City) | 1 |
| $S_2$.C_Temperature | Property: temperature_in_Centrigade(City) | 2 |

The indices of the source properties are:

TABLE XCV

Source Symbols for Ninth Example

| Table | Source Symbols |
|---|---|
| $S_1$ | |
| | $3o1^{-1}$ |
| $S_2$ | |
| | $2o1^{-1}$ |

The indices of the target properties, keyed on City are:

TABLE XCVI

Target Symbols for Ninth Example

| Table | Target Symbols | Paths |
|---|---|---|
| T | | |
| | $2o1^{-1}$ | $5/9 * ((3o1^{-1}) - 32)$ ($2o1^{-1}$) |

Since each of the source tables $S_1$ and $S_2$ suffice to generate the target table T, the desired SQL is a union of a query involving $S_1$ alone and a query involving $S_2$ alone. Specifically, based on the paths given in Table XCVI, the desired SQL query is:

```
INSERT INTO T(City, Temperature)
(SELECT
        S_1.City AS City,
        5/9 * (S_1.Temperature - 32) AS Temperature
FROM
        S_1
UNION
SELECT
        S_2.City AS City, S_2.Temperature AS Temperature
FROM
        S_2);
```

In general,

Rule 7: When a target symbol can be expressed in terms of one or more source symbols by a dependency constraint, then such constraint must appear in the list of target symbols.

When applied to the following sample source data, Tables XCVII and XCVIII, the above SQL query produces the target data in Table XCIX.

TABLE XCVII

Sample Source Table $S_1$ for Ninth Example

| City | Temperature |
|---|---|
| New York | 78 |
| Phoenix | 92 |
| Anchorage | 36 |
| Boston | 72 |

TABLE XCVIII

Sample Source Table $S_2$ for Ninth Example

| City | C._Temperature |
|---|---|
| Moscow | 12 |
| Brussels | 23 |
| Tel Aviv | 32 |
| London | 16 |

TABLE XCIX

Sample Target Table T for Ninth Example

| City | Temperature |
|---|---|
| New York | 25.5 |
| Phoenix | 33.3 |
| Anchorage | 2.22 |
| Boston | 22.2 |
| Moscow | 12 |
| Brussels | 23 |
| Tel Aviv | 32 |
| London | 16 |

A Tenth Example

Pricing

In a tenth example, a target table is of the following form:

TABLE C

Target Table T for Tenth Example

| Product | Price |
|---|---|

Two source tables are given as follows:

TABLE CI

Source Table $S_1$ for Tenth Example

| SKU | Cost |
|---|---|

TABLE CII

Source Table $S_2$ for Tenth Example

| Item | Margin |
|---|---|

Figure 20:
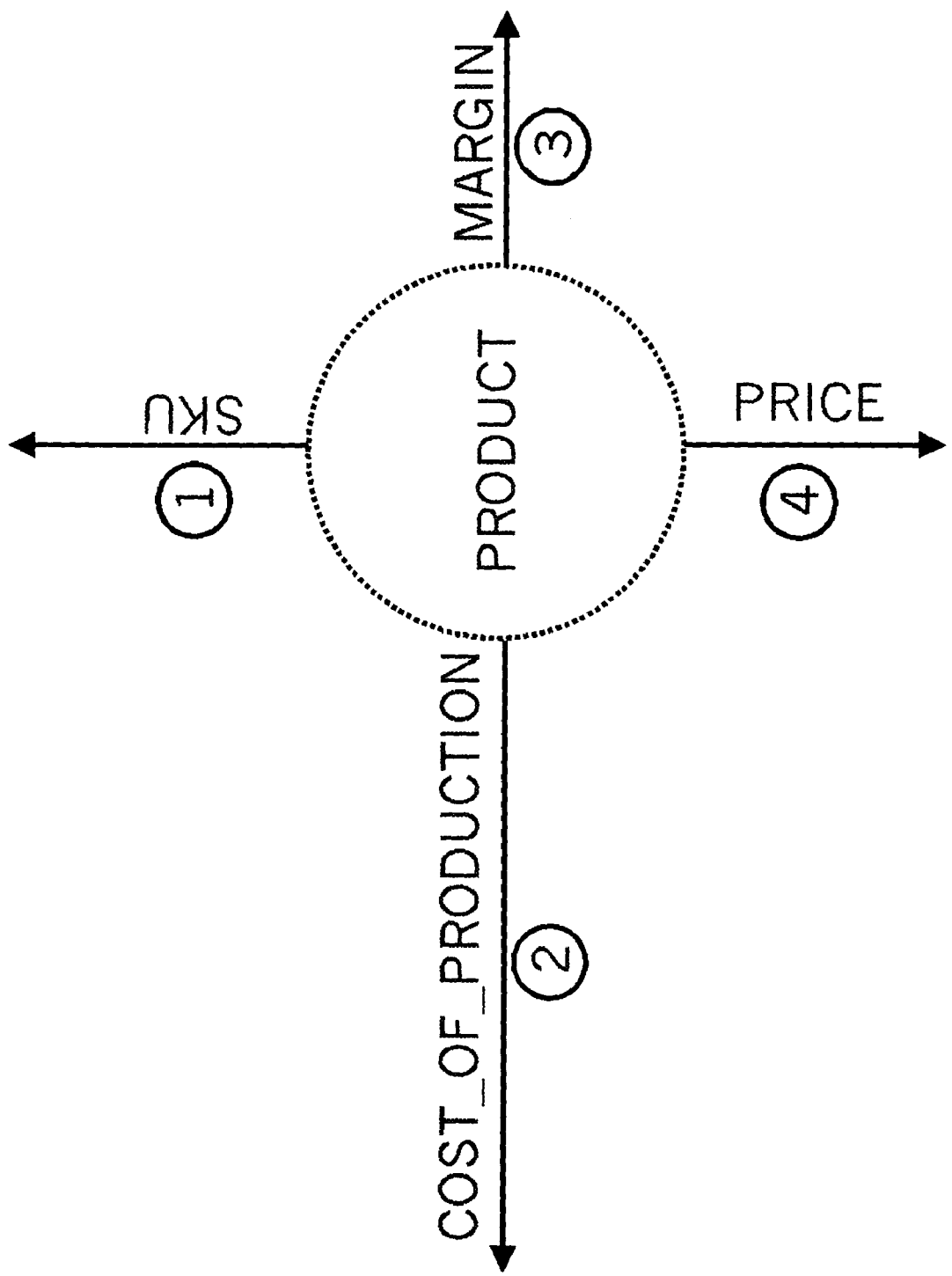
FIG. 20 is an illustration of ontology model corresponding to a tenth example.

The underlying ontology is illustrated in FIG. 20. The dotted portions of the ontology in FIG. 20 are additional ontology structure that is transparent to the relational database schema. The properties price, cost_of_production and margin are related by the constraint:

price(Product)=cost_of_production(Product)*margin(Product).

The unique properties of the ontology are:

TABLE CIII

Unique Properties within Ontology for Tenth Example

| Property | Property Index |
|---|---|
| SKU(Product) | 1 |

The mapping of the target schema into the ontology is as follows:

TABLE CIV

Mapping from Target schema to Ontology for Tenth Example

| schema | Ontology | Propert Index |
|---|---|---|
| T | Class: Product | |
| T.Product | Property: SKU(Product) | 1 |
| T.Price | Property: price(Product) | 4 |

The mapping of the source schema into the ontology is as follows:

TABLE CV

Mapping from Source schema to Ontology for Tenth Example

| schema | Ontology | Property Index |
|---|---|---|
| $S_1$ | Class: Product | |
| $S_1$.SKU | Property: SKU(Product) | 1 |
| $S_1$.Cost | Property: cost_of_production(Product) | 2 |
| $S_2$ | Class: Product | |

TABLE CV-continued

Mapping from Source schema to Ontology for Tenth Example

| schema | Ontology | Property Index |
|---|---|---|
| $S_2$.Item | Property: SKU(Product) | 1 |
| $S_2$.Margin | Property: margin(Product) | 3 |

The indices of the source properties are:

TABLE CVI

Source Symbols for Tenth Example

| Table | Source Symbols |
|---|---|
| $S_1$ | $2o1^{-1}$ |
| $S_2$ | $3o1^{-1}$ |

The indices of the target properties, keyed on Product are:

TABLE CVII

Target Symbols for Tenth Example

| Table | Target Symbols | Paths |
|---|---|---|
| T | $4o1^{-1}$ | $(2o1^{-1}) * (3o1^{-})$ |

Based on the paths given in Table CVII, the desired SQL query is:

| INSERT INTO T(Product, Price) |
|---|
| (SELECT $S_1$.SKU AS Product, $(S_1$.Cost$) * (S_2$.Margin$)$ AS Price |
| FROM $S_1, S_2$ |
| WHERE $S_2$.Item = $S_1$.SKU); |

When applied to the following sample source data, Tables CVIII and CVIX, the above SQL query produces the target data in Table CX.

TABLE CVIII

Sample Source Table $S_1$ for Tenth Example

| SKU | Cost |
|---|---|
| 123 | 2.2 |
| 234 | 3.3 |
| 345 | 4.4 |
| 456 | 5.5 |

TABLE CIX

Sample Source Table $S_2$ for Tenth Example

| Item | Margin |
|---|---|
| 123 | 1.2 |
| 234 | 1.1 |
| 345 | 1.04 |
| 456 | 1.3 |

TABLE CX

Sample Target Table T for Tenth Example

| Product | Price |
|---|---|
| 123 | 2.86 |
| 234 | 3.96 |
| 345 | 4.84 |
| 456 | 5.72 |

An Eleventh Example

String Concatenation

In an eleventh example, a target table is of the following form:

TABLE CXI

Target Table T for Eleventh Example

| ID# | Full_Name |
|---|---|

One source table is given as follows:

TABLE CXII

Source Table S for Eleventh Example

| ID# | First_Name | Last_Name |
|---|---|---|

Figure 21:
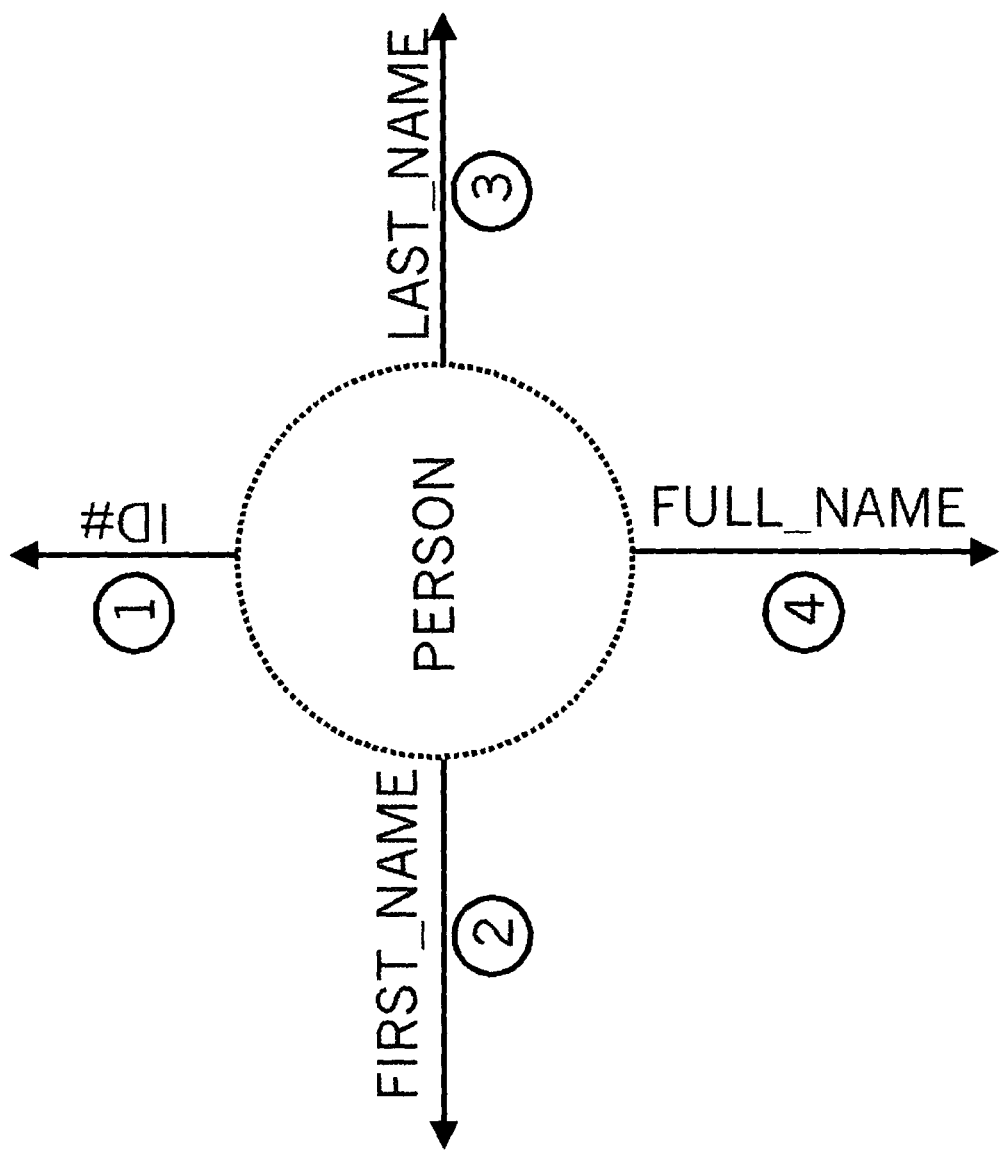
FIG. 21 is an illustration of ontology model corresponding to an eleventh example.

The underlying ontology is illustrated in FIG. 21. The dotted portions of the ontology in FIG. 21 are additional ontology structure that is transparent to the relational database schema. The properties full_name, first_name and last_name are related by the constraint:

full_name(Person)=first_name(Person)||last_name(Person), where || denotes string concatenation.

The unique properties of the ontology are:

TABLE CXIII

Unique Properties within Ontology for Eleventh Example

| Property | Property Index |
|---|---|
| ID#(Product) | 1 |

The mapping of the target schema into the ontology is as follows:

TABLE CXIV

Mapping from Target schema to Ontology for Eleventh Example

| schema | Ontology | Property Index |
|---|---|---|
| T | Class: Person | |
| T.ID# | Property: ID#(Person) | 1 |
| T.Full_Name | Property: full_name(Person) | 4 |

The mapping of the source schema into the ontology is as follows:

TABLE CXV

Mapping from Source schema to Ontology for Eleventh Example

| schema | Ontology | Property Index |
|---|---|---|
| S | Class: Person | |
| S.ID# | Property: ID#(Person) | 1 |
| S.First_Name | Property: first_name(Person) | 2 |
| S.Last_Name | Property: last_name(Person) | 3 |

The indices of the source properties are:

TABLE CXVI

Source Symbols for Eleventh Example

| Table | Source Symbols |
|---|---|
| S | $2o1^{-1}$ |
|   | $2o1^{-1}$ |

The indices of the target properties, keyed on ID# are:

TABLE CXVII

Target Symbols for Eleventh Example

| Table | Target Symbols | Paths |
|---|---|---|
| T | $4o1^{-1}$ | $(2o1^{-1}) \parallel (3o1^{-1})$ |

Based on the paths given in Table CXVII, the desired SQL query is:

```
INSERT INTO T(ID#, Full_Name)
(SELECT              S.ID# AS ID#,
                     (S.First_Name) || (S.Last_Name)
                     AS Full_Name
FROM                 S);
```

When applied to the following sample source data, Table CXVIII, the above SQL query produces the target data in Table CXIX.

TABLE CXVIII

Sample Source Table S for Eleventh Example

| ID# | First_Name | Last_Name |
|---|---|---|
| 123 | Timothy | Smith |
| 234 | Janet | Ferguson |
| 345 | Ronald | Thompson |
| 456 | Marie | Baker |
| 567 | Adrian | Clark |

TABLE CXIX

Sample Target Table T for Eleventh Example

| ID# | Full_Name |
|---|---|
| 123 | Timothy Smith |
| 234 | Janet Ferguson |
| 345 | Ronald Thompson |
| 456 | Marie Baker |
| 567 | Adrian Clark |

A Twelfth Example

Books→Documents

A source XML schema for books is given by:

```
<?xml version="1.0" encoding="UTF-8"?>
<xs:schema xmlns:xs="http://www.w3.org/2001/XMLschema">
<xs:element name="book" type="Book"/>
<xs:complexType name="Book">
    <xs:sequence>
        <xs:element name="name" type="xs:string"/>
        <xs:element name="author" type="Author"/>
    </xs:sequence>
</xs:complexType>
<xs:complexType name="Author">
    <xs:attribute name="name"/>
</xs:complexType>
</xs:schema>
```

A target XML schema for documents is given by:

```
<?xml version="1.0" encoding="UTF-8"?>
<xs:schema xmlns:xs="http://www.w3.org/2001/XMLschema">
<xs:element name="document" type="Document"/>
<xs:complexType name="Document">
    <xs:all>
        <xs:element name="writer" type="xs:string"/>
    </xs:all>
    <xs:attribute name="title"/>
</ xs:complexType>
</xs:schema>
```

Figure 22:
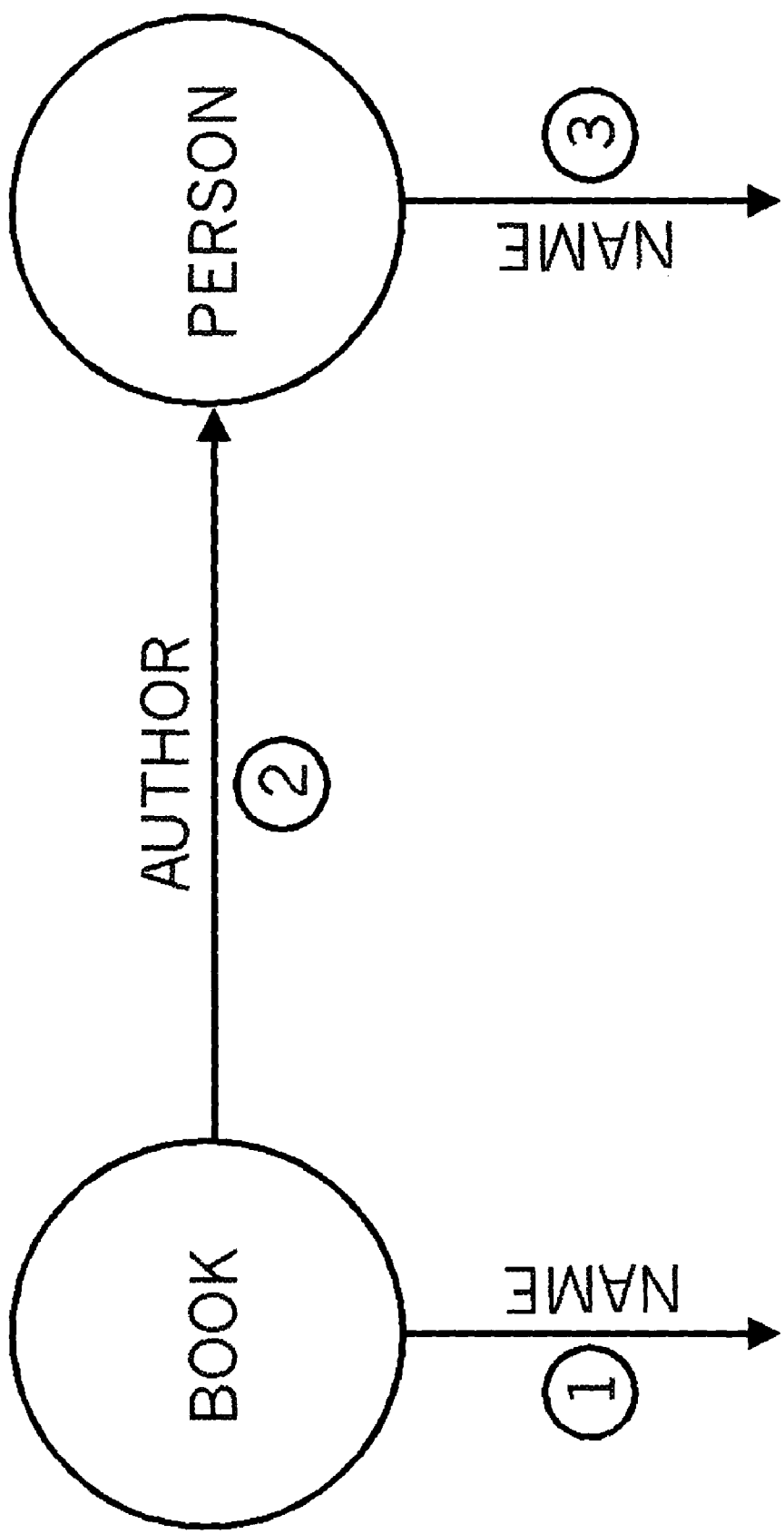
FIG. 22 is an illustration of ontology model corresponding to a twelfth and seventeenth example.

A common ontology model for the source and target XML schema is illustrated in FIG. 22. A mapping of the source XML schema into the ontology model is given by:

TABLE CXX

Mapping from Source schema to Ontology for Twelfth and Thirteenth Examples

| schema | Ontology | Property Index |
|---|---|---|
| complexType: book | Class: Book | |
| element: book/name/text() | Property: name(Book) | 1 |
| element: book/author | Property: author(Book) | 2 |
| complexType: author | Class: Person | |
| element: author/@name | Property: name(Person) | 3 |

A mapping of the target XML schema into the ontology model is given by:

TABLE CXXI
Mapping from Target schema to Ontology for Twelfth Example

| schema | Ontology | Property Index |
|---|---|---|
| complexType: document element: document/writer/text() | Class: Book Property: name(auhor(Book)) | 3o2 |
| attribute: document/@title | Property: name(Book) | 1 |

Tables CXX and CXXI use XPath notation to designate XSL elements and attributes.

Based on Tables CXX and CXXI, an XSLT transformation that maps XML documents that conform to the source schema to corresponding documents that conform to the target schema should accomplish the following tasks:

1. document/@title←book/name/text( )
2. document/writer/text( )←book/author/@name Such a transformation is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
    <document>
        <xsl:for-each select=".//book[position( ) = 1]">
            <xsl:attribute name="title">
                <xsl:value-of select="name( )"/>
            </xsl:attribute>
            <xsl:element name="writer">
                <xsl:value-of select="author/@name" />
            </xsl:element>
        </xsl:for-each>
    </document>
</xsl:template>
</xsl:stylesheet>
```

A Thirteenth Example

Books→Documents

A source XML schema for books is given by:

```
<?xml version="1.0" encoding="UTF-8"?>
<xs:schema xmlns:xs="http://www.w3.org/2001/XMLschema">
<xs:element name="book" type="Book"/>
<xs:complexType name="Book">
    <xs:sequence>
        <xs:element name="name" type="xs:string"/>
        <xs:element name="author" type="Author" minOccurs="0" maxOccurs="unbounded"/>
    </xs:sequence>
</xs:complexType>
<xs:complexType name="Author">
    <xs:attribute name="name"/>
</xs:complexType>
</xs:schema>
```

A target XML schema for documents is given by:

```
<?xml version="1.0" encoding="UTF-8"?>
<xs:schema xmlns:xs="http://www.w3.org/2001/XMLschema">
<xs:element name="document" type="Document"/>
<xs:complexType name="Document">
    <xs:choice>
        <xs:element name="writer" type="xs:string" minOccurs="1" maxOccurs="unbounded"/>
        <xs:element name="title" type="xs:string"/>
        <xs:element name="ISBN" type="xs:string" />
```

```
    </xs:choice>
</xs:complexType>
</xs:schema>
```

Figure 23:
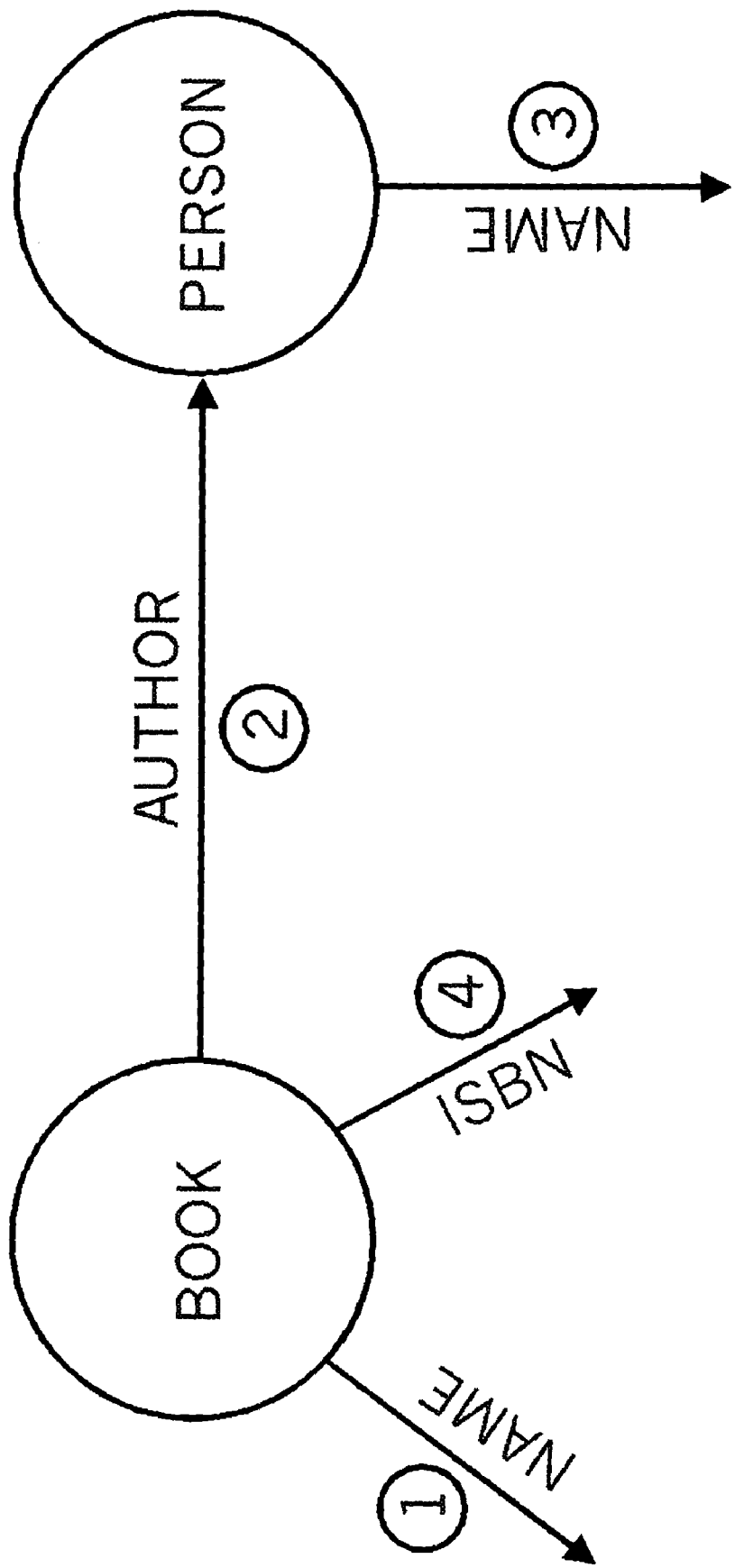
FIG. 23 is an illustration of ontology model corresponding to a thirteenth example

A common ontology model for the source and target XML schema is illustrated in FIG. 23. A mapping of the source XML schema into the ontology model is given by Table CXVIII above. A mapping of the target XML schema into the ontology model is given by:

TABLE CXXII

Mapping from Target schema to Ontology for Thirteenth Example

| schema | Ontology | Property Index |
|---|---|---|
| complexType: document | Class: Book | |
| element: document/writer/text() | Property: name(author(Book)) | 3o2 |
| element: document/title/text() | Property: name(Book) | 1 |

TABLE CXXII-continued

Mapping from Target schema to Ontology for Thirteenth Example

| schema | Ontology | Property Index |
|---|---|---|
| element: document/ISBN/text() | Property: ISBN(Book) | 4 |

Based on Tables CXX and CXXII, an XSLT transformation that maps XML documents that conform to the source schema to corresponding documents that conform to the target schema should accomplish the following tasks:
1. document/title/text( )←book/name/text( )
2. document/writer/text( )←book/author/@name Such a transformation is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
    <document>
        <xsl:apply-templates select="book" />
    </document>
</xsl:template>
<xsl:template match="book">
    <xsl:choose>
        <xsl:when test="author">
            <xsl:for-each select="author">
                <xsl:element name="writer">
                    <xsl:value-of select="@name"/>
                </xsl:element>
            </xsl:for-each>
        </xsl:when>
        <xsl:when test="name">
            <xsl:element name="title">
                <xsl:value-of select="name/text( )"/>
            </xsl:element>
        </xsl:when>
    </xsl:choose>
</xsl:template>
</xsl:stylesheet>
```

A Fourteenth Example

Document Storage

A source XML schema for books is given by:

```
<?xml version="1.0" encoding="UTF-8"?>
<xs:schema xmlns:xs="http://www.w3.org/2001/XMLschema">
<xs:element name="library" type="Library"/>
<xs:complexType name="Library">
    <xs:sequence>
        <xs:element name="source" type="Source" minOccurs="0" maxOccurs="unbounded"/>
    </xs:sequence>
</xs:complexType>
<xs:complexType name="Source">
```

-continued

```
<xs:sequence>
    <xs:element name="review" type="Review" minOccurs="0" maxOccurs="unbounded"/>
    <xs:element name="article" type="Article" minOccurs="0" maxOccurs="unbounded"/>
    <xs:element name="letter" type="Letter" minOccurs="0" maxOccurs="unbounded"/>
</xs:sequence>
</xs:complexType>
<xs:complexType name="Review">
    <xs:sequence>
        <xs:element name="author" type="xs:string" minOccurs="0" maxOccurs="unbounded"/>
    </xs:sequence>
    <xs:attribute name="title"/>
</xs:complexType>
<xs:complexType name="Article">
    <xs:sequence>
        <xs:element name="writer" type="xs:string" minOccurs="0" maxOccurs="unbounded"/>
    </xs:sequence>
    <xs:attribute name="name"/>
</xs:complexType>
<xs:complexType name="Letter">
    <xs:sequence>
        <xs:element name="sender" type="xs:string" minOccurs="0" maxOccurs="unbounded"/>
    </xs:sequence>
    <xs:attribute name="name"/>
    <xs:attribute name="subject"/>
    <xs:attribute name="receiver"/>
</xs:complexType>
</xs:schema>
```

A first target XML schema for documents is given by:

```
<?xml version="1.0" encoding="UTF-8"?>
<xs:schema xmlns:xs="http://www.w3.org/2001/XMLschema">
<xs:element name="storage" type="Storage"/>
<xs:complexType name="Storage">
    <xs:sequence>
        <xs:element name="articles" type="Documents"/>
        <xs:element name="reviews" type="Documents"/>
        <xs:element name="letters" type="Letters"/>
    </xs:sequence>
</xs:complexType>
<xs:complexType name="Documents">
    <xs:sequence>
        <xs:element name="document" type="Document" minOccurs="0"
                                                   maxOccurs="unbounded"/>
    </xs:sequence>
</xs:complexType>
<xs:complexType name="Letters">
    <xs:sequence>
        <xs:element name="letter" type="Letter" minOccurs="0" maxOccurs="unbounded"/>
    </xs:sequence>
</xs:complexType>
<xs:complexType name="Document">
    <xs:sequence>
        <xs:element name="author" type="xs:string" minOccurs="0" maxOccurs="unbounded"/>
    </xs:sequence>
    <xs:attribute name="title"/>
</xs:complexType>
<xs:complexType name="Letter">
    <xs:sequence>
        <xs:element name="author" type="xs:string" minOccurs="0" maxOccurs="unbounded"/>
    </xs:sequence>
    <xs:attribute name="name"/>
    <xs:attribute name="subject"/>
    <xs:attribute name="receiver"/>
</xs:complexType>
</xs:schema>
```

Figure 24:
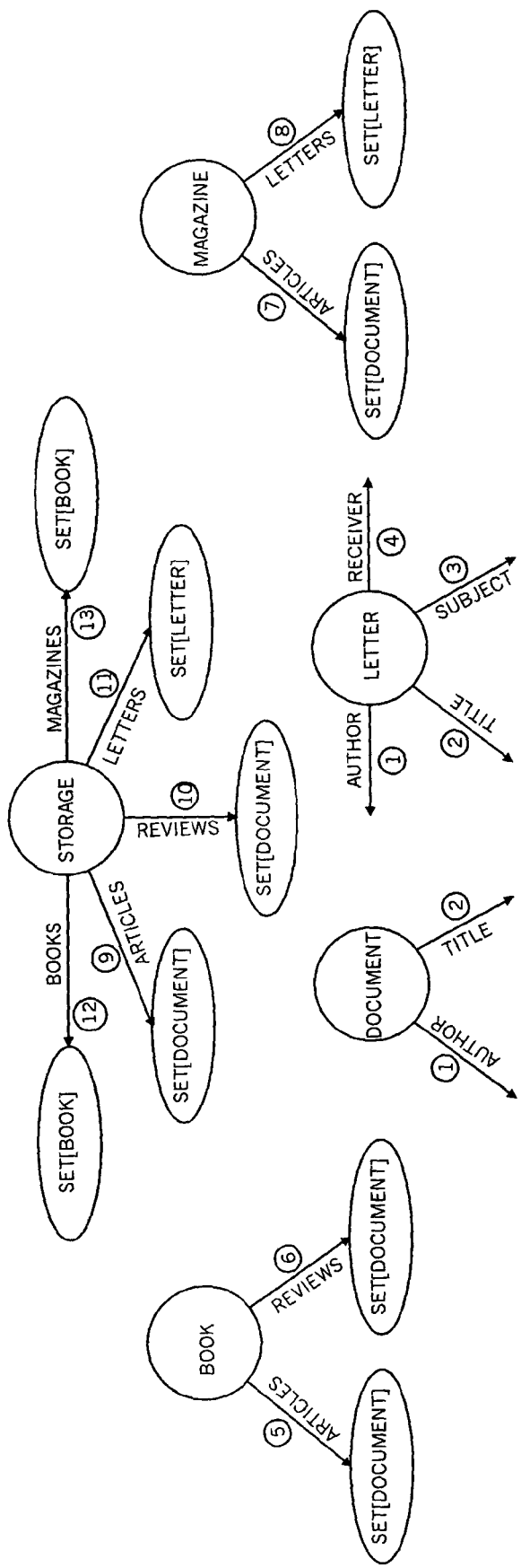
FIG. 24 is an illustration of ontology model corresponding to a fourteenth example

A common ontology model for the source and first target XML schema is illustrated in FIG. 24. A mapping of the source XML schema into the ontology model is given by:

TABLE CXXIII

Mapping from Source schema to Ontology for Fourteenth Example

| schema | Ontology | Property Index |
|---|---|---|
| complexType: review | Class: Document | |
| element: review/author/text( ) | Property: author(Document) | 1 |
| attribute: review/@title | Property: title(Document) | 2 |
| complexType: article | Class: Document | |
| element: article/writer/text( ) | Property: author(Document) | 1 |
| attribute: article/@name | Property: title(Document) | 2 |
| complexType: letter | Class: Letter (inherits from Document) | |
| element: letter/sender/text( ) | Property: author(Letter) | 1 |
| attribute: letter/@name | Property: title(Letter) | 2 |
| attribute: letter/@subject | Property: subject(Letter) | 3 |
| attribute: letter/@receiver | Property: receiver(Letter) | 4 |
| complexType: source | Class: Storage | |
| ComplexType: library | Container Class: set[Storage] | |

A mapping of the first target XML schema into the ontology model is given by:

TABLE CXXIV

Mapping from First Target schema to Ontology for Fourteenth Example

| schema | Ontology | Property Index |
|---|---|---|
| complexType: document | Class: Document | |
| element: document/author/text( ) | Property: author(Document) | 1 |
| attribute: document/@title | Property: title(Document) | 2 |
| complexType: letter | Class: Letter (inherits from Document) | |
| element: letter/author/text( ) | Property: author(Letter) | 1 |
| attribute: letter/@name | Property: title(Letter) | 2 |
| attribute: letter/@subject | Property: subject(Letter) | 3 |
| attribute: letter/@receiver | Property: receiver(Letter) | 4 |
| complexType: storage | Class: Storage | |
| element: storage/articles | Property: articles(Storage) | 9 |
| element: storage/reviews | Property: reviews(Storage) | 10 |
| element: storage/letters | Property: letters(Storage) | 11 |

Based on Tables CXXIII and CXXIV, an XSLT transformation that maps XML documents that conform to the source schema to corresponding documents that conform to the target schema should accomplish the following tasks:
 1. storage←library
 2. letter/author/text( )←letter/sender/text( )
Such a transformation is given by:

```
<?xml version="1.0" encoding="UTF-8"?>
<xsl:stylesheet version="1.0" xmlns:xsl="http://www.w3.org/1999/XSL/Transform">
<xsl:template match="/">
<xsl:apply-templates select="/library"/>
</xsl:template>
<xsl:template match="/library">
<storage>
    <articles>
        <xsl:apply-templates select="source[not(letter)]/article | source[not(review)]/article"/>
    </articles>
    <reviews>
        <xsl:apply-templates select="source[not(letter)]/review"/>
    </reviews>
    <letters>
        <xsl:apply-templates select="source[not(review)]/letter"/>
    </letters>
</storage>
</xsl:template>
<xsl:template match="article">
<article>
    <xsl:attribute name="title"><xsl:value-of select="@name"/></xsl:attribute>
    <xsl:apply-templates select="writer"/>
</article>
</xsl:template>
<xsl:template match="review">
<review>
    <xsl:attribute name="title"><xsl:value-of select="@title"/></xsl:attribute>
    <xsl:apply-templates select="author"/>
</review>
</xsl:template>
<xsl:template match="letter">
<review>
    <xsl:attribute name="name"><xsl:value-of select="@name"/></xsl:attribute>
    <xsl:attribute name="subject"><xsl:value-of select="@subject"/></xsl:attribute>
    <xsl:attribute name="receiver"><xsl:value-of select="@receiver"/></xsl:attribute>
    <xsl:apply-templates select="sender"/>
</review>
</xsl:template>
<xsl:template match="article/writer | review/author | letter/sender">
<author>
    <xsl:value-of select="text( )"/>
</author>
</xsl:template>
</xsl:stylesheet>
```

A second target XML schema for documents is given by:

```
<?xml version="1.0" encoding="UTF-8"?>
<xs:schema xmlns:xs="http://www.w3.org/2001/XMLschema">
<xs:element name="storage" type="Storage"/>
<xs:complexType name="Storage">
    <xs:sequence>
        <xs:element name="books" type="Books"/>
        <xs:element name="magazines" type="Magazines"/>
    </xs:sequence>
</xs:complexType>
<xs:complexType name="Books">
    <xs:sequence>
        <xs:element name="articles" type="Documents"/>
        <xs:element name="reviews" type="Documents"/>
    </xs:sequence>
</xs:complexType>
<xs:complexType name="Magazines">
    <xs:sequence>
        <xs:element name="articles" type="Documents"/>
        <xs:element name="letters" type="Letters"/>
    </xs:sequence>
</xs:complexType>
<xs:complexType name="Documents">
    <xs:sequence>
        <xs:element name="document" type="Document" minOccurs="0"
                                                    maxOccurs="unbounded"/>
    </xs:sequence>
</xs:complexType>
<xs:complexType name="Letters">
    <xs:sequence>
        <xs:element name="letter" type="Letter" minOccurs="0" maxOccurs="unbounded"/>
    </xs:sequence>
</xs:complexType>
<xs:complexType name="Document">
    <xs:sequence>
        <xs:element name="author" type="xs:string" minOccurs="0" maxOccurs="unbounded"/>
    </xs:sequence>
    <xs:attribute name="title"/>
</xs:complexType>
<xs:complexType name="Letter">
<xs:sequence>
    <xs:element name="author" type="xs:string" minOccurs="0" maxOccurs="unbounded"/>
    </xs:sequence>
    <xs:attribute name="name"/>
    <xs:attribute name="subject"/>
    <xs:attribute name="receiver"/>
</xs:complexType>
</xs:schema>
```

A mapping of the second target XML schema into the ontology model is given by:

TABLE CXXV

Mapping from Second Target schema to Ontology for Fourteenth Example

| schema | Ontology | Property Index |
|---|---|---|
| complexType: document | Class: Document | |
| element: document/author/text( ) | Property: author(Document) | 1 |
| attribute: document/@title | Property: title(Document) | 2 |
| complexType: letter | Class: Letter (inherits from Document) | |
| element: letter/author/text( ) | Property: auhor(Letter) | 1 |
| attribute: letter/@name | Property: title(Letter) | 2 |
| attribute: letter/@subject | Property: subject(Letter) | 3 |
| attribute: letter/@receiver | Property: receiver(Letter) | 4 |
| complexType: storage | Class: Storage | |
| element: storage/books | Property: books(Storage) | 12 |
| element: storage/magazines | Property: magazines (Storage) | 13 |
| complexType: book | Class: Book | |
| element: book/articles | Property: articles(Book) | 5 |
| element: book/reviews | Property: reviews(Book) | 6 |
| complexType: magazine | Class: Magazine | |
| element: magazine/articles | Property: articles (Magazine) | 7 |
| element: magazine/letters | Property: letters(Magazine) | 8 |

Based on Tables CXXIII and CXXV, an XSLT transformation that maps XML documents that conform to the source schema to corresponding documents that conform to the target schema should accomplish the following tasks:

1. storage←library
2. letter/author/text( )←letter/sender/text( )

Such a transformation is given by:

```xml
<?xml version="1.0" encoding="UTF-8"?>
<xsl:stylesheet version="1.0" xmlns:xsl="http://www.w3.org/1999/XSL/Transform">
<xsl:template match="/">
<xsl:apply-templates select="/library"/>
</xsl:template>
<xsl:template match="/library">
<storage>
    <books>
        <articles>
            <xsl:apply-templates select="source[not(letter)]/article"/>
        </articles>
        <reviews>
            <xsl:apply-templates select="source[not(letter)]/review"/>
        </reviews>
    </books>
    <magazines>
        <articles>
            <xsl:apply-templates select="source[not(review)]/article"/>
        </articles>
        <letters>
            <xsl:apply-templates select="source[not(review)]/letter"/>
        </letters>
    </magazines>
</storage>
</xsl:template>
<xsl:template match="article">
<article>
    <xsl:attribute name="title"><xsl:value-of select="@name"/></xsl:attribute>
    <xsl:apply-templates select="writer"/>
</article>
</xsl:template>
<xsl:template match="review">
<review>
    <xsl:attribute name="title"><xsl:value-of select="@title"/></xsl:attribute>
    <xsl:apply-templates select="author"/>
</review>
</xsl:template>
<xsl:template match="letter">
<review>
    <xsl:attribute name="name"><xsl:value-of select="@name"/></xsl:attribute>
    <xsl:attribute name="subject"><xsl:value-of select="@subject"/></xsl:attribute>
    <xsl:attribute name="receiver"><xsl:value-of select="@receiver"/></xsl:attribute>
    <xsl:apply-templates select="sender"/>
</review>
</xsl:template>
<xsl:template match="article/writer | review/author | letter/sender">
<author>
    <xsl:value-of select="text( )"/>
</author>
</xsl:template>
</xsl:stylesheet>
```

A third target XML schema for documents is given by:

```xml
<?xml version="1.0" encoding="UTF-8"?>
<xs:schema xmlns:xs="http://www.w3.org/2001/XMLschema">
<xs:element name="storage" type="Storage"/>
<xs:complexType name="Storage">
    <xs:sequence>
        <xs:element name="article_from_books" type="AB" minOccurs="0"
                                                      maxOccurs="unbounded"/>
        <xs:element name="article_from_magazines" type="AM" minOccurs="0"
                                                      maxOccurs="unbounded"/>
    </xs:sequence>
</xs:complexType>
<xs:complexType name="AB">
    <xs:sequence>
        <xs:element name="authors" type="xs:string" minOccurs="0" maxOccurs="unbounded"/>
    </xs:sequence>
    <xs:attribute name="title"/>
</xs:complexType>
```

```
<xs:complexType name="AM">
    <xs:sequence>
        <xs:element name="writers" type="xs:string" minOccurs="0" maxOccurs="unbounded"/>
    </xs:sequence>
    <xs:attribute name="name"/>
</xs:complexType>
</xs:schema>
```

A mapping of the third target XML schema into the ontology model is given by:

TABLE CXXVI

Mapping from Third Target schema to Ontology for Fourteenth Example

| schema | Ontology | Property Index |
|---|---|---|
| complexType: AB | Class: Document | |
| element: AB/author/text( ) | Property: author(Document) | 1 |
| attribute: AB/@title | Property: title(Document) | 2 |
| complexType: AM | Class: Document | |
| element: AM/writer/text( ) | Property: author(Document) | 1 |
| attribute: AM/@title | Property: title(Document) | 2 |
| complexType: storage | Complex Class: set[Document] × set[Document] | |

Based on Tables CXXIII and CXXVI, an XSLT transformation that maps XML documents that conform to the source schema to corresponding documents that conform to the target schema should accomplish the following tasks:
1. storage←library
2. letter/author/text( )←letter/sender/text( )

Such a transformation is given by:

```
<?xml version="1.0" encoding="UTF-8"?>
<xsl:stylesheet version="1.0" xmlns:xsl="http://www.w3.org/1999/XSL/Transform">
<xsl:template match="/">
<xsl:apply-templates select="/library"/>
</xsl:template>
<xsl:template match="/library">
<storage>
    <xsl:apply-templates select="source[not(letter)]/article" mode="AB"/>
    <xsl:apply-templates select="source[not(review)]/article" mode="AM"/>
</storage>
</xsl:template>
<xsl:template match="article" mode="AB">
<article__from__books>
    <xsl:attribute name="title"><xsl:value-of select="@name"/></xsl:attribute>
    <xsl:apply-templates select="writer" mode="AB"/>
</article__from__books>
</xsl:template>
<xsl:template match="article" mode="AM">
<article__from__magazines>
    <xsl:attribute name="name"><xsl:value-of select="@name"/></xsl:attribute>
    <xsl:apply-templates select="writer" mode="AM"/>
</article__from__magazines>
</xsl:template>
<xsl:template match="article/writer" mode="AB">
<author>
    <xsl:value-of select="text( )"/>
</author>
</xsl:template>
<xsl:template match="article/writer" mode="AM">
<writer>
    <xsl:value-of select="text( )"/>
</writer>
</xsl:template>
</xsl:stylesheet>
```

A Fifteenth Example

String Conversion

A source XML schema for people is given by:

```
<?xml version="1.0" encoding="UTF-8"?>
<xs:schema xmlns:xs="http://www.w3.org/2001/XMLschema"
    elementFormDefault="qualified" attributeFormDefault="unqualified">
<xs:element name="Person" type="Person"/>
<xs:complexType name="Person">
    <xs:sequence>
        <xs:element name="name" type="xs:string"/>
        <!-- name expected input in format firstName#LastName -->
        <xs:element name="ID" type="xs:string"/>
        <!-- ID expected input in format XXXXXXXXX-X -->
        <xs:element name="age" type="xs:string"/>
        <!-- age expected input in exponential form XXXeX -->
    </xs:sequence>
</xs:complexType>
</xs:schema>
```

A target XML schema for people is given by:

```
<?xml version="1.0" encoding="UTF-8"?>
<xs:schema xmlns:xs="http://www.w3.org/2001/XMLschema"
        elementFormDefault="qualified" attributeFormDefault="unqualified">
<xs:element name="Person" type="Person"/>
<xs:complexType name="Person">
    <xs:sequence>
        <xs:element name="name" type="xs:string"/>
        <!-- name expected input in format LastName, FirstName -->
        <xs:element name="ID" type="xs:string"/>
        <!-- ID expected input in format 12XX-XXXXXXXX3E -->
    </xs:sequence>
</xs:complexType>
</xs:schema>
```

An XSLT transformation that maps the source schema into the target schema is given by:

```
<?xml version="1.0" encoding="UTF-8"?>
<xsl:stylesheet version="1.0" xmlns:xsl=
"http://www.w3.org/1999/XSL/Transform">
<xsl:output method="xml" version="1.0" encoding="UTF-8"
indent="yes"/>
```

-continued

```
<xsl:template match="/">
  <Person>
    <xsl:for-each select="Person">
      <xsl:element name="name">
        <xsl:value-of select=
          "concat(substring-after(name,'#'),',',
            substring-before(name,'#'))"/>
      </xsl:element>
      <xsl:element name="ID">
        <xsl:variable name="plainID" select=
          "concat(substring-before(ID/text( ),'-'),
            substring-after(ID/text( ),'-'))"/>
        <xsl:value-of select=
          "concat('12',substring($plainID,1,2),'-',
            substring($plainID,3),'3E')"/>
      </xsl:element>
      <xsl:element name="age">
        <xsl:call-template name="exponentiate">
          <xsl:with-param name="power" select=
            "substring-after(age,'e')"/>
          <xsl:with-param name="digit" select=
            "substring-before(age,'e')"/>
          <xsl:with-param name="ten" select="1"/>
        </xsl:call-template>
      </xsl:element>
    </xsl:for-each>
  </Person>
</xsl:template>
<xsl:template name="exponentiate">
  <xsl:param name="power"/>
  <xsl:param name="digit"/>
  <xsl:param name="ten"/>
  <xsl:choose>
    <xsl:when test="$power > 0">
      <xsl:call-template name="exponentiate">
        <xsl:with-param name="power" select="$power – 1"/>
        <xsl:with-param name="digit" select="$digit"/>
        <xsl:with-param name="ten" select="$ten * 10"/>
      </xsl:call-template>
    </xsl:when>
    <xsl:when test="$power < 0">
      <xsl:call-template name="exponentiate">
        <xsl:with-param name="power" select="$power + 1"/>
        <xsl:with-param name="digit" select="$digit"/>
        <xsl:with-param name="ten" select="$ten div 10"/>
      </xsl:call-template>
    </xsl:when>
    <xsl:otherwise>
      <xsl:value-of select="format-number($digit * $ten, ',###.###') "/>
    </xsl:otherwise>
  </xsl:choose>
</xsl:template>
</xsl:stylesheet>
```

A Sixteenth Example

String Conversion

A source XML schema for people is given by:

```
<?xml version="1.0" encoding="UTF-8"?>
<xs:schema xmlns:xs=http://www.w3.org/2001/XMLschema
    elementFormDefault="qualified" attributeFormDefault=
    "unqualified">
<xs:element name="Person" type="Person"/>
<xs:complexType name="Person">
  <xs:sequence>
    <xs:element name="name" type="xs:string"/>
    <xs:element name="homeTown" type="xs:string"/>
  </xs:sequence>
  <xs:attribute name="dog_name"/>
</xs:complexType>
</xs:schema>
```

A target XML schema for people is given by:

```
<?xml version="1.0" encoding="UTF-8"?>
<xs:schema xmlns:xs="http://www.w3.org/2001/XMLschema"
    elementFormDefault="qualified" attributeFormDefault=
    "unqualified">
<xs:element name="Person" type="Person"/>
<xs:complexType name="Person">
  <xs:sequence>
    <xs:element name="name" type="xs:string"/>
    <xs:element name="homeTown" type="xs:string"/>
  </xs:sequence>
  <xs:attribute name="dog_name"/>
</xs:complexType>
</xs:schema>
```

An XSLT transformation that maps the source schema into the target schema is given by:

```
<?xml version="1.0" encoding="UTF-8"?>
<xsl:stylesheet version="1.0" xmlns:xsl=
"http://www.w3.org/1999/XSL/Transform">
<xsl:output method="xml" version="1.0" encoding=
"UTF-8" indent="yes"/>
<xsl:template match="/">
  <Person>
    <xsl:for-each select="Person">
      <xsl:attribute name="dog">
        <xsl:value-of select="@dog_name"/>
      </xsl:attribute>
      <xsl:element name="name">
        <xsl:value-of select="name/text()"/>
      </xsl:element>
      <xsl:element name="indexOfcarString_CaseInSensitive">
        <xsl:variable name="case_neutral" select="translate(name,
          'ABCDEFGHIJKLMNOPQRSTUVWXYZ',
          'abcdefghijklmnopqrstuvwxyz')"/>
        <xsl:value-of select= "string-length(substring-before
          ($case_neutral, 'car')) – 1"/>
      </xsl:element>
      <xsl:element name="indexOfcarString_CaseSensitive">
        <xsl:value-of select="string-length(substring-before
          (name, 'car')) – 1"/>
      </xsl:element>
      <xsl:element name="homeTown">
        <xsl:value-of select="homeTown" />
      </xsl:element>
    </xsl:for-each>
  </Person>
</xsl:template>
</xsl:stylesheet>
```

A Seventeenth Example

Library→Storage

A source XML schema for libraries is given by:

```
<?xml version="1.0" encoding="UTF-8"?>
<xs:schema xmlns:xs="http://www.w3.org/2001/XMLschema">
<xs:element name="library" type="Library"/>
<xs:complexType name="Library">
  <xs:sequence>
    <xs:element name="book" type="Book" minOccurs=
      "0" maxOccurs="unbounded"/>
```

-continued

```
    </xs:sequence>
  </xs:complexType>
  <xs:complexType name="Book">
    <xs:sequence>
      <xs:element name="name" type="xs:string"/>
      <xs:element name="author" type="Author" maxOccurs=
        "unbounded"/>
    </xs:sequence>
  </xs:complexType>
  <xs:complexType name="Author">
    <xs:attribute name="name"/>
  </xs:complexType>
</xs:schema>
```

A target XML schema for storage is given by:

```
<?xml version="1.0" encoding="UTF-8"?>
<xs:schema xmlns:xs="http://www.w3.org/2001/XMLschema">
  <xs:element name="storage" type="Storage"/>
  <xs:complexType name="Storage">
    <xs:sequence>
      <xs:element name="document" type="Document"
        minOccurs="0"
        maxOccurs="unbounded"/>
    </xs:sequence>
  </xs:complexType>
  <xs:complexType name="Document">
    <xs:sequence>
      <xs:element name="writer" type="xs:string" maxOccurs=
        "unbounded"/>
    </xs:sequence>
    <xs:attribute name="title"/>
  </xs:complexType>
</xs:schema>
```

A common ontology model for the source and target XML schema is illustrated in FIG. 22. A mapping of the source XML schema into the ontology model is given by Table CXX, with an additional correspondence between the complexType and the container class set[Book]. A mapping of the target XML schema into the ontology model is given by Table CXXI, with an additional correspondence between the complexType storage and the container class set{Book}.

Based on Tables CXX and CXXI, an XSLT transformation that maps XML documents that conform to the source schema to corresponding documents that conform to the target schema should accomplish the following tasks:

1. document/@title←book/name/text( )
2. document/writer/text( )←book/author/@name Such a transformation is given by:

```
<?xml version="1.0" encoding="UTF-8"?>
<xsl:stylesheet version="1.0" xmlns:xsl=
  "http://www.w3.org/1999/XSL/Transform">
<xsl:output method="xml" version="1.0" encoding=
  "UTF-8" indent="yes"/>
<xsl:template match="/">
  <storage>
    <xsl:for-each select=".//library">
      <xsl:for-each select="book">
        <document>
          <xsl:attribute name="title">
            <xsl:value-of select="name"/>
          </xsl:attribute>
          <writer>
            <xsl:for-each select="author/@name">
              <xsl:value-of select="."/>
```

-continued

```
            </xsl:for-each>
          </writer>
        </document>
      </xsl:for-each>
    </xsl:for-each>
  </storage>
</xsl:template>
</xsl:stylesheet>
```

An Eighteenth Example

Change Case

A source XML schema for plain text is given by:

```
<?xml version="1.0" encoding="UTF-8"?>
<xs:schema xmlns:xs=http://www.w3.org/2001/XMLschema
  elementFormDefault="qualified"
      attributeFormDefault="unqualified">
  <xs:element name="Person" type="Person"/>
  <xs:complexType name="Person">
    <xs:sequence>
      <xs:element name="name" type="xs:string"/>
      <xs:element name="homeTown" type="xs:string"/>
    </xs:sequence>
  </xs:complexType>
</xs:schema>
```

A target XML schema for case sensitive text is given by:

```
<?xml version="1.0" encoding="UTF-8"?>
<xs:schema xmlns:xs="http://www.w3.org/2001/XMLschema"
  elementFormDefault="qualified"
      attributeFormDefault="unqualified">
  <xs:element name="Person" type="Person"/>
  <xs:complexType name="Person">
    <xs:sequence>
      <xs:element name="name" type="xs:string"/>
      <xs:element name="homeTown" type="xs:string"/>
    </xs:sequence>
  </xs:complexType>
</xs:schema>
```

An XSLT transformation that maps the source schema into the target schema is given by:

```
<?xml version="1.0" encoding="UTF-8"?>
<xsl:stylesheet version="1.0" xmlns:xsl=
  "http://www.w3.org/1999/XSL/Transform">
<xsl:output method="xml" version="1.0"
  encoding="UTF-8" indent="yes"/>
<xsl:template match="/">
  <Person>
    <xsl:for-each select="Person">
      <xsl:element name="low_name">
        <xsl:value-of select="translate(name,
          'ABCDEFGHIJKLMNOPQRSTUVWXYZ',
          'abcdefghijklmnopqrstuvwxyz')"/>
      </xsl:element>
      <xsl:element name="upper_homeTown">
        <xsl:value-of select="translate(homeTown,
          'abcdefghijklmnopqrstuvwxyz',
          'ABCDEFGHIJKLMNOPQRSTUVWXYZ')"/>
      </xsl:element>
    </xsl:for-each>
  </Person>
```

-continued
```
</xsl:template>
</xsl:stylesheet>
```

An Nineteenth Example

Number Manipulation

A source XML schema for list of numbers is given by:

```
<?xml version="1.0" encoding="UTF-8"?>
<xs:schema xmlns:xs="http://www.w3.org/2001/XMLschema"
```

-continued
```
        elementFormDefault="qualified"
            attributeFormDefault="unqualified">
  <xs:element name="List_o_Numbers" type="NumList"/>
  <xs:complexType name="NumList">
    <xs:sequence>
      <xs:element name="first" type="xs:string"/>
      <xs:element name="second" type="xs:float"/>
      <xs:element name="third" type="xs:float"/>
      <xs:element name="fourth" type="xs:float"/>
      <xs:element name="fifth" type="xs:float"/>
      <xs:element name="sixth" type="xs:float"/>
      <xs:element name="seventh" type="xs:float" />
    </xs:sequence>
  </xs:complexType>
</xs:schema>
```

A target XML schema for a list of numbers is given by:

```
<?xml version="1.0" encoding="UTF-8"?>
<xs:schema xmlns:xs="http://www.w3.org/2001/XMLschema" elementFormDefault="qualified"
attributeFormDefault="unqualified">
<xs:element name="List_o_Numbers" type="NumList"/>
<xs:complexType name="NumList">
  <xs:sequence>
    <xs:element name="first_as_num" type="xs:decimal"/>      <!-- first_as_num - take a
        string and return a numerical value. Exemplifies use of the operator value(string) -->
    <xs:element name="second_floor" type="xs:decimal"/>      <!-- second_floor return
        nearest integer less than number. Exemplifies use of the operator floor(number) -->
    <xs:element name="second_firstDecimal_floor" type="xs:decimal"/>
    <!-- second_firstDecimal_floor - return nearest first decimal place less than number.
            Exemplifies use of the operator floor(number, significance) -->
    <xs:element name="third_ceil" type="xs:decimal"/>      <!-- third_ceil - return nearest
        integer greater than number. Exemplifies use of the operator ceil(number) -->
    <xs:element name="third_secondDecimal_ceil" type="xs:decimal"/>
    <!-- third_secondDecimal_ceil - return nearest second decimal place greater than number.
            Exemplifies use of the operator cei(number, significance) -->
    <xs:element name="fourth_round" type="xs:decimal"/>      <!--fourth_round - round
        the number in integers. Exemplifies use of the operator round(number) -->
    <xs:element name="fourth_thirdDecimal_round" type="xs:decimal"/>
    <!-- fourth_thirdDecimal_round - round the number up to third decimal.
            Exemplifies use of the operator round(number, significance) -->
    <xs:element name="fifth_roundToThousand" type="xs:decimal"/>
    <!-- fifth_roundToThousand - round the number up to nearest ten to the third.
            Exemplifies use of the operator roundToPower(number, power) -->
    <xs:element name="abs_sixth" type="xs:decimal"/>      <!-- abs_sixth - return
        absolute value of number. Exemplifies use of operator abs(number) -->
    <xs:element name="seventh" type="xs:string" />      <!-- seventh - return number as
        string. Exemplifies use of operator string(number) -->
  </xs:sequence>
</xs:complexType>
</xs:schema>
```

An XSLT transformation that maps the source schema into the target schema is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
  <List_o_Numbers>
    <xsl:for-each select="List_o_Numbers">
      <xsl:element name="first_as_num">
        <xsl:value-of select="number(first)"/>
      </xsl:element>      <!-- first_as_num - take a string and return a numerical value.
              Exemplifies use of the operator value(string) -->
      <xsl:element name="second_floor">
        <xsl:value-of select="floor(second)"/>
      </xsl:element>      !-- second_floor return nearest integer less than number.
              Exemplifies use of the operator floor(number) -->
```

```
<xsl:element name="second_firstDecimal_floor">
    <xsl:value-of select="floor(second*10) div 10"/>
</xsl:element>    <!-- second_firstDecimal_floor - return nearest first decimal
place less than number. Exemplifies use of the operator floor(number, significance) -->
<xsl:element name="third_ceil">
    <xsl:value-of select="ceiling(third)"/>
</xsl:element>
<xsl:element name="third_secondDecimal_ceil">
    <xsl:value-of select="ceiling(third*100) div 100"/>
</xsl:element>    <!-- third_ceil - return nearest integer greater than number.
        Exemplifies use of the operator ceil(number) -->
<xsl:element name="fourth_round">
    <xsl:value-of select="round(fourth)"/>
</xsl:element>    <!-- fourth_round - round the number in integers.
        Exemplifies use of the operator round(number) -->
<xsl:element name="fourth_thirdDecimal_round">
    <xsl:value-of select="round(fourth*1000) div 1000" />
</xsl:element>    <!-- fourth_thirdDecimal_round - round the number up to
    third decimal. Exemplifies use of the operator round(number, significance) -->
<xsl:element name="fifth_roundToThousand">
    <xsl:value-of select="round(fifth div 1000) * 1000" />
</xsl:element>    <!-- fifth_roundToThousand - round the number up to nearest
    ten to the third. Exemplifies use of the operator roundToPower(number, power) -->
<xsl:element name="abs_sixth">
    <xsl:choose>
        <xsl:when test="sixth < 0">
            <xsl:value-of select="sixth * -1"/>
        </xsl:when>
        <xsl:otherwise>
            <xsl:value-of select="sixth"/>
        </xsl:otherwise>
    </xsl:choose>
</xsl:element>        <!-- abs_sixth - return absolute value of number.
                Exemplifies use of operator abs(number) -->
<xsl:element name="seventh">
    <xsl:value-of select="concat(' ',string(seventh),' ')"/>
</xsl:element>        <!-- seventh - return number as string.
                Exemplifies use of operator string(number) -->
    </xsl:for-each>
</List_o_Numbers>
</xsl:template>
</xsl:stylesheet>
```

A Twentieth Example

String Manipulation

A source XML schema for a person is given by:

```
<?xml version="1.0" encoding="UTF-8"?>
<xs:schema xmlns:xs="http://www.w3.org/2001/XMLschema"
elementFormDefault="qualified"
        attributeFormDefault="unqualified">
<xs:element name="Person" type="Person"/>
<xs:complexType name="Person">
    <xs:sequence>
        <xs:element name="name" type="xs:string"/>
        <xs:element name="homeTown" type="xs:string"/>
    </xs:sequence>
    <xs:attribute name="dog_name"/>
</xs:complexType>
</xs:schema>
```

A target XML schema for a person is given by:

```
<?xml version="1.0" encoding="UTF-8"?>
<xs:schema xmlns:xs="http://www.w3.org/2001/XMLschema"
elementFormDefault="qualified"
        attributeFormDefault="unqualified">
<xs:element name="Person" type="Person"/>
<xs:complexType name="Person">
    <xs:sequence>
        <xs:element name="four_name" type="xs:string"/>
        <xs:element name="capital_homeTown" type="xs:string"/>
            <!-- four-Name is only four characters long, please.
            This exemplifies use of the substring(string, start, length)
            operator-->
            <!-- capital_homeTown - we must insist you capitalize the
            first letter of a town,
            out of respect. This exemplifies use of the capital operator-->
    </xs:sequence>
    <xs:attribute name="dog_trim"/>
    <xs:attribute name="dog_length"/>
        <!-- dog_trim - keep your dog trim - no blank spaces in
        front or after the name.
        This exemplifies use of the trim operator -->
        <!--dog_length - gives the number of characters (in
        integers, not dog years) in your
        dog's name. This exemplifies use of the length(string)
        operator -->
</xs:complexType>
</xs:schema>
```

An XSLT transformation that maps the source schema into the target schema is given by:

```xml
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
  <Person>
    <xsl:for-each select="Person">
      <xsl:attribute name="dog_trim">
        <xsl:value-of select="normalize-space(@dog_name)"/>
      </xsl:attribute>
      <xsl:attribute name="dog_length">
        <xsl:value-of select="string-length(normalize-
          space(@dog_name))"/>
      </xsl:attribute>
      <!-- dog_trim - This exemplifies use of the trim operator -->
      <!--dog_length - This exemplifies use of the length(string)
      operator -->
      <xsl:element name="four_name">
        <xsl:value-of select="substring(name,1, 4)"/>
      </xsl:element>
      <xsl:element name="capital_homeTown">
        <xsl:value-of select="concat(translate(substring(normalize-
          space(homeTown),1,1),
          'abcdefghijklmnopqrstuvwxyz',
          'ABCDEFGHIJKLMNOPQRSTUVWXYZ'),
          substring(normalize-space(homeTown),2))" />
      </xsl:element>
      <!-- four-Name. This exemplifies use of the substring(string,
      start, length) operator-->
      <!-- capital_hometown. This exemplifies use of the capital
      operator-->
    </xsl:for-each>
  </Person>
</xsl:template>
</xsl:stylesheet>
```

A Twenty-First Example

Temperature Conversion

A source XML schema for temperature in Fahrenheit is given by:

```xml
<?xml version="1.0" encoding="UTF-8"?>
<xs:schema xmlns:xs="http://www.w3.org/2001/XMLschema"
    elementFormDefault="qualified"
           attributeFormDefault="unqualified">
  <xs:element name="city" type="city"/>
  <xs:complexType name="city">
    <xs:sequence>
      <xs:element name="temperatureF" type="xs:string"/>
    </xs:sequence>
    <xs:attribute name="name" />
  </xs:complexType>
</xs:schema>
```

A target XML schema for temperature in Centigrade is given by:

```xml
<?xml version="1.0" encoding="UTF-8"?>
<xs:schema xmlns:xs="http://www.w3.org/2001/XMLschema" elementFormDefault="qualified"
                                attributeFormDefault="unqualified">
<xs:element name="town" type="town" />
<xs:complexType name="town">
    <xs:sequence>
        <xs:element name="temperatureC" type="xs:string" />
    </xs:sequence>
    </xs:complexType>
<xs:attribute name="name" />
</xs:schema>
```

An XSLT transformation that maps the source schema into the target schema is given by:

```xml
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
    <town>
        <xsl:for-each select="city">
            <xsl:attribute name="name">
                <xsl:value-of select="@name"/>
            </xsl:attribute>
            <xsl:element name="temperatureC">
                <xsl:value-of select="floor((temperatureF – 32) * (5 div 9))" />
            </xsl:element>
        </xsl:for-each>
```

-continued

```
    </town>
</xsl:template>
</xsl:stylesheet>
```

A Twenty-Second Example

Town with Books     10

A source XML schema for a town with books is given by:

```
<?xml version="1.0" encoding="UTF-8"?>
<xs:schema xmlns:xs="http://www.w3.org/2001/XMLschema" elementFormDefault="qualified"
                                          attributeFormDefault="unqualified">
<xs:element name="town" type="Town" />
<xs:complexType name="Town">
    <xs:sequence>
        <xs:element name="library" type="Library" minOccurs="0" maxOccurs="unbounded" />
    </xs:sequence>
    <xs:attribute name="name" type="xs:string" />
</xs:complexType>
<xs:complexType name="Library">
    <xs:sequence>
        <xs:element name="book" type="Book" minOccurs="0" maxOccurs="unbounded"/>
    </xs:sequence>
    <xs:attribute name="name" type="xs:string" />
</xs:complexType>
<xs:complexType name="Book">
    <xs:sequence>
        <xs:element name="title" type="xs:string" />
        <xs:element name="author_name" type="xs:string" minOccurs="1"
                                          maxOccurs="unbounded" />
    </xs:sequence>
</xs:complexType>
</xs:schema>
```

A target XML schema for a list of books is given by:

```
<?xml version="1.0" encoding="UTF-8"?>
<xs:schema xmlns:xs="http://www.w3.org/2001/XMLschema" elementFormDefault="qualified"
                                          attributeFormDefault="unqualified">
<xs:element name="list_of_books" type="books"/>
<xs:complexType name="books">
    <xs:sequence>
        <xs:element name="book" type="book" minOccurs="0" maxOccurs="unbounded" />
    </xs:sequence>
</xs:complexType>
<xs:complexType name="book">
    <xs:sequence>
        <xs:element name="title" type="xs:string" />
        <xs:element name="author_name" type="xs:string" minOccurs="1"
                                          maxOccurs="unbounded" />
    </xs:sequence>
</xs:complexType>
</xs:schema>
```

Figure 25:
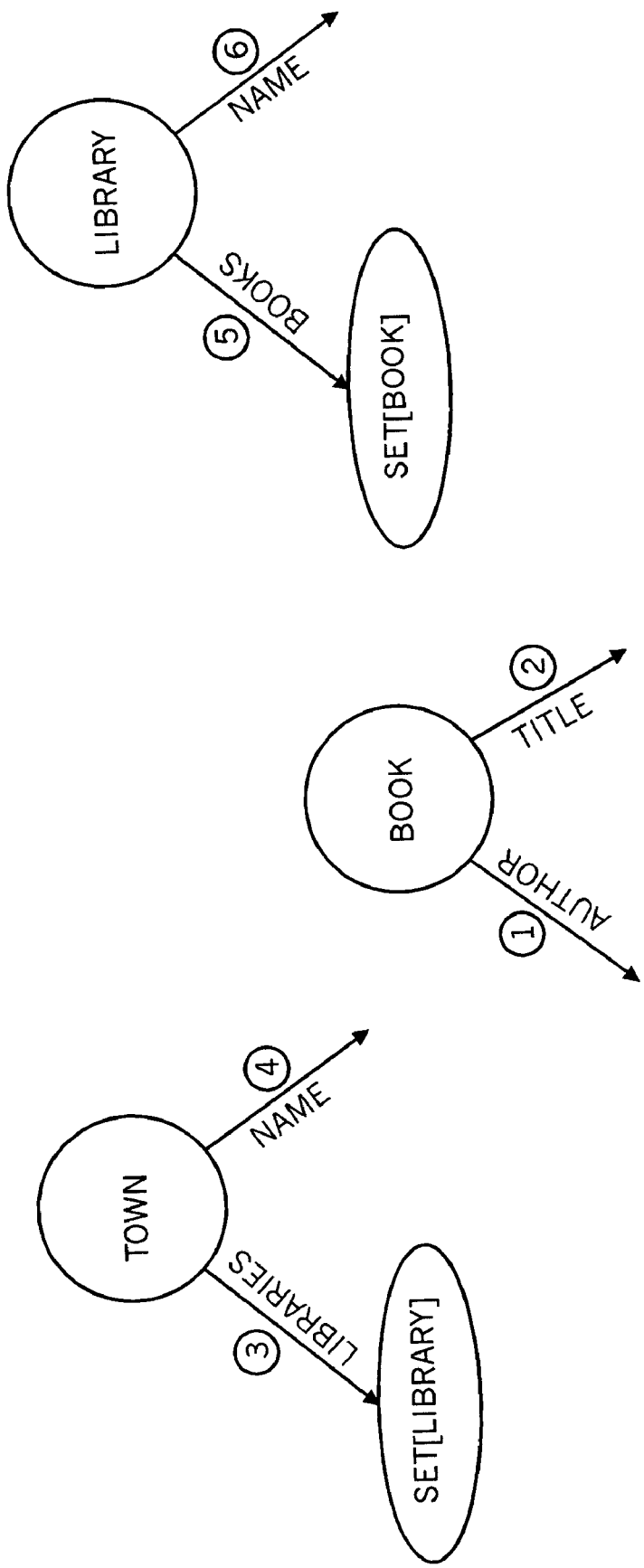
FIG. 25 is an illustration of ontology model corresponding to a twenty-second example.

A common ontology model for the source and target XML schema is illustrated in FIG. 25. A mapping of the source XML schema into the ontology model is given by:

TABLE CXXVII

Mapping from Source schema to Ontology for Twenty-Second Example

| schema | Ontology | Property Index |
|---|---|---|
| complexType: book | Class: Book | |
| element: book/title/text( ) | Property: name(Book) | 1 |
| element: book/author_name/text( ) | Property: author(Book) | 2 |
| complexType: library | Class: Library | |
| element: library/books | Container Class: set[Book] | 5 |
| element: library/name/text( ) | Property: name(Library) | 6 |
| complexType: town | Class: Town | |
| element: town/libraries | Container Class: set[Library] | 1 |
| element: town/name/text( ) | Property: name(Town) | 2 |

A mapping of the target XML schema into the ontology model is given by:

TABLE CXXVIII

Mapping from Target schema to Ontology for Twenty-Second Example

| schema | Ontology | Property Index |
|---|---|---|
| complexType: book | Class: Book | |
| element: book/title/text( ) | Property: name(Book) | 1 |
| element: book/author_name/text( ) | Property: author(Book) | 2 |
| element: list_of_books | Set[Book] | |

Based on Tables CXXVII and CXXVIII, an XSLT transformation that maps XML documents that conform to the source schema to corresponding documents that conform to the target schema is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
    <books>
        <xsl:for-each select=".//book">
            <book>
                <xsl:element name="title">
                    <xsl:value-of select="title/text( )"/>
                </xsl:element>
                <xsl:for-each select="author_name">
                    <xsl:element name="author_name">
                        <xsl:value-of select="."/>
                    </xsl:element>
                </xsl:for-each>
            </book>
        </xsl:for-each>
    </books>
</xsl:template>
</xsl:stylesheet>
```

A Twenty-Third Example

Town with Books

A source XML schema for a town is given by:

```
<?xml version="1.0" encoding="UTF-8"?>
<xs:schema xmlns:xs="http://www.w3.org/2001/XMLschema" elementFormDefault="qualified"
                                                       attributeFormDefault="unqualified">
<xs:element name="town" type="Town"/>
<xs:complexType name="Town">
    <xs:sequence>
        <xs:element name="library" type="Library" minOccurs="0" maxOccurs="unbounded"/>
        <xs:element name="police_station" type="PoliceStation" minOccurs="0"
                                                               maxOccurs="unbounded"/>
    </xs:sequence>
    <xs:attribute name="name" type="xs:string"/>
</xs:complexType>
<xs:complexType name="Library">
    <xs:sequence>
        <xs:element name="book" type="Book" minOccurs="0" maxOccurs="unbounded"/>
    </xs:sequence>
    <xs:attribute name="name" type="xs:string"/>
</xs:complexType>
<xs:complexType name="Book">
    <xs:sequence>
        <xs:element name="title" type="xs:string"/>
        <xs:element name="author_name" type="xs:string" maxOccurs="unbounded"/>
    </xs:sequence>
</xs:complexType>
<xs:complexType name="PoliceStation">
    <xs:sequence>
        <xs:element name="Officers" type="Officers"/>
    </xs:sequence>
    <xs:attribute name="identifier" type="xs:string"/>
</xs:complexType>
<xs:complexType name="Officers">
    <xs:sequence>
```

```
        <xs:element name="name" type="xs:string" minOccurs="1" maxOccurs="unbounded"/>
    </xs:sequence>
</xs:complexType>
</xs:schema>
```

A first target XML schema for police stations is given by:

```
<?xml version="1.0" encoding="UTF-8"?>
<xs:schema xmlns:xs="http://www.w3.org/2001/XMLschema" elementFormDefault="qualified"
                                                       attributeFormDefault="unqualified">
<xs:element name="PoliceStations" type="PoliceStations"/>
<xs:complexType name="PoliceStations">
    <xs:sequence>
        <xs:element name="Station" type="Station" minOccurs="0" maxOccurs="unbounded"/>
    </xs:sequence>
</xs:complexType>
<xs:complexType name="Station">
    <xs:sequence>
        <xs:element name="Officers" type="Officers"/>
    </xs:sequence>
    <xs:attribute name="identifier" type="xs:string"/>
</xs:complexType>
<xs:complexType name="Officers">
    <xs:sequence>
        <xs:element name="name" type="xs:string" minOccurs="1" maxOccurs="10"/>
    </xs:sequence>
</xs:complexType>
</xs:schema>
```

Figure 26:
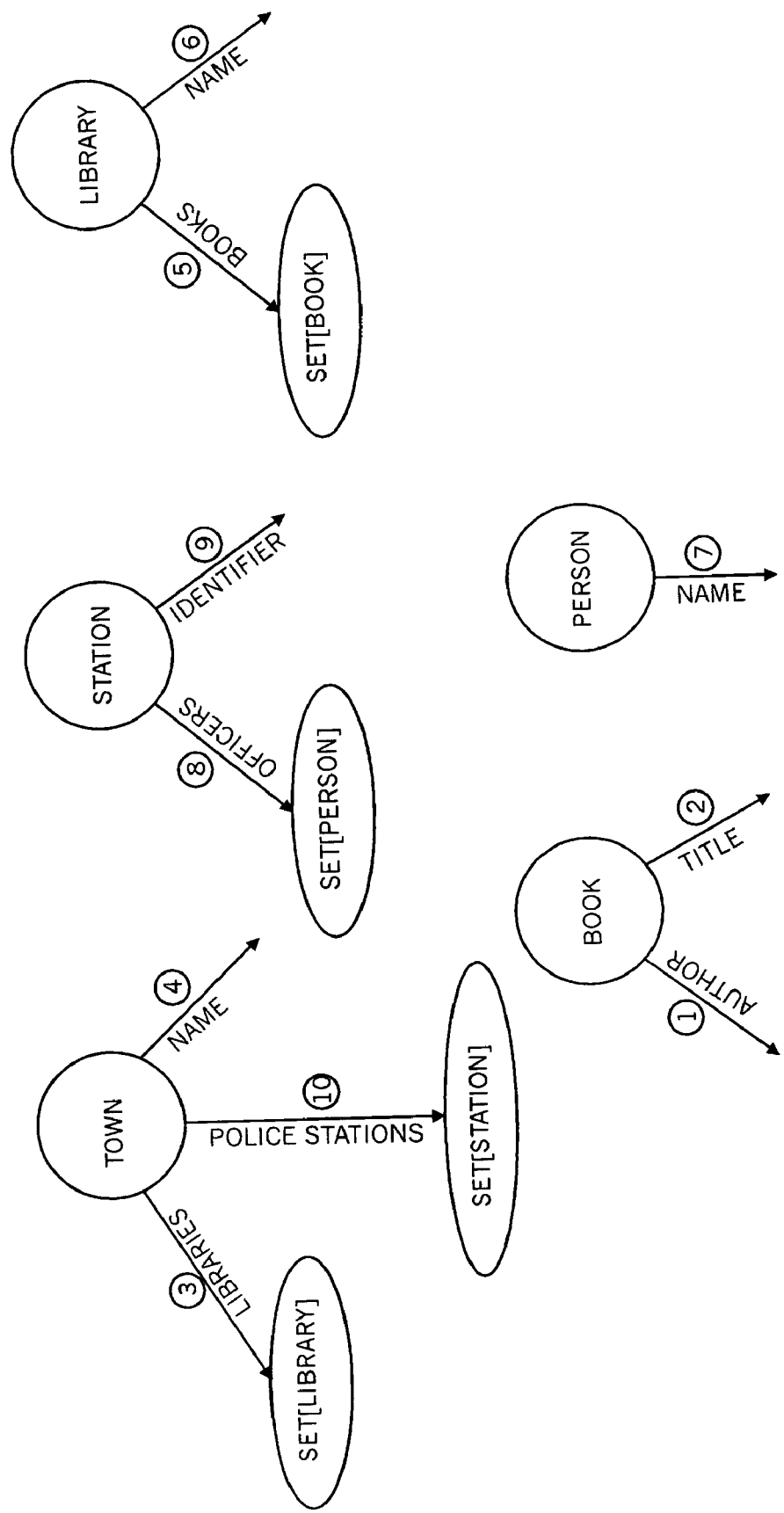
FIG. 26 is an illustration of ontology model corresponding to a twenty-third example.

A common ontology model for the source and target XML schema is illustrated in FIG. 26. A mapping of the source XML schema into the ontology model is given by:

TABLE CXXIX

Mapping from Source schema to Ontology for Twenty-Third Example

| schema | Ontology | Property Index |
|---|---|---|
| complexType: book | Class: Book | |
| element: book/title/text( ) | Property: title(Book) | 2 |
| element: book/author__name/text( ) | Property: author(Book) | 1 |
| complexType: library | Class: Library | |
| element: library/books | Container Class: set[Book] | 5 |
| element: library/@name | Property: name(Library) | 6 |
| complexType: officer | Class: Person | |
| element: officer/name/text( ) | Property: name(Person) | 7 |
| complexType: police__station | Class: Station | |
| element: police__station/officers | Container Class: set[Person] | 8 |
| element: police__station/@identifier | Property: identifier(Station) | 9 |
| complexType: town | Class: Town | |
| element: town/libraries | Container Class: set[Library] | 3 |
| element: town/police__stations | Container Class: set[Station] | 10 |
| element: town/@name | Property: name(Town) | 4 |

A mapping of the first target XML schema into the ontology model is given by:

TABLE CXXX

Mapping from Target schema to Ontology for Twenty-Third Example

| schema | Ontology | Property Index |
|---|---|---|
| complexType: officer | Class: Person | |
| element: officer/name/text( ) | Property: name(Person) | 7 |
| complexType: station | Class: Station | |
| element: station/officers | Container Class: set[Person] | 8 |
| element: station/@identifier | Property: identifier(Station) | 9 |
| complexType: police__stations | Class: set[Station] | |

Based on Tables CXXIX and CXXX, an XSLT transformation that maps XML documents that conform to the source schema to corresponding documents that conform to the first target schema is given by:

```
<?xml version="1.0" encoding="UTF-8"?>
<xsl:stylesheet version="1.0" xmlns:xsl=
"http://www.w3.org/1999/XSL/Transform">
<xsl:output method="xml" version="1.0"
encoding="UTF-8" indent="yes"/>
<xsl:template match="/">
    <PoliceStations>
        <xsl:for-each select=".//PoliceStation">
            <Station>
                <xsl:attribute name="identifier">
                    <xsl:value-of select="@identifier"/>
                </xsl:attribute>
                <xsl:for-each select="Officers">
```

-continued

```
            <Officers>
                <xsl:for-each select="name[position( ) < 11]">
                    <xsl:element name="name">
                        <xsl:value-of select="."/>
                    </xsl:element>
                </xsl:for-each>
            </Officers>
        </xsl:for-each>
        </Station>
    </xsl:for-each>
    </PoliceStations>
</xsl:template>
</xsl:stylesheet>
```

A second target XML schema for temperature in Centigrade is given by:

```
<?xml version="1.0" encoding="UTF-8"?>
<xs:schema xmlns:xs="http://www.w3.org/2001/XMLschema"
    elementFormDefault="qualified"
                attributeFormDefault="unqualified">
<xs:element name="PoliceStations" type="PoliceStations"/>
<xs:complexType name="PoliceStations">
    <xs:sequence>
        <xs:element name="Station" type="Station"
            minOccurs="0" maxOccurs="unbounded"/>
    </xs:sequence>
</xs:complexType>
<xs:complexType name="Station">
    <xs:sequence>
        <xs:element name="Officers" type="Officers"/>
    </xs:sequence>
    <xs:attribute name="identifier" type="xs:string"/>
</xs:complexType>
<xs:complexType name="Officers">
    <xs:sequence>
        <xs:element name="name" type="xs:string"
            minOccurs="10" maxOccurs="unbounded"/>
    </xs:sequence>
</xs:complexType>
</xs:schema>
```

Based on Tables CXXIX and CXXX, an XSLT transformation that maps XML documents that conform to the source schema to corresponding documents that conform to the second target schema is given by:

```
<?xml version="1.0" encoding="UTF-8"?>
<xsl:stylesheet version="1.0" xmlns:xsl=
"http://www.w3.org/1999/XSL/Transform">
<xsl:output method="xml" version="1.0" encoding="UTF-8"
indent="yes"/>
<xsl:template match="/">
    <PoliceStations>
        <xsl:for-each select=".//PoliceStation">
            <Station>
                <xsl:attribute name="identifier">
                    <xsl:value-of select="@identifier"/>
                </xsl:attribute>
                <xsl:for-each select="Officers">
                    <Officers>
                        <xsl:for-each select="name">
                            <xsl:element name="name">
                                <xsl:value-of select="."/>
                            </xsl:element>
                        </xsl:for-each>
                    </Officers>
                </xsl:for-each>
                <xsl:call-template name="generate_officer">
                    <xsl:with-param name="so_far" select="count(name)"/>
                </xsl:call-template>
```

-continued

```
            </Station>
        </xsl:for-each>
    </PoliceStations>
</xsl:template>
<xsl:template name="generate_officer">
    <xsl:param name="so_far"/>
    <xsl:if test="$so_far < 10">
        <bar>
        </bar>
        <xsl:call-template name="generate_officer">
            <xsl:with-param name="so_far" select="$so_far + 1"/>
        </xsl:call-template>
    </xsl:if>
</xsl:template>
</xsl:stylesheet>
```

A third target XML schema for temperature in Centigrade is given by:

```
<?xml version="1.0" encoding="UTF-8"?>
<xs:schema xmlns:xs="http://www.w3.org/2001/XMLschema"
    elementFormDefault="qualified"
    attributeFormDefault="unqualified">
<xs:element name="PoliceStations" type="PoliceStations"/>
<xs:complexType name="PoliceStations">
    <xs:sequence>
        <xs:element name="Station" type="Station" minOccurs="0"
            maxOccurs="unbounded"/>
    </xs:sequence>
</xs:complexType>
<xs:complexType name="Station">
    <xs:sequence>
        <xs:element name="Officers" type="Officers"/>
    </xs:sequence>
    <xs:attribute name="identifier" type="xs:string"/>
</xs:complexType>
<xs:complexType name="Officers">
    <xs:sequence>
        <xs:element name="name" type="xs:string" minOccurs="10"
            maxOccurs="20"/>
    </xs:sequence>
</xs:complexType>
</xs:schema>
```

Based on Tables CXXIX and CXXX, an XSLT transformation that maps XML documents that conform to the source schema to corresponding documents that conform to the first target schema is given by:

```
<?xml version="1.0" encoding="UTF-8"?>
<xsl:stylesheet version="1.0" xmlns:xsl=
"http://www.w3.org/1999/XSL/Transform">
<xsl:output method="xml" version="1.0" encoding="UTF-8"
indent="yes"/>
<xsl:template match="/">
    <PoliceStations>
        <xsl:for-each select=".//PoliceStation">
            <Station>
                <xsl:attribute name="identifier">
                    <xsl:value-of select="@identifier"/>
                </xsl:attribute>
                <xsl:for-each select="Officers">
                    <Officers>
                        <xsl:for-each select="name[position( ) < 11]">
                            <xsl:element name="name">
                                <xsl:value-of select="."/>
                            </xsl:element>
                        </xsl:for-each>
                    </Officers>
                </xsl:for-each>
                <xsl:call-template name="generate_officer">
```

-continued

```
        <xsl:with-param name="so_far" select="count(name)"/>
      </xsl:call-template>
    </Station>
  </xsl:for-each>
</PoliceStations>
</xsl:template>
<xsl:template name="generate_officer">
  <xsl:param name="so_far"/>
  <xsl:if test="$so_far < 20">
    <bar>
    </bar>
    <xsl:call-template name="generate_officer">
      <xsl:with-param name="so_far" select="$so_far + 1"/>
    </xsl:call-template>
  </xsl:if>
</xsl:template>
</xsl:stylesheet>
```

A Twenty-Fourth Example

Inversion

In a twenty-fourth example, a target table is of the following form:

TABLE CXXXI

Target Table T for Twenty-Fourth Example

| Num | Color | Owner_ID |
|---|---|---|

A single source table is given as follows:

TABLE CXXXII

Source Table $S_1$ for Twenty-Fourth Example

| ID | Name | Car_Num | Car_Color |
|---|---|---|---|

The source table lists employees and their cars, and the target table to be inferred lists cars and their owners.

Figure 27:
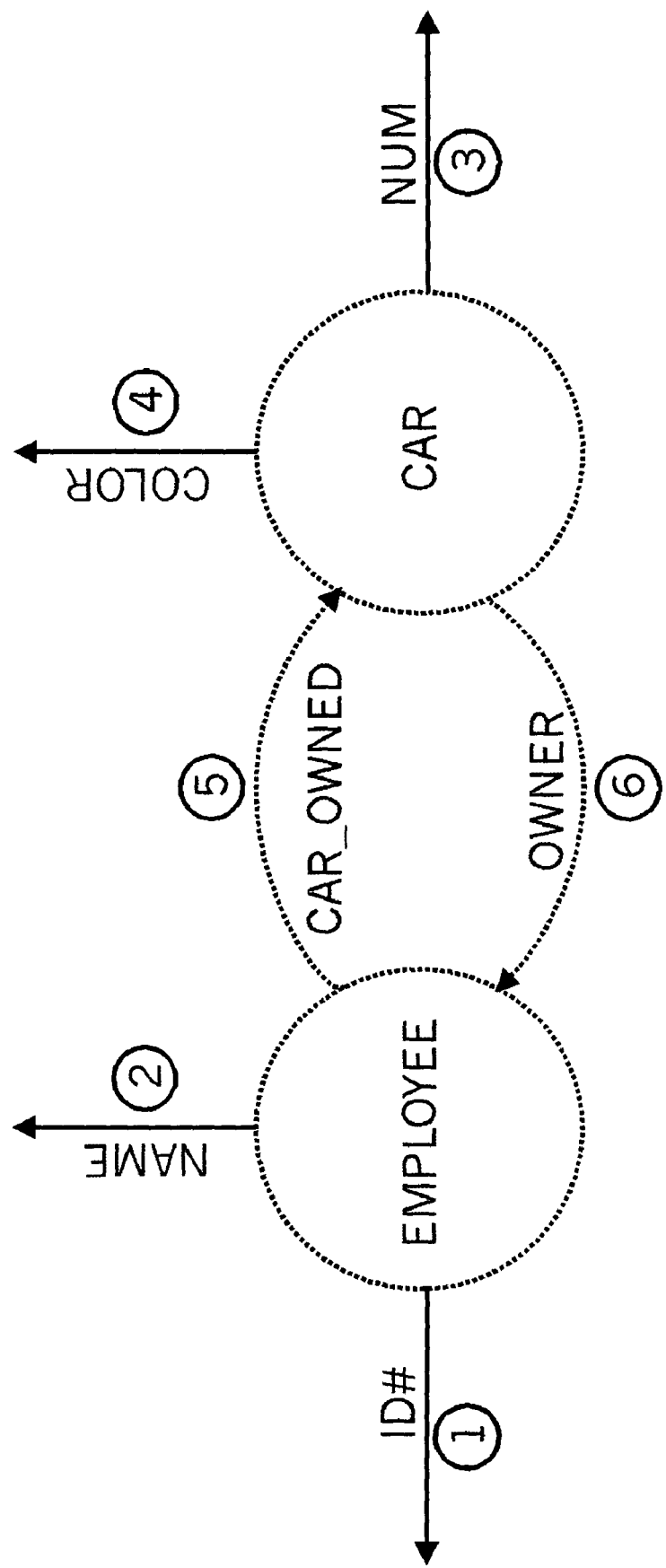
FIG. 27 is an illustration of ontology model corresponding to a twenty-fourth example.

The underlying ontology is illustrated in FIG. 27. The properties car_owned and owner are inverse to one another. Symbolically, this is represented as $6=5^{-1}$. The unique properties of the ontology are:

TABLE CXXXIII

Unique Properties within Ontology for Twenty-Fourth Example

| Property | Property Index |
|---|---|
| ID#(Employee) | 1 |
| Num(Car) | 3 |

The mapping of the target schema into the ontology is as follows:

TABLE CXXXIV

Mapping from Target schema to Ontology for Twenty-Fourth Example

| schema | Ontology | Property Index |
|---|---|---|
| T | Class: Car | |
| T.Num | Property: num(Car) | 3 |
| T.Color | Property: color(Car) | 1 |
| T.OwnerID | Property: ID#(owner)(Car) | $1o5^{-1}$ |

The mapping of the source schema into the ontology is as follows:

TABLE CXXXV

Mapping from Source schema to Ontology for Twenty-Fourth Example

| schema | Ontology | Property Index |
|---|---|---|
| $S_1$ | Class: Employee | |
| $S_1$.ID | Property: ID#(Employee) | 1 |
| $S_1$.Name | Property: name(Employee) | 2 |
| $S_1$.Car_Num | Property: num(car_owned(Employee)) | $3o5$ |
| $S_1$.Car_Color | Property: color(car_owned(Employee)) | $4o5$ |

The indices of the source properties are:

TABLE CXXXVI

Source Symbols for Twenty-Fourth Example

| Table | Source Symbols |
|---|---|
| $S_1$ | |
| | $2o1^{-1}$ |
| | $3o5o1^{-1}$ |
| | $4o5o1^{-1}$ |

The indices of the target properties, keyed on OwnerID are:

TABLE CXXXVII

Target Symbols for Twenty-Fourth Example

| Table | Target Symbols | Paths |
|---|---|---|
| T | | |
| | $3o5o1^{-1}$ | $3o5o1^{-1}$ |
| | $4o5o1^{-1}$ | $4o5o1^{-1}$ |

Based on the paths given in Table CXXXVII, the desired SQL query is:

```
INSERT INTO T(Num, Color, OwnerID)
(SELECT
    S_1.Car_Num AS Num, S_1.Car_Color AS Color,
    S_1.ID AS OwnerID
FROM
    S_1);
```

A Twenty-Fifth Example

Inversion

In a twenty-fifth example, a target table is of the following form:

TABLE CXXXVIII

Target Table T for Twenty-Fifth Example

| Number | Book_written_by_niece_of_owner |
|---|---|

Three source tables are given as follows:

TABLE CXXXIX

Source Table $S_1$ for Twenty-Fifth Example

| ISBN | Author |
|---|---|

TABLE CXL

Source Table $S_2$ for Twenty-Fifth Example

| ID | Aunt |
|---|---|

TABLE CXLI

Source Table $S_3$ for Twenty-Fifth Example

| ID | PhoneNumber |
|---|---|

Figure 28:
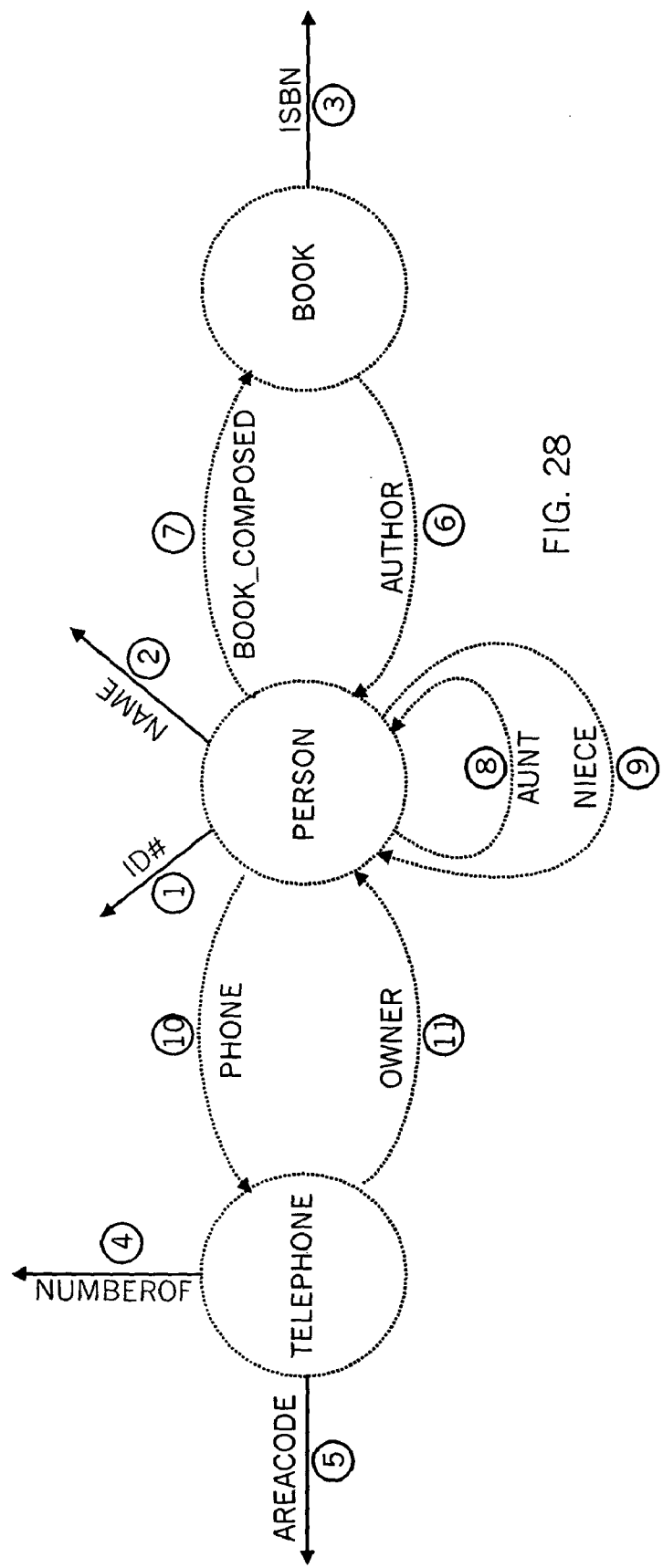
FIG. 28 is an illustration of ontology model corresponding to a twenty-fifth example.

The underlying ontology is illustrated in FIG. 28. The properties book_composed and author are inverse to one another, the properties aunt and niece are inverse to one another, and the properties phone and owner are inverse to one another. Symbolically, this is represented as $7=6^{-1}$, $9=8^{-1}$ and $11=10^{-1}$. The unique properties of the ontology are:

TABLE CXLII

Unique Properties within Ontology for Twenty-Fifth Example

| Property | Property Index |
|---|---|
| ID#(Person) | 1 |
| ISBN(Book) | 3 |
| numberof(Telephone) | 4 |

The mapping of the target schema into the ontology is as follows:

TABLE CXLIII

Mapping from Target schema to Ontology for Twenty-Fifth Example

| schema | Ontology | Property index |
|---|---|---|
| T | Class: Telephone | |
| T.Number | Property: numberof(Telephone) | 4 |
| T.Book_written_by_niece_of_owner | Property: ISBN(book_composed(niece(owner(Telephone)))) | $3o6^{-1}o8^{-1}o10^{-1}$ |

The mapping of the source schemas into the ontology is as follows:

TABLE CXLIV

Mapping from Source schema to Ontology for Twenty-Fifth Example

| schema | Ontology | Property Index |
|---|---|---|
| $S_1$ | Class: Book | |
| $S_1$.ISBN | Property: ISBN(Book) | 3 |
| $S_1$.Author | Property: ID#(author(Book)) | $1o6$ |
| $S_2$ | Class: Person | |
| $S_2$.ID | Property: ID#(Person) | 1 |
| $S_2$.Aunt | Property: ID#(Aunt(Person)) | $1o8$ |
| $S_3$ | Class: Person | |
| $S_3$.ID | Property: ID#(Person) | 1 |
| $S_3$.PhoneNumber | Property: numberof(phone(Person)) | $4o10$ |

The indices of the source properties are:

TABLE CXLV

Source Symbols for Twenty-Fifth Example

| Table | Source Symbols |
|---|---|
| $S_1$ | |
| | $1o6o3^{-1}$ |
| $S_2$ | |
| | $1o8o1^{-1}$ |
| $S_3$ | |
| | $4o10o1^{-1}$ |

The indices of the target properties, keyed on Book_Written_by_niece_of_owner are:

TABLE CXLVI

Target Symbols for Twenty-Fifth Example

| Table | Target Symbols | Paths |
|---|---|---|
| T | | |
| | $4o10o8o6o3^{-1}$ | $(4o10o1^{-1}) o (1o8o1^{-1}) o (1o6o3^{-1})$ |

Based on the paths given in Table CXLVI, the desired SQL query is:

```
INSERT INTO T(Number, Book_written_by_niece_of_owner)
(SELECT
        S_3.PhoneNumber AS Number,
        S_1.ISBN AS Book_written_by_niece_of_owner
 FROM
        S_1, S_2, S_3
 WHERE
        S_2.ID = S_1.Author AND
        S_3.ID = S_2.Aunt);
```

Implementation Details-SQL Generation

As mentioned hereinabove, and described through the above series of examples, in accordance with a preferred embodiment of the present invention a desired transformation from a source RDBS to a target RDBS is generated by:
 (i) mapping the source and target RDBS into a common ontology model;
 (ii) representing fields of the source and target RDBS in terms of properties of the ontology model, using symbols for properties;
 (iii) deriving expressions for target symbols in terms of source symbols; and
 (iv) converting the expressions into one or more SQL queries.

Preferably the common ontology model is built by adding classes and properties to an initial ontology model, as required to encompass tables and fields from the source and target RDBS. The addition of classes and properties can be performed manually by a user, automatically by a computer, or partially automatically by a user and a computer in conjunction.

Preferably, while the common ontology model is being built, mappings from the source and target RDBS into the ontology model are also built by identifying tables and fields of the source and target RDBS with corresponding classes and properties of the ontology model. Fields are preferably identified as being either simple properties or compositions of properties.

In a preferred embodiment of the present invention, automatic user guidance is provided when building the common ontology model, in order to accommodate the source and target RDBS mappings. Specifically, while mapping source and target RDBS into the common ontology model, the present invention preferably automatically presents a user with the ability to create classes that corresponds to tables, if such classes are not already defined within the ontology. Similarly, the present invention preferably automatically present a user with the ability to create properties that correspond to fields, if such properties are not already defined within the ontology.

This automatic guidance feature of the present invention enables users to build a common ontology on the fly, while mapping the source and target RDBS.

In a preferred embodiment of the present invention, automatic guidance is used to provide a user with a choice of properties to which a given table column may be mapped. Preferably, the choice of properties only includes properties with target types that are compatible with a data type of the given table column. For example, if the given table column has data type VARCHAR2, then the choice of properties only includes properties with target type string. Similarly, if the given table column is a foreign key to a foreign table, then the choice of properties only includes properties whose target is the class corresponding to the foreign table.

In a preferred embodiment of the present invention, automatic guidance is provided in determining inheritance among classes of the common ontology. Conditions are identified under which the present invention infers that two tables should be mapped to classes that inherit one from another. Such a condition arises when a table, $T_1$, contains a primary key that is a foreign key to a table, $T_2$. In such a situation, the present invention preferably infers that the class corresponding to $T_1$ inherits from the class corresponding to $T_2$.

For example, $T_1$ may be a table for employees with primary key Social_Security_No, which is a foreign key for a table $T_2$ for citizens. The fact that Social_Security_No serves both as a primary key for $T_1$ and as a foreign key for $T_2$ implies that the class Employees inherits from the class Citizens.

Preferably, when the present invention infers an inheritance relation, the user is given an opportunity to confirm or decline. Alternatively, the user may not be given such an opportunity.

Preferably, representing fields of the source and target RDBS in terms of properties of the ontology model is performed by identifying a key field among the fields of a table and expressing the other fields in terms of the identified key field using an inverse property symbol for the key field. For example, if a key field corresponds to a property denoted by 1, and a second field corresponds to a property denoted by 2, then the relation of the second field to the first field is denoted by $2o1^{-1}$. If a table has more than one key field, then preferably symbols are listed for each of the key fields, indicating how the other fields relate thereto. For example, if the second field above also is a key field, then the relation of the first field to the second field is denoted by $1o2^{-1}$, and both of the symbols $2o1^{-1}$ and $1o2^{-1}$ are listed.

Preferably, deriving expressions for target symbols in terms of source symbols is implemented by a search over the source symbols for paths that result in the target symbols. For example, if a target symbol is given by $3o1^{-1}$, then chains of composites are formed starting with source symbols of the form $ao1^{-1}$, with each successive symbol added to the composite chain inverting the leftmost property in the chain. Thus, a symbol ending with $a^{-1}$ is added to the left of the symbol $ao1^{-1}$, and this continues until property 3 appears at the left end of the chain.

Preferably, converting symbol expressions into SQL queries is accomplished by use of Rules 1-7 described hereinabove with reference to the examples.

Preferably, when mapping a table to a class, a flag is set that indicates whether it is believed that the table contains all instances of the class.

Implementation Details-XSLT Generation Algorithm

1. Begin with the target schema. Preferably, the first step is to identify a candidate root element. Assume in what follows that one such element has been identified—if there are more than one such candidate, then preferably a user decides which is to be the root of the XSLT transformation. Assume that a <root> element has thus been identified. Create the following XSLT script, to establish that any document produced by the transformation will at minimum conform to the requirement that its opening and closing tags are identified by root:

```
<xsl:template match="/">
    <root>
    </root>
</xsl:template>
```

2. Preferably, the next step is to identify the elements in the target schema that have been mapped to ontological classes. The easiest case, and probably the one encountered most often in practice, is one in which the root itself is mapped to a class, be it a simple class, a container class or a cross-product. If not, then preferably the code-generator goes down a few levels until it comes across elements mapped to classes. The elements that are not mapped to classes should then preferably be placed in the XSLT between the <root> tags mentioned above, in the correct order, up to the places where mappings to classes begin.

```
<xsl:template match="/">
    <root>
        <sequence1>
            [ <element1> mapped to class ]
            <element2>
        </sequence1>
        <sequence2>
        </sequence2>
    </root>
</xsl:template>
```

3. Henceforth, for purposes of clarity and exposition, the XSLT script generation algorithm is described in terms of an element <fu> that is expected to appear in the target XML document and is mapped to an ontological class, whether that means the root element or a parallel set of elements inside a tree emanating from the root. The treatment is the same in any event from that point onwards.

4. Preferably the XSLT generation algorithm divides into different cases depending on a number of conditions, as detailed hereinbelow in Table CXLVII:

TABLE CXLVII

Conditions for <xsl:for-each> Segments

| Condition | XSLT Segment |
|---|---|
| <fu> is mapped to a simple class Foo with cardinality parameters minOccurs = "1" maxOccurs = "1" in the XML schema and there is a corresponding element <foo> in the source document that is associated to the same class Foo. | A |
| <fu> is mapped to a simple class Foo with cardinality parameters minOccurs = "0" maxOccurs = "1" in the XML schema and there is a corresponding element <foo> in the source document that is associated to the same class Foo. | B |
| <fus> is mapped to a container class set[Foo] with cardinality parameters minOccurs = "0" maxOccurs = "unbounded" in the XML schema, and there are corresponding elements <foos1>, <foos2>, . . . , <foosn> in the source document each of which is associated to the same container-class set[Foo]. | C |
| fus> is mapped to a container class set[Foo] with cardinality parameters minOccurs = "0 " maxOccurs = "unbounded" in the XML schema, but there is no corresponding element <foos> in the source document that is associated with the same container-class set[Foo]. There are, however, perhaps elements <foo1>, <foo2> . . . <foom> which are each individually mapped to the class Foo. | D |
| <fus> is mapped to a container class set[Foo] with cardinality parameters minOccurs = "0" maxOccurs = "n" in the XML schema, and there are corresponding elements <foos1>, <foos2>, . . . , <foosk> in the source document each of which is associated to the same container-class set[Foo]. | E |
| <fus> is mapped to a container class set[Foo] with cardinality parameters minOccurs = "0" maxOccurs = "n" in the XML schema, but there is no corresponding element <foos> in the source document that is associated with the same container-class set[Foo]. There are, however, perhaps elements <foo1>, <foo2> . . . <fook> which are each individually mapped to the class Foo. | F |
| fus> is mapped to a container class set[Foo] with cardinality parameters minOccurs = "m" maxOccurs = "n" in the XML schema, and there are corresponding elements <foos1>, <foos2>, . . . , <foosk> in the source document each of which is associated to the same container-class set[Foo]. | G |
| fus> is mapped to a container class set[Foo] with cardinality parameters minOccurs = "m" maxOccurs = "n" in the XML schema, but there is no corresponding element <foos> in the source document that is associated with the same container-class set[Foo]. There are, however, perhaps elements <foo1>, <foo2> . . . <fook> which are each individually mapped to the class Foo. | H |

For cases C and D, the XML schema code preferably looks like:

```
<xsd:complexType name="fus">
    <xsd:sequence>
        <xsd:element name="fu" type="fu_view" minOccurs="0" maxOccurs="unbounded"/>
    </xsd:sequence>
</xsd:complexType>
```

For cases E and F, the XML schema code preferably looks like:

```
<xsd:complexType name="fus">
    <xsd:sequence>
        <xsd:element name="fu" type="fu_view" minOccurs="0" maxOccurs="n">
    </xsd:sequence>
</xsd:complexType>
```

For cases G and H, the XML schema code preferably looks like:

```
<xsd:complexType name="fus">
    <xsd:sequence>
        <xsd:element name="fu" type="fu_view" minOccurs="0" maxOccurs="n">
    </xsd:sequence>
</xsd:complexType>
```

For the rules as to what should appear in between the <for-each> tags, see step 5 hereinbelow.

CASE A:

```
<fu>
    <xsl:for-each select=".//foo[position( ) = 1">
    </xsl:for-each>
</fu>
```

CASE B:

```
<xsl:for-each select=".//foo[position( ) = 1]">
    <fu>
    </fu>
</xsl:for-each>
```

CASE C:

```
<fus>
    <xsl:for-each select=".//foos1">
        <xsl:for-each select="foo">
            <fu>
            </fu>
        </xsl:for-each>
    </xsl:for-each>
    <xsl:for-each select=".//foos2">
        <xsl:for-each select="foo">
            <fu>
            </fu>
        </xsl:for-each>
    </xsl:for-each>
    <xsl:for-each select=".//foosn">
        <xsl:for-each select="foo">
            <fu>
            </fu>
        </xsl:for-each>
    </xsl:for-each>
</fus>
```

CASE D:

```
<fus>
    <xsl:for-each select=".//foo1">
        <fu>
        </fu>
    </xsl:for-each>
    <xsl:for-each select=".//foo2">
        <fu>
        </fu>
    </xsl:for-each>
    <xsl:for-each select=".//foom">
        <fu>
        </fu>
    </xsl:for-each>
</fus>
```

CASE E:

```
<xsl:template match="/">
    <fus>
        <xsl:call-template name="find_foos1">
            <xsl:with-param name="so_far" select="0"/>
        </xsl:call-template>
    </fus>
</xsl:template>
<xsl:template name="find_foos1">
    <xsl:param name="so_far"/>
    <xsl:if test="$so_far < n+1">
        <xsl:for-each select=".//foos1/foo">
            <xsl:if test="$so_far+position( ) < n+1">
                <fu>
                </fu>
            </xsl:if>
        </xsl:for-each>
    </xsl:if>
    <xsl:call-template name="find_foos2">
        <xsl:with-param name="so_far" select="$so_far+
            count(.//foos1/foo)"/>
    </xsl:call-template>
</xsl:template>
<xsl:template name="find_foos2">
    <xsl:param name="so_far"/>
    <xsl:if test="$so_far < n+1">
        <xsl:for-each select=".//foos2/foo">
```

-continued

CASE E:

```
        <xsl:if test="$so_far+position( ) < n+1">
            <fu>
            </fu>
        </xsl:if>
    </xsl:for-each>
    </xsl:if>
    <xsl:call-template name="find_foos3">
        <xsl:with-param name="so_far" select="$so_far+
        count(.//foos2/foo)"/>
    </xsl:call-template>
</xsl:template>
<xsl:template name="find_foosk">
    <xsl:param name="so_far"/>
    <xsl:if test="$so_far < n+1">
        <xsl:for-each select=".//foosn/foo">
            <xsl:if test="$so_far+position( ) < n+1">
                <fu>
                </fu>
            </xsl:if>
        </xsl:for-each>
    </xsl:if>
</xsl:template>
```

CASE F:

```
<xsl:template match="/">
    <fus>
        <xsl:call-template name="find_foo1">
            <xsl:with-param name="so_far" select="0"/>
        </xsl:call-template>
    </fus>
</xsl:template>
<xsl:template name="find_foo1">
    <xsl:param name="so_far"/>
    <xsl:if test="$so_far < n+1">
        <xsl:for-each select=".//foo1 ">
            <xsl:if test="$so_far+position( ) < n+1">
                <fu>
                </fu>
            </xsl:if>
        </xsl:for-each>
    </xsl:if>
    <xsl:call-template name="find_foo2">
        <xsl:with-param name="so_far" select="$so_far+
        count(.//foo1)"/>
    </xsl:call-template>
</xsl:template>
<xsl:template name="find_foo2">
    <xsl:param name="so_far"/>
    <xsl:if test="$so_far < n+1">
        <xsl:for-each select=".//foo2">
            <xsl:if test="$so_far+position( ) < n+1">
                <fu>
                </fu>
            </xsl:if>
        </xsl:for-each>
    </xsl:if>
    <xsl:call-template name="find_foo3">
        <xsl:with-param name="so_far" select="$so_far+
        count(.//foo2)"/>
    </xsl:call-template>
</xsl:template>
<xsl:template name="find_fook">
    <xsl:param name="so_far"/>
    <xsl:if test="$so_far < n+1">
        <xsl:for-each select=".//fook">
            <xsl:if test="$so_far+position( ) < n+1">
                <fu>
                </fu>
            </xsl:if>
```

CASE F:

```
        </xsl:for-each>
    </xsl:if>
</xsl:template>
```

CASE G:

```
<xsl:template match="/">
    <fus>
        <xsl:call-template name="find_foos1">
            <xsl:with-param name="so_far" select="0"/>
        </xsl:call-template>
    </fus>
</xsl:template>
<xsl:template name="find_foos1">
    <xsl:param name="so_far"/>
    <xsl:if test="$so_far < n+1">
        <xsl:for-each select=".//foos1/foo">
            <xsl:if test="$so_far+position( ) < n+1">
                <fu>
                </fu>
            </xsl:if>
        </xsl:for-each>
    </xsl:if>
    <xsl:call-template name="find_foos2">
        <xsl:with-param name="so_far" select="$so_far+
        count(.//foos1/foo)"/>
    </xsl:call-template>
</xsl:template>
<xsl:template name="find_foos2">
    <xsl:param name="so_far"/>
    <xsl:if test="$so_far < n+1">
        <xsl:for-each select=".//foos2/foo">
            <xsl:if test="$so_far+position( ) < n+1">
                <fu>
                </fu>
            </xsl:if>
        </xsl:for-each>
    </xsl:if>
    <xsl:call-template name="find_foos3">
        <xsl:with-param name="so_far" select="$so_far+
        count(.//foos2/foo)"/>
    </xsl:call-template>
</xsl:template>
<xsl:template name="find_foosn">
    <xsl:param name="so_far"/>
    <xsl:if test="$so_far < k+1">
        <xsl:for-each select=".//foosn/foo">
            <xsl:if test="$so_far+position( ) < n+1">
                <fu>
                </fu>
            </xsl:if>
        </xsl:for-each>
    </xsl:if>
    <xsl:call-template name="generate_fus">
        <xsl:with-param name="so_far" select="$so_far+
        count(.//foosk/foo)"/>
    </xsl:call-template>
</xsl:template>
<xsl:template name="generate_fus">
    <xsl:param name="so_far"/>
    <xsl:if test="$so_far < m">
        <fu>
        </fu>
        <xsl:call-template name="generate_fus">
            <xsl:with-param name="so_far" select="$so_far + 1"/>
        </xsl:call-template>
    </xsl:if>
</xsl:template>
```

CASE H:

```
<xsl:template match="/">
    <fus>
        <xsl:call-template name="find_foo1">
            <xsl:with-param name="so_far" select="0"/>
        </xsl:call-template>
    </fus>
</xsl:template>
<xsl:template name="find_foo1">
    <xsl:param name="so_far"/>
    <xsl:if test="$so_far < n+1">
        <xsl:for-each select=".//foo1">
            <xsl:if test="$so_far+position( ) < n+1">
                <fu>
                </fu>
            </xsl:if>
        </xsl:for-each>
    </xsl:if>
    <xsl:call-template name="find_foo2">
        <xsl:with-param name="so_far" select="$so_far+
            count(.//foo1)"/>
    </xsl:call-template>
</xsl:template>
<xsl:template name="find_foo2">
    <xsl:param name="so_far"/>
    <xsl:if test="$so_far < n+1">
        <xsl:for-each select=".//foo2">
            <xsl:if test="$so_far+position( ) < n+1">
                <fu>
                </fu>
            </xsl:if>
        </xsl:for-each>
    </xsl:if>
    <xsl:call-template name="find_foo3">
        <xsl:with-param name="so_far" select="$so_far+
            count(.//foo2)"/>
    </xsl:call-template>
</xsl:template>
<xsl:template name="find_foon">
    <xsl:param name="so_far"/>
    <xsl:if test="$so_far < k+1">
        <xsl:for-each select=".//foon">
            <xsl:if test="$so_far+position( ) < n+1">
                <fu>
                </fu>
            </xsl:if>
        </xsl:for-each>
```

-continued

CASE H:

```
    </xsl:if>
    <xsl:call-template name="generate_fus">
        <xsl:with-param name="so_far" select="$so_far+
            count(.//fook)"/>
    </xsl:call-template>
</xsl:template>
<xsl:template name="generate_fus">
    <xsl:param name="so_far"/>
    <xsl:if test="$so_far < m">
        <fu>
        </fu>
        <xsl:call-template name="generate_fus">
            <xsl:with-param name="so_far" select="$so_far + 1"/>
        </xsl:call-template>
    </xsl:if>
</xsl:template>
```

5. Next assume that the classes have been taken care of as detailed hereinabove in step 4. Preferably, from this point onwards the algorithm proceeds by working with properties rather than classes. Again, the algorithm is divided up into cases. Assume that the <fu></fu> tags have been treated, and that the main issue now is dealing with the elements <bar> that are properties of <fu>.

Sequence Lists

Suppose that the properties of <fu> are listed in a sequence complex-type in the target schema. Assume, for the sake of definitiveness, that a complexType fu is mapped to an ontological class Foo, with elements $bar_i$ mapped to respective property, $Foo.bar_i$. Assume further that the source XML schema has an Xpath pattern fu1 that maps to the ontological class Foo, with further children patterns fu1/barr1, fu1/barr2, etc., mapping to the relevant property paths.

In a preferred embodiment of the present invention, specific pieces of code are generated to deal with different maximum and minimum occurrences. Such pieces of code are generated inside the <fu> </fu> tags that were generated as described hereinabove. Preferably, the general rule for producing such pieces of code is as follows in Table CXLVIII:

TABLE CXLVIII

Conditions for Filling in <xsl:for-each> Segments

| Condition | XSLT Segment |
| --- | --- |
| The target XML code says <xs:element name="bar" minOccurs="1" maxOccurs="1"/> or equivalently <xs:element name="bar" />, and the source has an associated tag <barr>. | I |
| The target XML code says <xs:element name="bar" minOccurs="0" maxOccurs="unbounded"/> and the source has an associated tag <barr>. | J |
| The XML code says <xs:element name="bar" minOccurs="0" maxOccurs="n"/> and the source has an associated tag <barr>. | L |
| The XML code says <xs:element name="bar" minOccurs="m" maxOccurs="unbounded"/> where m > 0, and the source has an associated tag <barr>. | M |
| The XML code says <xs:element name="bar" minOccurs="m" maxOccurs="n"/> where m > 0, and n is a finite integer, and the source has an associated tag <barr>. | N |
| The target sequence includes a line <xs:element name="bar" minOccurs="m" maxOccurs="n"/> where m > 0, but the source has no associated tag. | O |

| CASE I: |
| --- |
| ```
<bar>
    <xsl:value-of select="barr"/>
</bar>
``` |

| CASE J: |
| --- |
| ```
<xsl:for-each select="barr">
    <bar>
        <xsl:value-of select="."/>
    </bar>
</xsl:for-each>
``` |

| CASE K: |
| --- |
| ```
<xsl:for-each select="barr[position( ) < n+1]">
    <bar>
        <xsl:value-of select="."/>
    </bar>
</xsl:for-each>
``` |

| CASE L: |
| --- |
| ```
<xsl:for-each select="barr">
    <bar>
        <xsl:value-of select="."/>
    </bar>
</xsl:for-each>
<xsl:call-template name="generate_bar">
    <xsl:with-param name="so_far" select="count(barr)"/>
</xsl:call-template>
<xsl:template name="generate_bar">
<xsl:param name="so_far"/>
<xsl:if test="$so_far < m">
  <bar>
  </bar>
  <xsl:call-template name="generate_bar">
      <xsl:with-param name="so_far" select="$so_far + 1"/>
  </xsl:call-template>
</xsl:if>
</xsl:template>
``` |

| CASE M: |
| --- |
| ```
<xsl:for-each select="barr[position( ) &lt; n+1]">
    <bar>
        <xsl:value-of select="."/>
    </bar>
</xsl:for-each>
<xsl:call-template name="generate_bar">
    <xsl:with-param name="so_far" select="count(barr)"/>
</xsl:call-template>
<xsl:template name="generate_bar">
<xsl:param name="so_far"/>
<xsl:if test="$so_far &lt; m">
  <bar>
  </bar>
  <xsl:call-template name="generate_bar">
      <xsl:with-param name="so_far" select="$so_far + 1"/>
``` |

-continued

| CASE M: |
| --- |
| ```
    </xsl:call-template>
</xsl:if>
</xsl:template>
``` |

| CASE N: |
| --- |
| ```
<bar>
</bar>
``` |

As an exemplary illustration, suppose the complexType appears in the target schema as follows:

```
<xs:complexType name="fu">
<xs:sequence>
    <xs:element name="bar1" type="xs:string" />
    <xs:element name="bar2" type="xs:string" minOccurs="0"
    maxOccurs="7"/>
    <xs:element name="bar3" type="xs:string" minOccurs="1"
    maxOccurs="8"/>
    <xs:element name="bar4" type="xs:string" minOccurs="3"
    maxOccurs="unbounded"/>
    <xs:element name="bar5" type="xs:string" minOccurs="0"
    maxOccurs="unbounded"/>
    <xs:element name="barn" type="xs:string" />
</xs:sequence>
</xs:complexType>
```

Then, based on the above cases, the following XSLT script is generated.

```
<fu>
    <barr1>
            <xsl:value-of select="bar1"/>
    </barr1>
    <xsl:for-each select="bar2[position( ) &lt; 5]">
            <barr2>
                <xsl:value-of select="."/>
            </barr2>
    </xsl:for-each>
    <xsl:for-each select="bar3[position( ) &lt; 9]">
            <barr3>
                <xsl:value-of select="."/>
            </barr3>
    </xsl:for-each>
    <xsl:call-template name="generate_barr3">
            <xsl:with-param name="so_far" select="
            count(bar3)"/>
    </xsl:call-template>
    <xsl:for-each select="bar4">
            <barr4>
                <xsl:value-of select="."/>
            </barr4>
    </xsl:for-each>
    <xsl:call-template name="generate_barr4">
            <xsl:with-param name="so_far" select="
            count(bar4)"/>
    </xsl:call-template>
    <xsl:for-each select="bar5">
            <barr5>
                <xsl:value-of select="."/>
            </barr5>
    </xsl:for-each>
    </xsl:if>
</fu>
</xsl:template>
```

-continued

```
<xsl:template match="text( )|@*"/>
<xsl:template name="generate_barr3">
    <xsl:param name="so_far"/>
    <xsl:if test="$so_far < 1">
        <barr3>
        </barr3>
        <xsl:call-template name="generate_barr3">
            <xsl:with-param name="so_far" select="$so_far + 1"/>
        </xsl:call-template>
    </xsl:if>
</xsl:template>
<xsl:template name="generate_barr4">
    <xsl:param name="so_far"/>
    <xsl:if test="$so_far < 3">
        <barr4>
        </barr4>
        <xsl:call-template name="generate_barr4">
            <xsl:with-param name="so_far" select="$so_far + 1"/>
        </xsl:call-template>
    </xsl:if>
</xsl:template>
```

Choice Lists

Suppose that the properties of <fu> are listed in a choice complex-type in the target schema. Assume again, as above, that fu is mapped to an ontological class Foo, with each of $bar_i$ mapped to a property, $Foo.bar_i$. Assume further, as above, that the source XML schema has an Xpath pattern foo that maps to the ontological class Foo, with further children patterns foo/barr1, foo/barr2, etc., mapping to the relevant property paths.

Preferably, the general rule for producing XSLT script associated with a target choice bloc is as follows. Start with the tags <xs1:choose> </xs1:choose>. For each element in the choice sequence, insert into the choose bloc <xs1:when test="barr"> </xs1:when> and within that bloc insert code appropriate to the cardinality restrictions of that element, exactly as above for sequence blocs, including the creation of new templates if needed. Finally, if there are no elements with minOccurs="0" in the choice bloc, select any tag <barr> at random in the choice bloc, and insert into the XSLT, right before the closing </xs1:choose>, <xs1:otherwise> <barr> </barr> </xs1:otherwise>.

As an exemplary illustration, suppose the complexType appears I the target schema as follows:

```
<xs:choice>
    <xs:element name="bar1" type="xs:string" />
    <xs:element name="bar2" type="xs:string" minOccurs="0" maxOccurs="7"/>
    <xs:element name="bar3" type="xs:string" minOccurs="1" maxOccurs="8"/>
    <xs:element name="bar4" type="xs:string" minOccurs="3" maxOccurs="unbounded"/>
    <xs:element name="bar5" type="xs:string" minOccurs="0" maxOccurs="unbounded"/>
    <xs:element name="barn" type="xs:string" />
</xs:choice>
```

Then, based on the above cases, the following XSLT script is generated.

```
<fu>
    <xsl:choose>
        <xsl:when test="bar1">
            <barr1>
                <xsl:value-of select="bar1"/>
            </barr1>
        </xsl:when>
        <xsl:when test="bar2">
            <xsl:for-each select="bar2[position( ) < 8]">
                <barr2>
                    <xsl:value-of select="."/>
                </barr2>
            </xsl:for-each>
        </xsl:when>
        <xsl:when test="bar3">
            <xsl:for-each select="bar3[position( ) < 9]">
                <barr3>
                    <xsl:value-of select="."/>
                </barr3>
            </xsl:for-each>
            <xsl:call-template name="generate_barr3">
                <xsl:with-param name="so_far" select="count(bar3)"/>
            </xsl:call-template>
        </xsl:when>
        <xsl:when test="bar4">
            <xsl:for-each select="bar4">
                <barr4>
                    <xsl:value-of select="."/>
                </barr4>
            </xsl:for-each>
            <xsl:call-template name="generate_barr4">
                <xsl:with-param name="so_far" select="count(bar4)"/>
            </xsl:call-template>
        </xsl:when>
        <xsl:when test="bar5">
            <xsl:for-each select="bar5">
                <barr5>
                    <xsl:value-of select="."/>
                </barr5>
            </xsl:for-each>
        </xsl:when>
        <xsl:otherwise>
        </xsl:otherwise>
    </xsl:choose>
</fu>
</xsl:template>
<xsl:template match="text( )|@*"/>
<xsl:template name="generate_barr3">
    <xsl:param name="so_far"/>
    <xsl:if test="$so_far < 1">
        <barr3>
        </barr3>
        <xsl:call-template name="generate_barr3">
            <xsl:with-param name="so_far" select="$so_far + 1"/>
        </xsl:call-template>
    </xsl:if>
</xsl:template>
<xsl:template name="generate_barr4">
    <xsl:param name="so_far"/>
    <xsl:if test="$so_far < 3">
        <barr4>
        </barr4>
        <xsl:call-template name="generate_barr4">
            <xsl:with-param name="so_far" select="$so_far + 1"/>
        </xsl:call-template>
    </xsl:if>
</xsl:template>
```

All Lists

Suppose that the properties of <fu> are listed in an all complex-type in the target schema. Assume again, as above, that foo is mapped to an ontological class Foo, with each of bar.sub.i mapped to a property, Foo.bar.sub.i. Assume further that the source XML schema has an Xpath pattern foo that maps to the ontological class Foo, with further children patterns foo/barr1, foo/barr2, etc., mapping to the relevant property paths.

In a preferred embodiment of the present invention, a general rule is to test for the presence of each of the source tags associated with the target tags, by way of

```
<xsl:if test="foo">
    <fu>
        <xsl:value-of select="foo"/>
    </fu>
</xsl:if>
```

Preferably, if any of the elements has minOccurs="1" then the negative test takes place as well:

```
<xsl:if test="not (foo)">
    <fu>
    </fu>
</xsl:if>
```

As an exemplary illustration, suppose the complexType appears I the target schema as follows:

```
<xs:complexType name="bar">
    <xs:all>
        <xs:element name="bar2" type="xs:string" minOccurs="0" maxOccurs="1"/>
        <xs:element name="bar3" type="xs:string" minOccurs="1" maxOccurs="1"/>
    </xs:all>
</xs:complexType>
```

Then the following XSLT script is generated.

```
<fu>
<xsl:template match="foo">
    <xsl:if test="position( ) = 1">
        <xsl:if test="bar1">
            <barr1>
                <xsl:value-of select="bar1"/>
            </barr1>
        </xsl:if>
        <xsl:if test="bar2">
            <barr2>
                <xsl:value-of select="bar2"/>
            </barr2>
        </xsl:if>
        <xsl:if test="not (bar2)">
            <barr2>
            </barr2>
        </xsl:if>
    </xsl:if>
</xsl:template>
```

6. In a preferred embodiment of the present invention, when the elements of foo/bar1, foo/bar2, etc. have been processed as above in step 5, everything repeats in a recursive manner for properties that are related to each of the $bar_i$ elements. That is, if the target XML schema has further tags that are children of bar1, bar2, etc., then preferably each of those is treated as properties of the respective target classes of bar1, bar2, and so on, and the above rules apply recursively.

Statistical Reports

A feature of the present invention is the ability to generate statistical reports describing various statistics relating to data schemas mapped to a central ontology model.

Tables CXLIX, CL and CLI include sample statistical reports.

TABLE CXLIX

Statistical Report
Summary Report for [Project Name] - [Time and Date]

| | | |
|---|---|---|
| Assets | Total number of assets | 550 |
| | Percentage of assets with at least one mapped element | 33% |
| Model | Total number of model entities | 13,578 |
| | Total number of classes and properties | 6,203 |
| | Percentage of classes and properties mapped to assets | 46% |
| Packages | Total number of packages | 30 |
| | Percentage of non-empty packages | 97% |
| Active Services | Total number of transformation reports | 67 |
| | Total number of generated transformation scripts | 7 |

TABLE CL

Statistical Report

| Asset Report for [Project Name] - [Time and Date] | | | Total | % Mapped |
|---|---|---|---|---|
| RDBMS | MS SQL 2000 | MS SQL 2000 assets | 30 | 50% |
| | | Tables | 120 | 30% |
| | | Columns | 523 | 45% |
| | Oracle 8i | Oracle 8i assets | 30 | 50% |
| | | Tables | 120 | 30% |
| | | Columns | 523 | 45% |
| XSD | May 2001 | XML assets | 30 | 93% |
| | | Complex types | 120 | 9% |
| | | Simple types | 60 | 40% |
| | | Element groups | 58 | 65% |
| | | Attribute groups | 23 | 32% |
| COBOL Copy Books | Cobol | | | |
| ERwin Models | ERwin 4100 | | | |

TABLE CLI

Statistical Report

| Model Report for [Project Name] - [Time and Date] | | Total | % Mapped |
|---|---|---|---|
| Classes | Classes | 300 | 50% |
| | Classes with test instances | 100 | 90% |

TABLE CLI-continued

Statistical Report

Model Report for [Project Name] -
[Time and Date]

| | | Total | % Mapped |
|---|---|---|---|
| | Properties | 120 | 30% |
| | Inherited properties | 523 | 45% |
| Business Rules | Business rules | 1000 | |
| | Lookup tables | 200 | |
| | Enumerated lists | 200 | |
| | Conversion scripts | 200 | |
| | Equivalence | 200 | |
| | Uniqueness | 200 | |
| | Used by transformations | 23 | |

Metadata Models

Although the examples presented hereinabove use relational database schemas and XML schemas, it will be appreciated by those skilled in the art that the present invention applies to a wide variety of data structures, conforming to respective schemas. Also, the central ontology model into which the schemas are mapped may be a generic industry model, or an enterprise specific model.

The same data can often be represented in different ways. Relational database schemas and XML schema documents are two ways of representing data, and are examples of metadata models; i.e., structural models for representing data. Other familiar metadata models include, for example, ontology models, Cobol Copy Books, entity-relationship diagrams (ERD), DARPA Agent Markup Language (DAML), Resource Description Framework (RDF) models and Web Ontology Language (OWL). Such metadata models are designated generically by M1, and the data itself represented according to a metadata model is designated generically by M0. The notation M1 and M0 conveys that an M1 is a schema for an M0.

At a higher level of generality, the Meta Object Facility (MOF) is an Object Management Group (OMG) standard for defining metadata models themselves. MOF is used to define types of metadata and their associations; for example, classes and properties thereof, tables and columns thereof, or XML ComplexTypes and elements thereof. MOF is designated generically by M2, indicating that it is a schema for an M1; i.e., a "schema for schemas."

The XML Metadata Interchange (XMI) schema is also an M2, being a standard for defining XML schemas. Specifically, XMI is an XML schema that specifies XML formats for metadata.

Generally, an M1 schema includes an atomic data type and a composite data type, the composite data type including zero or more atomic data types therewithin. For relational database schemas, the composite data type is a table and the atomic data type is a column of. Similarly, for XML schemas, the composite data type is a ComplexType and the atomic data type is an element therewithin; for COBOL Copy Books, the composite data type is a COBOL group and the atomic data type is a COBOL field therewithin; and for ontology schemas the composite data type is a class and the atomic data type is a property thereof.

In addition, an M1 schema may include additional structure such as (i) inheritance between composite data types, i.e., a composite data type that inherits atomics data types from another composite data type; and (ii) referential atomic data types, i.e., an atomic data type within a composite data type that is itself a reference to another composite data type. An example of inheritance is class inheritance within an ontology model, and an example of a referential atomic data type is a foreign key column within a relational database table.

Similarly, an M1 schema may include operations such as a join operation for combining relational database tables.

In a preferred embodiment of the present invention, an interface, such as a graphical user interface (GUI) or an application programming interface (API), is provided which enables atomic and composite data types to be identified with aspects of a particular data technology. For example, using such an API, a COBOL Copy Book can be designated as a new type of asset, for which composite data types are identified with COBOL groups and atomic data types are identified with COBOL fields. In addition, such an interface can also be used to designate icons and forms for displaying COBOL Copy Books.

It will be apparent to those skilled in the art that the present invention applies to mapping M2 schemas for metadata into a central metamodel for metadata. Metadata repositories, data modeling tools and runtime environments such as Enterprise Application Integration (EAI) and Extraction, Transformation and Loading (ETL), typically use different formats, or structures, for metadata. A metamodel for the structure of a data model can specify, for example, that data models have "entities" and "relationships." Using the present invention, schemas with respect to which the various modeling tools persist metadata can be mapped to the metamodel. In turn, the present invention can be used to generate a transformation script that translates metadata from one modeling tool to another, thus enabling interoperability for metadata exchange.

Moreover, the present invention can be applied to the two meta-levels M1 and M2. That is, an M1 can be imported in a syntax specified by an M2, where the M2 has a structure corresponding to a central metamodel.

Additional Considerations

In reading the above description, persons skilled in the art will realize that there are many apparent variations that can be applied to the methods and systems described. A first variation to which the present invention applies is a setup where source relational database tables reside in more than one database. The present invention preferably operates by using Oracle's cross-database join, if the source databases are Oracle databases. In an alternative embodiment, the present invention can be applied to generate a first SQL query for a first source database, and use the result to generate a second SQL query for a second source database. The two queries taken together can feed a target database.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method executed in a computer for deriving a transformation for transforming first data conforming with a source data schema to second data conforming to a target data schema, the method comprising:

providing an ontology model including classes and properties of classes;

providing the source data schema;

providing the target data schema, wherein the target data schema is different from the source data schema;

identifying a first primary data construct within the source data schema;

identifying a first secondary data construct within the first primary data construct;

identifying a second primary data construct within the target data schema;

identifying a second secondary data construct within the second primary data construct;

generating a first mapping for mapping the first primary data construct to a corresponding class of the ontology model;

generating a second mapping for mapping the first secondary data construct to a property of the corresponding class of the ontology model;

generating a third mapping for mapping the second primary data to a corresponding class of the ontology model;

generating a fourth mapping for mapping the second secondary data construct to a property of the corresponding class of the ontology model; and deriving the transformation, wherein the transformation is based on the first mapping, the second mapping, the third mapping, and the fourth mapping.

2. The method of claim 1 wherein the ontology model includes a generic industry model.

3. The method of claim 1 wherein the ontology model includes an enterprise specific model.

4. The method of claim 1 wherein the ontology model includes business rules that relate properties of a class.

5. The method of claim 4 wherein the business rules include conversion rules, for converting among properties of a class.

6. The method of claim 1 wherein the ontology model is a distributed model.

7. The method of claim 1 wherein the source data schema is specified by a meta-model that describes the first primary data construct and the first secondary data construct.

8. The method of claim 1 wherein the first mapping and the second mapping are generated manually by a user.

9. The method of claim 1 wherein generating the first mapping and generating the second mapping are performed automatically, based on matching at least partial names between the primary data construct and a class of the ontology model, and between the secondary data construct and a property of the class, respectively.

10. The method of claim 1 wherein generating the first mapping and generating the second mapping are performed automatically, based on matching at least partial names between the primary data construct and another primary data construct for which said mapping the primary data construct has already been performed, and between the secondary data construct and another secondary data construct for which said mapping the secondary data construct has already been performed, respectively.

11. The method of claim 1 wherein the second mapping is performed automatically based on matching data types between the secondary data construct and a property of the corresponding class.

12. The method of claim 1 wherein the first mapping and the second mapping use a Resource Description Framework (RDF) expression.

13. The method of claim 1 wherein said providing, identifying a primary data construct, and identifying a secondary data construct are enabled through an application programming interface (API).

14. The method of claim 1 wherein said providing, identifying a primary data construct, and identifying a secondary data construct are enabled through a graphical user interface (GUI).

15. The method of claim 1 further comprising calculating statistics for the ontology model.

16. The method of claim 1 further comprising calculating statistics for the source data schema.

17. The method of claim 16 wherein the statistics for the source data schema include the number of primary data constructs within the source data schema that have been mapped to corresponding classes of the ontology model.

18. The method of claim 16 wherein the statistics for the source data schema include the number of secondary data constructs within the data schema that have been mapped to corresponding properties of the ontology model.

19. The method of claim 16 wherein the statistics for the source data schema include the percentage of primary data constructs within the source data schema that have been mapped to corresponding classes of the ontology model.

20. The method of claim 16 wherein the statistics for the source data schema include the percentage of secondary data constructs within the source data schema that have been mapped to corresponding properties of the ontology model.

21. A method executed in a computer for deriving a transformation for transforming first data conforming with a source data schema to second data conforming to a target data schema, the method comprising:

providing an ontology model including classes and properties of classes, each property having associated therewith a target class;

providing the source data schema;

providing the target data schema, wherein the target data schema is different from the source data schema;

identifying a first primary data construct within the source data schema;

identifying a first secondary data construct within the first primary data construct;

identifying a second primary data construct within the target data schema;

identifying a second secondary data construct within the second primary data construct;

generating a first mapping for mapping the first primary data construct to a corresponding class of the ontology model;

generating a second mapping for mapping the first secondary data construct to an inverse of a property whose target class is the corresponding class of the ontology model;

generating a third mapping for mapping the second primary data construct to a corresponding class of the ontology model;

generating a fourth mapping for mapping the second secondary data construct to an inverse of a property whose target class is the corresponding class of the ontology model; and deriving the transformation from data conforming with the source data schema into data conforming with the target data schema, wherein the transformation is based on the first mapping, the second mapping, the third mapping, and the fourth mapping.

22. A method executed in a computer for deriving a transformation for transforming first data conforming with a source data schema to second data conforming to a target data schema, the method comprising:

providing an ontology model including classes and properties of classes, and including inheritance relationships for superclasses;

providing the source data schema;

providing the target data schema, wherein the target data schema is different from the source data schema;

identifying a first primary data construct within the source data schema;

identifying a first secondary data construct within the first primary data construct;

identifying a second primary data construct within the target data schema;

identifying a second secondary data construct within the second primary data construct;

generating a first mapping for mapping the first primary data construct to a corresponding class of the ontology model;

generating a second mapping for mapping the first secondary data construct to a property of a superclass of the corresponding class of the ontology model;

generating a third mapping for mapping the second primary data construct to a corresponding class of the ontology model;

generating a fourth mapping for mapping the second secondary data construct to a property of a superclass of the corresponding class of the ontology model; and deriving the transformation, wherein the transformation is based on the first mapping, the second mapping, the third mapping, and the fourth mapping.

23. A method executed in a computer for deriving a transformation for transforming first data conforming with a source data schema to second data conforming to a target data schema, the method comprising:

providing an ontology model including classes and properties of classes, and including inheritance relationships for superclasses;

providing the source data schema;

providing the target data schema, wherein the target data schema is different from the source data schema;

identifying a first primary data construct within the source data schema;

identifying a first secondary data construct within the first primary data construct;

identifying a second primary data construct within the target data schema;

identifying a second secondary data construct within the second primary data construct;

generating a first mapping for mapping the first primary data construct to a corresponding class of the ontology model;

generating a second mapping for mapping the first secondary data construct to an inverse of a property whose target class is a superclass of the corresponding class of the ontology model;

generating a third mapping for mapping the second primary data construct to a corresponding class of the ontology model;

generating a fourth mapping for mapping the second secondary data construct to an inverse of a property whose target class is a superclass of the corresponding class of the ontology model; and deriving the transformation, wherein the transformation is based on the first mapping, the second mapping, the third mapping, and the fourth mapping.

24. A method executed in a computer for deriving a transformation for transforming first data conforming with a source data schema to second data conforming to a target data schema, the method comprising:

providing an ontology model including classes and properties of classes;

providing the source data schema;

providing the target data schema, wherein the target data schema is different from the source data schema;

identifying a first primary data construct within the source data schema;

identifying a first secondary data construct within the first primary data construct;

identifying a second primary data construct within the target data schema;

identifying a second secondary data construct within the second primary data construct;

generating a first mapping for mapping the first primary data construct to a corresponding class of the ontology model;

generating a second mapping for mapping the first secondary data construct to a composition of properties, one of which is a property of the corresponding class of the ontology model;

generating a third mapping for mapping the second primary data construct to a corresponding class of the ontology model;

generating a fourth mapping for mapping the second secondary data construct to a composition of properties, one of which is a property of the corresponding class of the ontology model; and deriving the transformation, wherein the transformation is based on the first mapping, the second mapping, the third mapping, and the fourth mapping.

25. A system for generating a transformation for transforming first data conforming with a source data schema to second data conforming to a target data schema, the system comprising:

a memory for storing an ontology model including classes and properties of classes, the source data schema, and the target data schema;

a schema parser for identifying a first primary data construct within the source data schema, for identifying a secondary data construct within the first primary data construct, for identifying a second primary data construct within a target data schema, and for identifying a second secondary data construct within the second primary data construct;

a schema mapper for mapping the first primary data construct to a corresponding class of the ontology model, for mapping the first secondary data construct to a property of the corresponding class of the ontology model, for mapping the second primary data construct to a corresponding class of the ontology model, and for mapping the second secondary data construct to a property of the corresponding class of the ontology model; and a transformation generator for deriving the transformation from the first data into the second data, wherein the transformation is based on mappings mapped by the schema mapper.

26. The system of claim 25 wherein the ontology model includes a generic industry model.

27. The system of claim 25 wherein the ontology model includes an enterprise specific model.

28. The system of claim 25 wherein the ontology model includes business rules that relate properties of a class.

29. The system of claim 28 wherein the business rules include conversion rules, for converting among properties of a class.

30. The system of claim 25 wherein the ontology model is a distributed model.

31. The system of claim 25 further comprising a meta-model user interface for marking primary and secondary data constructs described within the meta-model that are to be mapped to corresponding classes and properties.

32. The system of claim 25 wherein said schema mapper manually maps the first primary data construct and the first secondary data construct.

33. The system of claim 25 wherein said schema mapper automatically maps the first primary data construct and the first secondary data construct, based on matching at least partial names between the first primary data construct and the second primary data construct, and between the first secondary data construct and the second secondary data construct, respectively.

34. The system of claim 25 wherein said schema mapper automatically maps the first secondary data construct, based on matching data types between the first secondary data construct and a property of the corresponding class.

35. The system of claim 25 wherein said schema mapper generates a Resource Description Framework (RDF) expression.

36. The system of claim 25 wherein said schema mapper maps a function of the first secondary data construct to the property of the corresponding class of the ontology model.

37. The system of claim 25 wherein said schema parser is accessed through an application programming interface (API).

38. The system of claim 25 wherein said schema parser is accessed through a graphical user interface (GUI).

39. The system of claim 25 further comprising a statistical processor calculating statistics for the ontology model.

40. The system of claim 25 further comprising a statistical processor calculating statistics for the source data schema.

41. The system of claim 40 wherein the statistics for the source data schema include a number of primary data constructs within the first data schema that have been mapped to corresponding classes of the ontology model.

42. The system of claim 40 wherein the statistics for the source data schema include a number of secondary data constructs within the source data schema that have been mapped to corresponding properties of the ontology model.

43. The system of claim 40 wherein the statistics for the source data schema include a percentage of primary data constructs within the source data schema that have been mapped to corresponding classes of the ontology model.

44. The system of claim 40 wherein the statistics for the source data schema include a percentage of secondary data constructs within the source data schema that have been mapped to corresponding properties of the ontology model.

45. A system for generating a transformation for transforming first data conforming with a source data schema to second data conforming to a target data schema, the system comprising:

a memory for storing an ontology model including classes and properties of classes, each property having associated therewith a target class, the source data schema, and the target data schema;

a schema parser for identifying a first primary data construct within the source data schema, for identifying a secondary data construct within the first primary data construct, for identifying a second primary data construct within a target data schema, and for identifying a second secondary data construct within the second primary data construct;

a schema mapper for mapping the first primary data construct to a corresponding class of the ontology model, for mapping the first secondary data construct to an inverse of a property whose target class is the corresponding class of the ontology model, for mapping the second primary data construct to a corresponding class of the ontology model, and for mapping the second secondary data construct to an inverse of a property whose target class is the corresponding class of the ontology model; and a transformation generator for deriving the transformation from the first data into the second data, wherein the transformation is based on the mappings mapped by the schema mapper.

46. A system for generating a transformation for transforming first data conforming with a first data schema to second data conforming to a second data schema, the system comprising:

a memory for storing an ontology model including classes and properties of classes, and including inheritance relationships for superclasses, the source data schema, and the target data schema;

a schema parser for identifying a first primary data construct within the source data schema, for identifying a secondary data construct within the first primary data construct, for identifying a second primary data construct within a target data schema, and for identifying a second secondary data construct within the second primary data construct;

a schema mapper for mapping the first primary data construct to a corresponding class of the ontology model, for mapping the first secondary data construct to a property of a superclass of the corresponding class of the ontology model, for mapping the second primary data construct to a corresponding class of the ontology model, and for mapping the second secondary data construct to a property of a superclass of the corresponding class of the ontology model; and a transformation generator for deriving the transformation from the first data into the second data, wherein the transformation is based on the mappings mapped by the schema mapper.

47. A system for generating a transformation for transforming first data conforming with a first data schema to second data conforming to a second data schema, the system comprising:

a memory for storing an ontology model including classes and properties of classes, and including inheritance relationships for superclasses, the source data schema, and the target data schema, wherein the target data schema is different from the source data schema;

a schema parser for identifying a first primary data construct within source data schema, for identifying a secondary data construct within the first primary data construct, for identifying a second primary data construct within a target data schema, and for identifying a second secondary data construct within the second primary data construct;

a schema mapper for mapping the first primary data construct to a corresponding class of the ontology model, for mapping the first secondary data construct to an inverse of a property whose target class is a superclass of the corresponding class of the ontology model, for mapping the second primary data construct to a corresponding class of the ontology model, and for mapping the second secondary data construct to an inverse of a property whose target class is a superclass of the corresponding class of the ontology model; and a transformation generator for deriving the transformation from the first data into the second data, wherein the transformation is based on the mappings mapped by the schema mapper.

48. A system for generating a transformation for transforming first data conforming with a first data schema to second data conforming to a second data schema, the system comprising:

a memory for storing an ontology model including classes and properties of classes, the source data schema, and the target data schema, wherein the target data schema is different from the source data schema;

a schema parser for identifying a first primary data construct within the source data schema, for identifying a secondary data construct within the first primary data construct, for identifying a second primary data construct within a target data schema, and for identifying a second secondary data construct within the second primary data construct, a schema mapper for mapping the first primary data construct to a corresponding class of the ontology model, for mapping the first secondary data construct to a composition of properties, one of which is a property of the corresponding class of the ontology model, for mapping the second primary data construct to a corresponding class of the ontology model, and for mapping the second secondary data construct to a composition of properties, one of which is a property of the corresponding class of the ontology model; and a transformation generator for deriving the transformation from the first data into the second data, wherein the transformation is based on the mappings mapped by the schema mapper.

49. A method executed in a computer for deriving a transformation for transforming first metadata conforming with a source data schema to second metadata conforming to a target data schema, comprising:

providing a metamodel for metadata including atomic constructs and composite constructs;

providing the source schema for metadata;

providing the target schema for metadata, wherein the target schema is different from the source schema;

identifying a first primary and a first secondary metadata construct within the source schema for metadata;

identifying a second primary and a second secondary metadata construct within the target schema for metadata generating a first mapping for mapping the first primary and the first secondary metadata constructs to corresponding composite and atomic constructs of the metamodel, respectively;

generating a second mapping for mapping the second primary and the second secondary metadata constructs to corresponding composite and atomic constructs of the metamodel, respectively; and deriving the transformation from the first metadata into the second metadata, wherein the transformation is based on the first mapping and the second mapping.

50. The method of claim 49 wherein the source data schema is an XML Metadata Interchange (XMI) schema.

51. The method of claim 49 wherein the metamodel is a Meta-Object Facility (MOF) model.

52. A method executed in a computer for mapping a business data schema into a generic data schema, the method comprising:

providing the business data schema, wherein the business data schema represents at least one type of business data instance in terms of alphanumeric values and links to business data instances;

providing a plurality of generic instance mappings;

defining a mapping from the business data schema into the generic data schema;

representing the mapping from the business data schema into the generic data schema in terms of the generic instance mappings; and deriving a transformation from first data conforming with the business data schema into second data conforming with the generic data schema, wherein the transformation is based on the generic instance mappings.

53. The method of claim 52 wherein the generic data schema is a Web Ontology Language (OWL) model.

54. The method of claim 52 wherein the business data schema is a relational database schema, wherein the at least one type of business data instance corresponds to at least one relational database table, and wherein the links to business data instances correspond to foreign keys.

55. The method of claim 52 wherein the business data schema is an XML schema, wherein the at least one type of business data instance corresponds to at least one complex type, and wherein the links to business data instances correspond to ID references.

56. The method of claim 52 wherein the business data schema is a Cobol copy book, wherein the at least one type of business data instance corresponds to at least one variable, and wherein the links to business data instances correspond to group items.

57. The method of claim 52 wherein the business data schema is an entity-relationship data model, wherein the at least one type of business data instance corresponds to at least one entity set, and wherein the links to business data instances correspond to relationships.

58. The method of claim 52 wherein the business data schema is an ontology model, wherein the at least one type of business data instance corresponds to at least one class, and wherein the links to business data instances correspond to properties.

59. The method of claim 52 wherein the plurality of generic instance mappings include a mapping for combining two linked data instances into a single data instance.

60. The method of claim 52 wherein the plurality of generic instance mappings include a mapping for combining two unlinked data instances into a single data instance.

61. The method of claim 52 wherein the plurality of generic instance mappings include a mapping for separating a single data instance into two linked data instances.

62. The method of claim 52 wherein the plurality of generic instance mappings include a mapping for separating a single data instance into two unlinked data instances.

63. The method of claim 52 wherein the plurality of generic instance mappings include a mapping for linking two unlinked data instances.

64. The method of claim 52 wherein the plurality of generic instance mappings include a mapping for unlinking two linked data instances.

65. The method of claim 52 further comprising deriving a transformation from the business data schema into a second business data schema, using results of said representing.

66. The method of claim 52 further comprising transforming instances of the business data schema into corresponding instances of a second business data schema, using results of said representing.

67. The method of claim 52 further comprising deriving a query on the business data schema corresponding to a query on the generic data schema, using results of said representing.

68. A system for mapping a business data schema into a generic data schema, the system comprising:
a memory for storing the business data schema, wherein the business data schema represents at least one type of business data instance in terms of alphanumeric values and links to business data instances, and including a plurality of generic instance mappings;
a mapping generator for defining a mapping from the business data schema into the generic data schema
a mapping analyzer for representing the mapping from the business data schema into the generic data schema in terms of the generic instance mappings; and
a transformation generator for deriving a transformation from first data conforming with the business data schema into second data conforming with the generic data schema, wherein the transformation is based on the generic instance mappings.

69. The system of claim 68 wherein the generic data schema is a Web Ontology Language (OWL) model.

70. The system of claim 68 wherein the business data schema is a relational database schema, wherein the at least one type of business data instance corresponds to at least one relational database table, and wherein the links to business data instances correspond to foreign keys.

71. The system of claim 68 wherein the business data schema is an XML schema, wherein the at least one type of business data instance corresponds to at least one complex type, and wherein the links to business data instances correspond to ID references.

72. The system of claim 68 wherein the business data schema is a Cobol copy book, wherein the at least one type of business data instance corresponds to at least one variable, and wherein the links to business data instances correspond to group items.

73. The system of claim 68 wherein the business data schema is an entity-relationship data model, wherein the at least one type of business data instance corresponds to at least one entity set, and wherein the links to business data instances correspond to relationships.

74. The system of claim 68 wherein the business data schema is an ontology model, wherein the at least one type of business data instance corresponds to at least one class, and wherein the links to business data instances correspond to properties.

75. The system of claim 68 wherein the plurality of generic instance mappings include a mapping for combining two linked data instances into a single data instance.

76. The system of claim 68 wherein the plurality of generic instance mappings include a mapping for combining two unlinked data instances into a single data instance.

77. The system of claim 68 wherein the plurality of generic instance mappings include a mapping for separating a single data instance into two linked data instances.

78. The system of claim 68 wherein the plurality of generic instance mappings include a mapping for separating a single data instance into two unlinked data instances.

79. The system of claim 68 wherein the plurality of generic instance mappings include a mapping for linking two unlinked data instances.

80. The system of claim 68 wherein the plurality of generic instance mappings include a mapping for unlinking two linked data instances.

81. The system of claim 68 further comprising a transformation generator for deriving a transformation from the business data schema into a second business data schema, using results of said mapping analyzer.

82. The system of claim 68 further comprising a transformation processor for transforming instances of the business data schema into corresponding instances of a second business data schema, using results of said mapping analyzer.

83. The system of claim 68 further comprising a query generator for deriving a query on the business data schema corresponding to a query on the generic data schema, using results of said representing.

84. A computer-readable storage medium storing program code for causing a computer to perform the steps of:
providing an ontology model including classes and properties of classes;
providing a source data schema;
providing a target data schema, wherein the target data schema is different from the source data schema;
identifying a first primary data construct within the source data schema;
identifying a first secondary data construct within the first primary data construct;
identifying a second primary data construct within the target data schema;
identifying a second secondary data construct within the second primary data construct;
generating a first mapping for mapping the first primary data construct to a corresponding class of the ontology model;
generating a second mapping for mapping the first secondary data construct to a property of the corresponding class of the ontology model;
generating a third mapping for mapping the second primary data construct to a corresponding class of the ontology model;
generating a fourth mapping for mapping the second secondary data construct to a property of the corresponding class of the ontology model; and
deriving a transformation from first data conforming with the source data schema into second data conforming with the target data schema, wherein the transformation is based on the first mapping, the second mapping, the third mapping, and the fourth mapping.

85. A computer-readable storage medium storing program code for causing a computer to perform the steps of:
providing an ontology model including classes and properties of classes, each property having associated therewith a target class;
providing a source data schema;
providing a target data schema, wherein the target data schema is different from the source data schema;
identifying a first primary data construct within the source data schema;
identifying a first secondary data construct within the first primary data construct;
identifying a second primary data construct within the target data schema;
identifying a second secondary data construct within the second primary data construct;
generating a first mapping for mapping the first primary data construct to a corresponding class of the ontology model;

generating a second mapping for mapping the first secondary data construct to an inverse of a property whose target class is the corresponding class of the ontology model;

generating a third mapping for mapping the second primary data construct to a corresponding class of the ontology model;

generating a fourth mapping for mapping the second secondary data construct to an inverse of a property whose target class is the corresponding class of the ontology model; and deriving a transformation from first data conforming with the source data schema into second data conforming with the target data schema, wherein the transformation is based on the first mapping, the second mapping, the third mapping, and the fourth mapping.

86. A computer-readable storage medium storing program code for causing a computer to perform the steps of:

providing an ontology model including classes and properties of classes, and including inheritance relationships for superclasses;

providing a source data schema;

providing a target data schema, wherein the target data schema is different from the source data schema;

identifying a first primary data construct within the source data schema;

identifying a first secondary data construct within the first primary data construct;

identifying a second primary data construct within the target data schema;

identifying a second secondary data construct within the second primary data construct;

generating a first mapping for mapping the first primary data construct to a corresponding class of the ontology model;

generating a second mapping for mapping the first secondary data construct to a property of a superclass of the corresponding class of the ontology model;

generating a third mapping for mapping the second primary data construct to a corresponding class of the ontology model;

generating a fourth mapping for mapping the second secondary data construct to a property of a superclass of the corresponding class of the ontology model; and deriving a transformation from first data conforming with the source data schema into second data conforming with the target data schema, wherein the transformation is based on the first mapping, the second mapping, the third mapping, and the fourth mapping.

87. A computer-readable storage medium storing program code for causing a computer to perform the steps of:

providing an ontology model including classes and properties of classes, and including inheritance relationships for superclasses;

providing a source data schema;

providing a target data schema, wherein the target data schema is different from the source data schema;

identifying a first primary data construct within the source data schema;

identifying a first secondary data construct within the first primary data construct;

identifying a second primary data construct within the target data schema;

identifying a second secondary data construct within the second primary data construct;

generating a first mapping for mapping the first primary data construct to a corresponding class of the ontology model;

generating a second mapping for mapping the first secondary data construct to an inverse of a property whose target class is a superclass of the corresponding class of the ontology model;

generating a third mapping for mapping the second primary data construct to a corresponding class of the ontology model;

generating a fourth mapping for mapping the second secondary data construct to an inverse of a property whose target class is a superclass of the corresponding class of the ontology model; and deriving a transformation from first data conforming with the source data schema into second data conforming with the target data schema, wherein the transformation is based on the first mapping, the second mapping, the third mapping, and the fourth mapping.

88. A computer-readable storage medium storing program code for causing a computer to perform the steps of:

providing an ontology model including classes and properties of classes;

providing a source data schema;

providing a target data schema, wherein the target data schema is different from the source data schema;

identifying a first primary data construct within the source data schema;

identifying a first secondary data construct within the first primary data construct;

identifying a second primary data construct within the target data schema;

identifying a second secondary data construct within the second primary data construct;

generating a first mapping for mapping the first primary data construct to a corresponding class of the ontology model;

generating a second mapping for mapping the first secondary data construct to a composition of properties, one of which is a property of the corresponding class of the ontology model;

generating a third mapping for mapping the second primary data construct to a corresponding class of the ontology model;

generating a fourth mapping for mapping the second secondary data construct to a composition of properties, one of which is a property of the corresponding class of the ontology model; and deriving a transformation from first data conforming with the source data schema into second data conforming with the target data schema, wherein the transformation is based on the first mapping, the second mapping, the third mapping, and the fourth mapping.

89. A computer-readable storage medium storing program code for causing a computer to perform the steps of:

providing a business data schema for representing at least one type of business data instance in terms of alphanumeric values and links to business data instances;

providing a plurality of generic instance mappings;

defining a mapping from the business data schema into a generic data schema representing the mapping from the business data schema into the generic data schema in terms of the generic instance mappings; and deriving a transformation from first data conforming with the business data schema into second data conforming with the generic data schema, wherein the transformation is based on the generic instance mappings.

90. A computer-readable storage medium storing program code for causing a computer to perform the steps of:
providing a metamodel for metadata including atomic constructs and composite constructs;
providing a source schema for metadata;
providing a target schema for metadata, wherein the target schema is different from the source schema;
identifying a first primary and a first secondary metadata construct within the source schema for metadata;
identifying a second primary and a second secondary metadata construct within the target schema for metadata;
generating a first mapping for mapping the first primary and the first secondary metadata constructs to corresponding composite and atomic constructs of the metamodel, respectively;
generating a second mapping for mapping the second primary and the second secondary metadata constructs to corresponding composite and atomic constructs of the metamodel respectively; and
deriving a transformation from first metadata conforming with the source schema into second metadata conforming with the target schema, wherein the transformation is based on the first mapping and the second mapping.

* * * * *